(12) United States Patent
Srikrishna et al.

(10) Patent No.: US 8,606,808 B2
(45) Date of Patent: *Dec. 10, 2013

(54) FINDING RELEVANT DOCUMENTS

(71) Applicant: Python4Fun, Inc., San Mateo, CA (US)

(72) Inventors: Devabhaktuni Srikrishna, San Mateo, CA (US); Marc Coram, Palo Alto, CA (US)

(73) Assignee: Python4Fun, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,019

(22) Filed: Sep. 30, 2012

(65) Prior Publication Data

US 2013/0031088 A1   Jan. 31, 2013

Related U.S. Application Data

(63) Continuation of application No. 12/703,758, filed on Feb. 10, 2010.

(51) Int. Cl.
*G06F 17/30* (2006.01)

(52) U.S. Cl.
USPC ............................ 707/767; 707/765; 707/766

(58) Field of Classification Search
USPC ........................................................ 707/767
See application file for complete search history.

(56) References Cited

U.S. PATENT DOCUMENTS 7,664,740 B2 *  2/2010  Starbuck et al. ............. 707/706
7,818,315 B2 * 10/2010  Cucerzan et al. ............. 707/723

* cited by examiner

*Primary Examiner* — William Spieler
(74) *Attorney, Agent, or Firm* — Brian R. Short

(57) ABSTRACT

An embodiment includes a computer-implemented method. For one embodiment, the computer-implemented method includes displaying a plurality of first groups of words in a browser for display to a user, constructing a new combination of search terms using more than one user-selected word groups, wherein the user-selected word groups are selected by the user from the plurality of first groups of words displayed to the user; invoking a search service with the new combination of search terms, displaying results of the search service using the new combination of search terms in the browser, and storing the results in memory coupled to a processor.

12 Claims, 39 Drawing Sheets

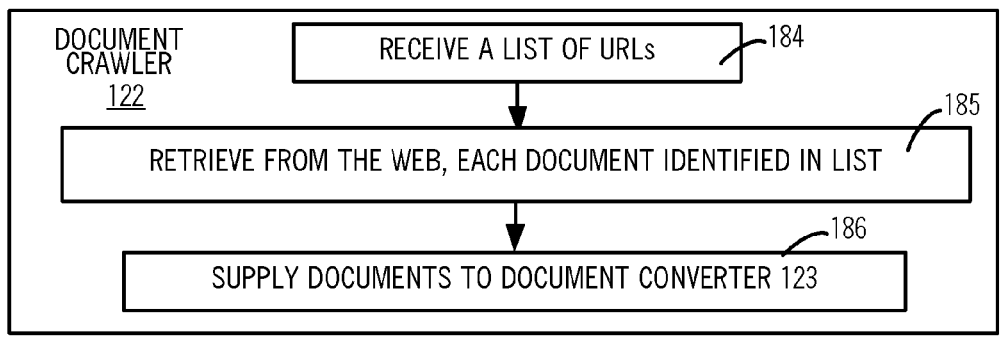
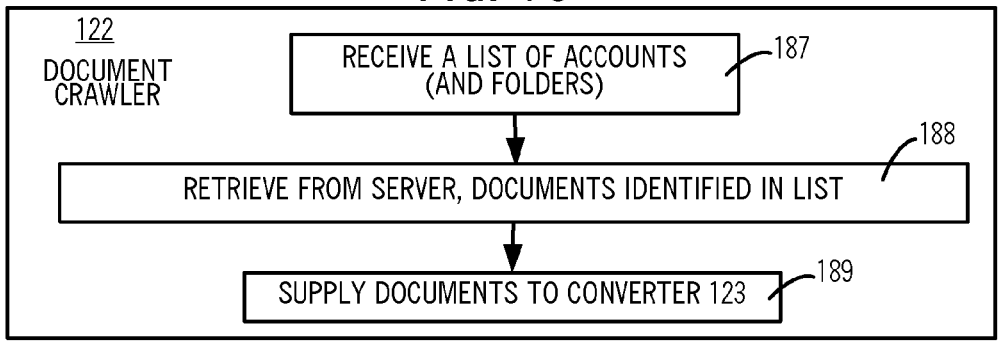
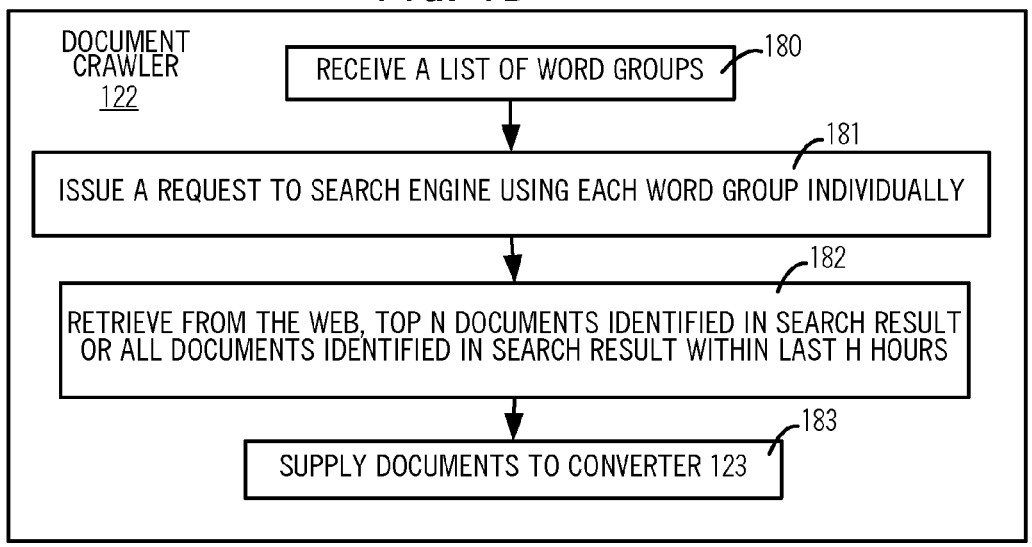

Best of the Web Today: The Opposite
[http://online.wsj.com/article/SB10001424052970204313604574327244293811138.html#mod=rss_opinion_main]

Farewell to the Mother of 'People Power'
[http://online.wsj.com/article/SB10001424052970204313604574326072439443660.html#mod=rss_opinion_main]

Pay Your Teachers Well
[http://online.wsj.com/article/SB10001424052970204619004574318393190278188.html#mod=rss_opinion_main]

Cash From Clunkers
[http://online.wsj.com/article/SB10001424052970204313604574326531645819464.html#mod=rss_opinion_main]

What's Different About the Obama Foreign Policy?
[http://online.wsj.com/article/SB10001424052970203946904574300402608475582.html#mod=rss_opinion_main]

More Cash for Clunkers?
[http://online.wsj.com/article/SB10001424052970204619004574324350084909302.html#mod=rss_opinion_main]

Conniving in the Capital
[http://online.wsj.com/article/SB10001424052970204619004574325472330385670.html#mod=rss_opinion_main]

FIG. 1H

```
                    Gmail Folder: INBOX
         Account: sri.devabhaktuni (imap.gmail.com, 993)

Emails:

Subject: NEWSCAST: Clunkers uncertainty; Dealers weigh in; July sales get boost
Date: Mon, 3 Aug 2009 21:05:44 -0000

From: "Automotive News" <autonews@e.ccialerts.com>

To: sri@devabhaktuni.us

Subject: Miles or discount? You choose!
Date: Mon, 3 Aug 2009 20:57:26 +0000

From: 1234@YAHOO.COM

To: "Devabhaktuni Srikrishna" <sri.devabhaktuni@gmail.com>

Subject: Miles or discount? You choose!
Date: Mon, 3 Aug 2009 20:00:58 +0000

From: 1234@AIRLINES.COM

To: SRI.DEVABHAKTUNI@GMAIL.COM

Subject: [ysearchboss] Digest Number 346
Date: 3 Aug 2009 18:49:00 -0000

From: ysearchboss@yahoogroups.com

To: ysearchboss@yahoogroups.com
```

FIG. 1K

| The Global <b>Nuclear</b> <b>Detection</b> Architecture: Issues for Congress <b>...</b> |
| --- |
| [http://www.stormingmedia.us/12/1275/A127584.html] |

| DIMACS/DyDAn Research Project on Sensor Management for <b>Nuclear</b> <b>Detection</b> |
| --- |
| [http://dydan.rutgers.edu/Research/Nuclear/] |

| Report Criticizes <b>Nuclear</b> <b>Detectors</b> - washingtonpost.com |
| --- |
| [http://www.washingtonpost.com/wp-dyn/content/article/2009/06/22/AR2009062202821.html] |

| Police Chief Magazine - View Article |
| --- |
| [http://policechiefmagazine.org/magazine/index.cfm?fuseaction=display_arch&article_id=1420&issue_id=22008] |

| DHS To Investigate <b>Nuclear</b> <b>Detection</b> Gaps : Homeland Security News |
| --- |
| [http://www.nationalterroralert.com/updates/2007/03/27/dhs-to-investigate-nuclear-detection-gaps/?akst_action=share-this] |

| Opening Statement Of Dr. Charles R. Gallaway Director (Acting <b>...</b> |
| --- |
| [http://appropriations.house.gov/Witness_testimony/HS/Chuck_Gallaway_04_01_09.pdf] |

| GAO: DNDO Should Improve Planning to Better Address Gaps <b>...</b> |
| --- |
| [http://aero-defense.ihs.com/news/2009/gao-dndo-nuclear-detection-031209.htm] |

| Mobile <b>Nuclear</b> Radiation <b>Detection</b> System |
| --- |
| [http://www.raytheon.com/businesses/rids/products/rtnwcm/groups/public/documents/content/rtn_bus_ids_prod_mnds.pdf] |

Since 9/11, there has been an increased concern that enemies of the US and its allies will not hesitate to consider all available means to inflict damage on national interests, both domestic and abroad. —151

| | |
|---|---|
| www.nss-mic.org/2008/Program/ProgramBook.pdf | 45 |
| www.tranceaddict.com/forums/printthread.php?threadid=169083 | 96 |
| ... | ... |

| long dwell detection | |
|---|---|
| http://online.wsj.com/xml/rss/3_7455.xml | 65, 66, 67, ... |
| sri.devabhaktuni@gmail.com/INBOX | 12, 14, 19, 44, ... |
| AUTOMATICALLY GENERATED SEARCH RESULTS FOR 'nuclear detection' | 25, 42, 41, 34, 31 |

| | |
|---|---|
| http://online.wsj.com/xml/rss/3_7455.xml | |
| [http://kyl.senate.gov/legis_center/subdocs/072706Oxford.pdf] | 66 |
| sri.devabhaktuni@gmail.com/INBOX | |
| [http://www.aaas.org/spp/rd/Forum_2006/oxford.pdf] | 19 |

—197
—198

Nationwide nuclear detection systems consisting exclusively of portals at borders (drive-thru scanning at borders, container screening) and fixed or handheld detectors in the interior (customs agents, NEST teams) will not suffice to deter nuclear terrorists who are attempting to trade, assemble, or transport highly enriched uranium (HEU) in the worldwide transportation system. Calculations of a link budget for passive detection of HEU and Plutonium (Pu) show that using emitted gamma rays and neutrons is physically limited by the sharp attenuation of its radioactivity with distance/shielding (2-4 feet or less)₁ and the time required to count a sufficient number of particles (several minutes to hours), although Pu may be easier to detect than HEU.
Even if the national border was completely covered with detectors, there is not enough time for passive detection of shielded HEU. Once across the border, terrorist vehicles carrying HEU can circumvent or pass by a network of fixed detectors in the interior for the same reasons. Transport carrying people or livestock can't be subject to active neutron or x-ray interrogation like cargo containers can be, and all types of vehicles can't be searched like air passengers are today. Many kinds of vehicles from light road vehicles to private jets to oil tankers are not screened for HEU,₂ analogous to locking the front door of a house while leaving the garage door wide open. To lock all doors of the house, available detection techniques need to be applied and combined in such a manner that they ensure uniform detection coverage across every transportation mode accessible to terrorists, thereby raising the risk that terrorists transporting HEU and Pu will be detected.

FIG. 2A showing 10 of 10 results below.

The Global Nuclear Detection Architecture: Issues for Congress
[http://www.fas.org/sgp/crs/nuke/RL34564.pdf]
Added at: 2009-07-31 14:50:04 score = -14.0833, ☑ nuclear dhs's decision, ☑ nuclear dhs's cost-benefit, ☑ nuclear dhs's cost-benefit analysis, ☑ nuclear dhs's, ☑ spectroscopic portal technology, ☑ nuclear detection office progress, ☑ detection office progress, ☐ detection portal monitor wa, ☐ portal monitor wa, ☑ dndo director vayl, Matches "*nuclear dhs's decision*" from:
    Microsoft Word - SGS Srikrishna 2007 v3 -- toc single spaced
    [http://www.devabhaktuni.us/research/RDP-paper.pdf]
    Added at: 2009-07-30 17:51:15

Also matches in: *dism.pdf*
    Also matches in: *RDP-paper.pdf*

Opening Statement Of Mr. Vayl S. Oxford Director, Domestic Nuclear
[http://kyl.senate.gov/legis_center/subdocs/072706Oxford.pdf]
Added at: 2009-07-31 14:51:42 score = -14.1, ☑ long dwell detection, ☑ dwell detection in transit, ☑ dwell detection, ☑ and homeland security july, ☑ mr vayl s, ☑ detection in transit, ☑ detection office department, ☑ nuclear detection office department, ☑ oxford director domestic, ☑ oxford director domestic nuclear, Matches "*long dwell detection*" from:
    Microsoft Word - SGS Srikrishna 2007 v3 -- toc single spaced
    [http://www.devabhaktuni.us/research/RDP-paper.pdf]
    Added at: 2009-07-30 17:51:15

Also matches in: *dism.pdf*
    Also matches in: *RDP-paper.pdf*

FIG. 2C

The Global <b>Nuclear</b> <b>Detection</b> Architecture: Issues for Congress
[http://www.fas.org/sgp/crs/nuke/RL34564.pdf]
Added at: 2009-07-31 14:50:04 score = -14.0833, ☑ nuclear dhs's decision, ☑ nuclear dhs's/cost-benefit, ☑ nuclear dhs's cost-benefit analysis, ☑ nuclear dhs's, ☑ spectroscopic portal technology,
...o advanced automated radiography system is an imaging system designed to automatically detect special nuclear material by x-ray imaging. the advanced spectroscopic portal technology has been the subject of a number of congressional hearings and government accountability office audits. see, for example, house committee on homeland...
☑ nuclear detection office progress, ☑ detection office progress, ☐ detection portal monitor wa, ☐ portal monitor wa, ☑ dndo director vayl, Matches "*nuclear dhs's decision*" from:
Microsoft Word - SGS Srikrishna 2007 v3 -- toc single spaced
[http://www.devabhaktuni.us/research/RDP-paper.pdf]
Added at: 2009-07-30 17:51:15

Also matches in: *dismn.pdf*
Also matches in: *RDP-paper.pdf*

FIG. 2D

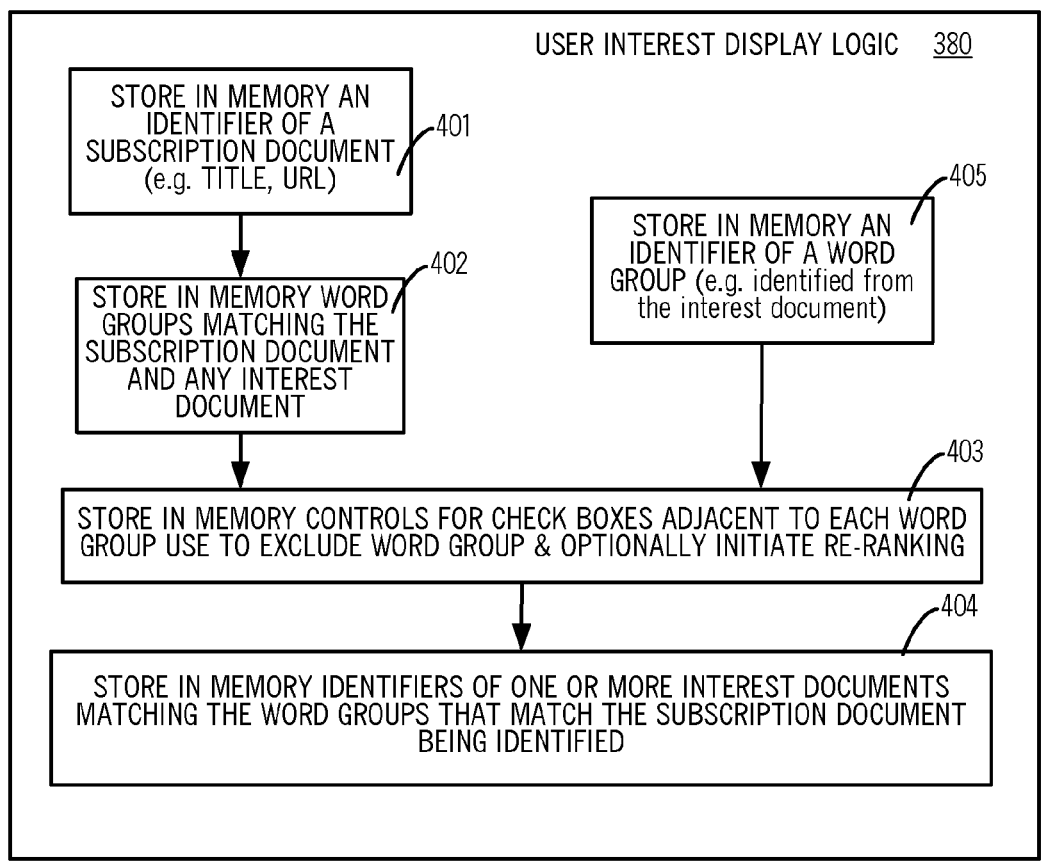
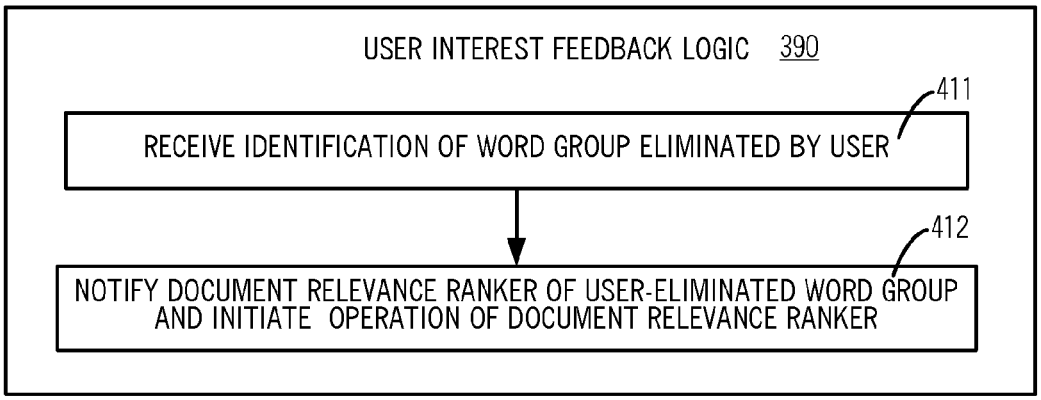

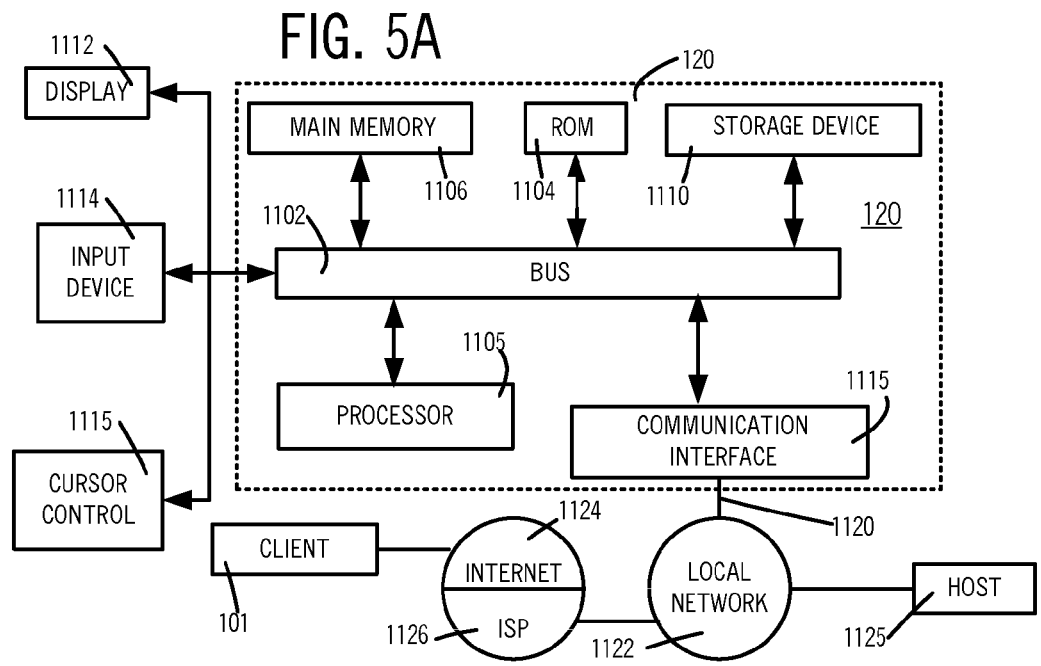
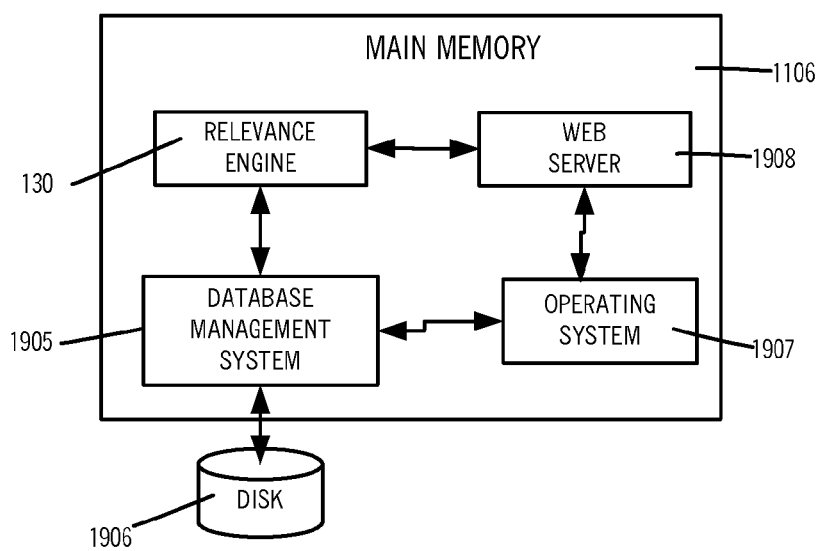

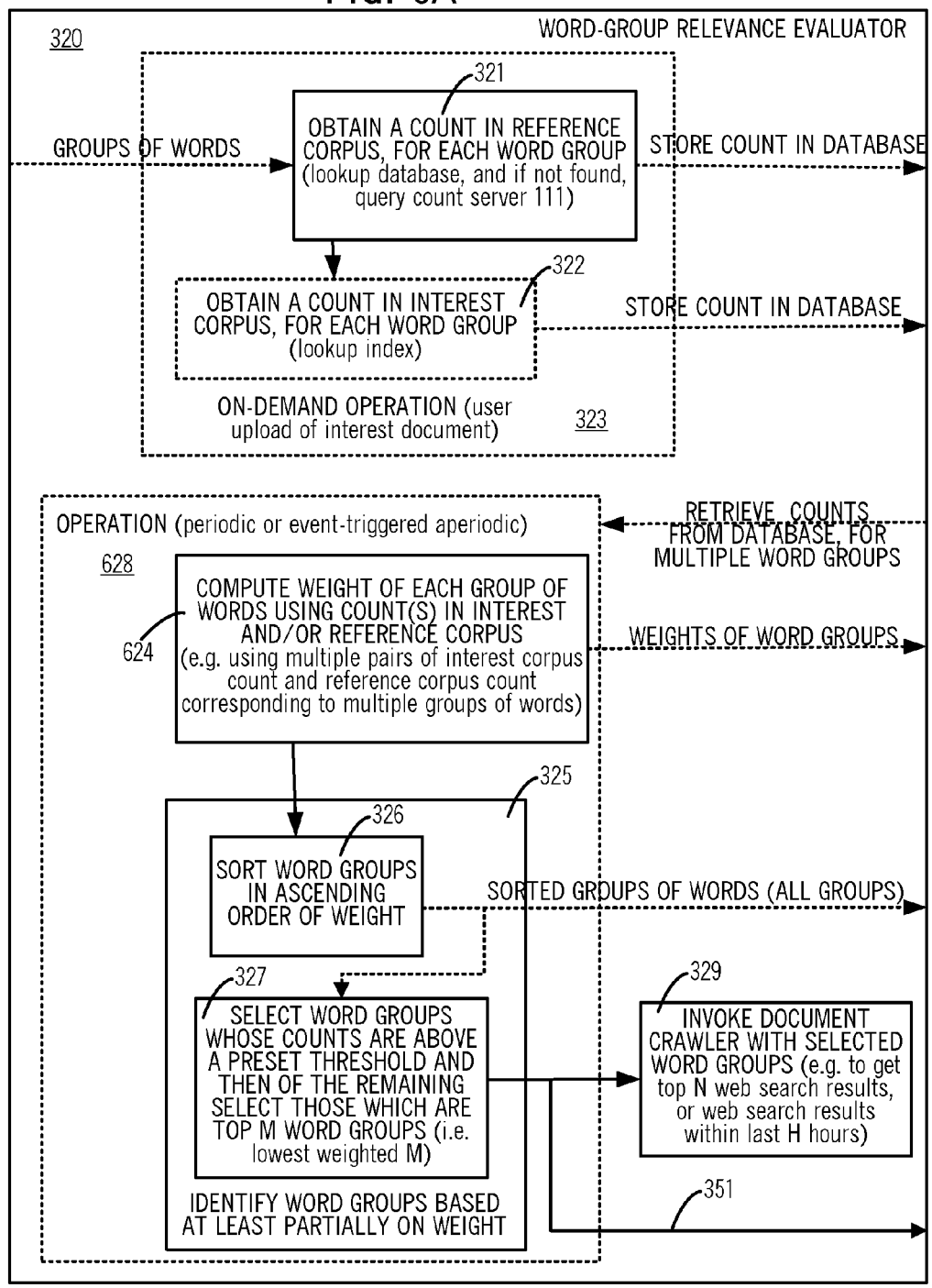

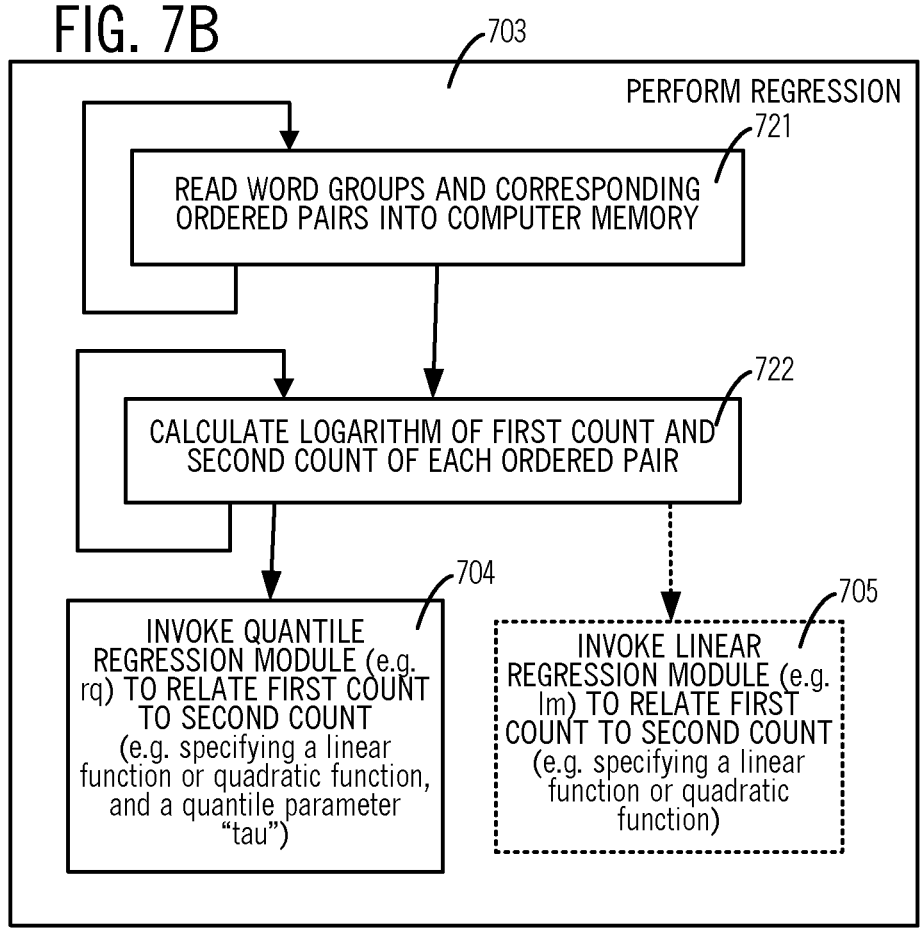

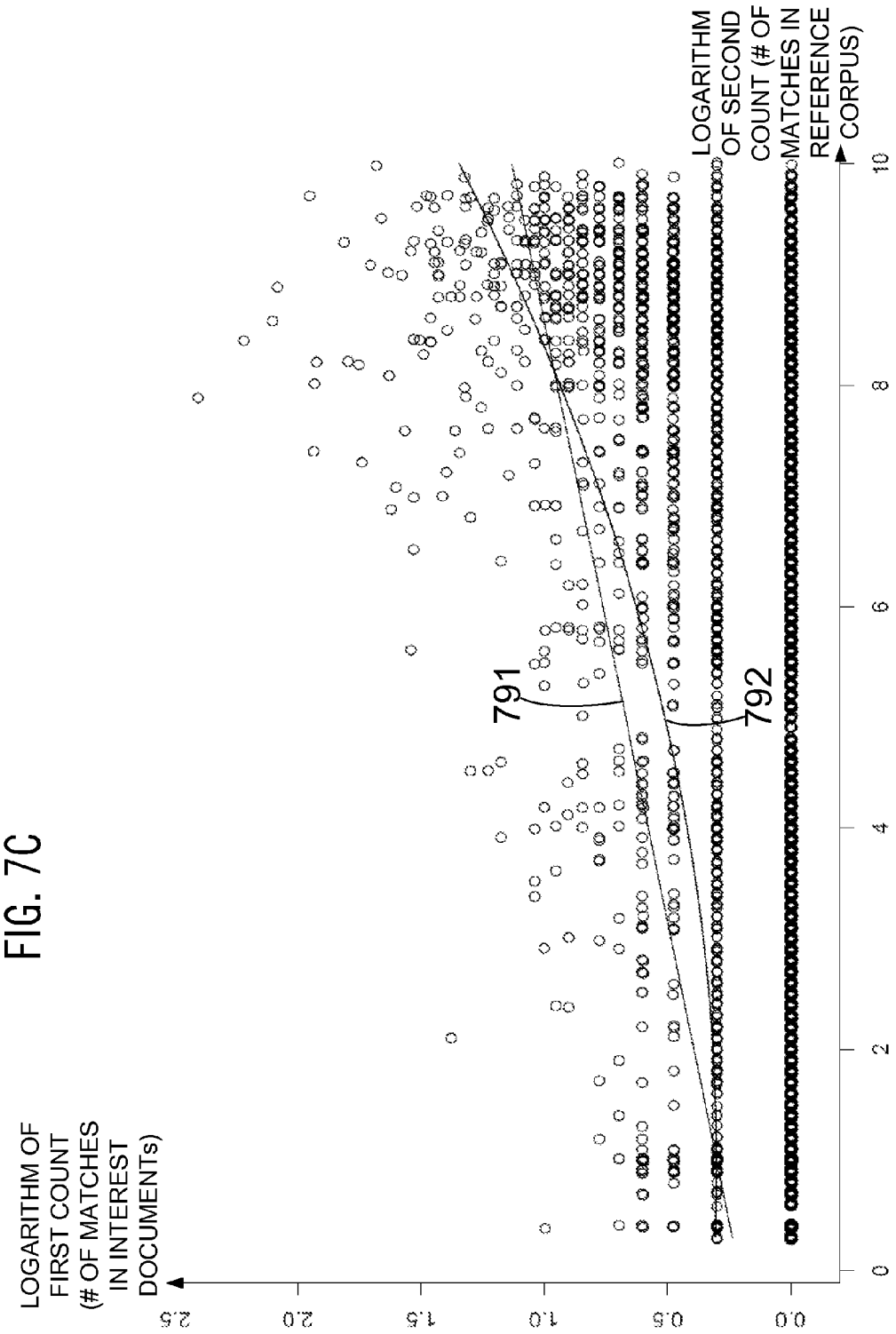

Search on google books nuclear "terrorist"

Search
clear

Google | Search | Blogs | Video | Images | YouTube |
Books | News | Patents |
Alternate | Yahoo | Oneriot | Arxiv | Crunchbase | nuclear "terrorist" on google books: 600 results

- Nuclear terrorism
  http://books.google.com/books?id=DFY6FY4aakC&
  dq=nuclear+%22terrorist%22&ie=ISO-8859-1&
  source=gbs_gdata

- Individual preparedness and response to chemical,
  radiological, nuclear, and biological terrorist attacks
  http://books.google.com/books?id=ubjLOgVeKFAC&
  dq=nuclear+%22terrorist%22&ie=ISO-8859-1&
  source=gbs_gdata

- The United States Armed Forces nuclear, biological
  and chemical survival manual
  http://books.google.com/books?id=oHc2UyLAxIIC&
  dq=nuclear+%22terrorist%22&ie=ISO-8859-1&
  source=gbs_gdata

- Emergency Care And Transportation of the Sick And
  Injured
  http://books.google.com/books?id=8Q2AlUrOGcC&
  dq=nuclear+%22terrorist%22&ie=ISO-8859-1&
  source=gbs_gdata

- Atomic audit
  http://books.google.com/books?id=6droMxlxnDwC&
  dq=nuclear+%22terrorist%22&ie=ISO-8859-1&
  source=gbs_gdata

- Technology against terrorism
  http://books.google.com/books?id=9bXKJb3BReC&
  dq=nuclear+%22terrorist%22&ie=ISO-8859-1&
  source=gbs_gdata

- National strategy for homeland security
  http://books.google.com/books?id=3vdyl-MyxeUC&
  dq=nuclear+%22terrorist%22&ie=ISO-8859-1&
  source=gbs_gdata Try any combination of these terms from "Nuclear Detection" to refine the search high
- detector
- detection
- nuclear
- vehicle
- heu
- gamma
- shield
- system
- neutron
- terrorist more...
- detect
- material
- disarm
- radiation
- distance
- checkpoint
- ray
- security
- time
- terrorism
- transport
- container
- incident
- attenuation
- reading
- inspection
- emission
- cost
- uranium
- signal medium
- in-vehicle detector
- u-238
- gamma ray
- nuclear material
- plutonium
- u-232
- mev gamma
- detection distance
- in-vehicle
- nuclear detection more...
- disarm program
- detector reading
- mev gamma ray
- 10cm lead
- mev
- detector area
- rand-mipt
- linear attenuation coefficient
- neutron emission
- weapons-grade
- linear attenuation
- instrument system
- passive detection
- attenuation coefficient
- radiation detector
- figure detection
- decay chain
- pu-239 low
- u-238 signal
- handheld hpge
- rand-mipt database
- figure detection distance
- article with radioactive
- lead shielding second
- 10cm lead shield
- heu 10cm lead
- heu 10cm lead shield
- heu 10cm more...
- mox-grade
- lead shield detector
- 10cm lead shield
- hpge handheld
- disarm proposal
- detector area detection time
- radiation instrument system
- pu-239 decay
- detector area detection
- signal 10kg heu 10cm
- pu-239 decay chain
- 10kg heu 10cm

How Likely is a Nuclear Terrorist Attack on the United States?

Discussants:
Michael A. Levi, David M. Rubenstein Senior Fellow for Energy and the Environment and Director of the Program on Energy Security and Climate Change
Graham T. Allison Updated: April 20, 2007

U.S. policymakers agree that as possible terrorist attacks go, the worst-case-scenario would involve detonation of a nuclear bomb in a major American city. This most catastrophic of scenarios provides ample fodder for the plot of television dramas, but the actual likelihood of such an event is open to debate.

Michael A. Levi CFR Fellow for Science and Technology and author of the forthcoming On Nuclear Terrorism and Graham T. Allison, director of Harvard's Belfer Center for Science and International Affairs and author of Nuclear Terrorism: The Ultimate Preventable Catastrophe, consider the odds of such a devastating attack Weigh in on this debate by emailing the editors at CFR.org. To view other online debates click here.

April 20, 2007

Graham T. Allison

We should ask ourselves every day: Are nuclear materials that could fuel a terrorist's bomb more or less secure than they were a year ago? Thanks to initiatives like the Nunn-Lugar program, highly enriched uranium and plutonium in Russia are far safer from theft today than they were in the early 1990s. But the risk that terrorists will buy or steal nuclear material from a rogue state increases as more countries acquire the ability to produce weapons-usable material. Therefore it is vitally important to roll back North Korea's nuclear program and to constrain Iran before it reaches its enrichment finish line. By becoming a nuclear-armed state, each will trigger a cascade of proliferation in its neighborhood.

*961*

Click any of these terms to see related articles that use these terms
*962*

| high | medium | low |
|---|---|---|
| • nuclear | • nuclear terrorism | • equal probability times consequence |
| • terrorist | • nuclear terrorist | |
| • terrorism | • nuclear terrorist attack | • bomb untested |
| • bomb | • terrorist group | • risk equal probability times |
| • attack | • gun-type bomb | • equal probability times |
| • failure | • manhattan project scientist | • risk equal probability |
| • percent | | |
| • chance | • fizzle | more... |
| • terrorist attack | • gun-type | |
| • percent chance | • probability times consequence | • policy remember risk equal |
| | • nuclear explosion | • full-blown nuclear plot |
| more... | | • michael levi's numbers |
| • material | more... | |
| • probability | • terrorist failure | • terrorist's ten-kiloton nuclear warhead |
| • state | • nuclear material | |
| • group | • times consequence | • terrorist's ten-kiloton |
| • weapon | • ten-kiloton | • what's happening nuclear terrorism |
| • agree | | |
| • al-qaeda | • ninety percent chance | |
| • plot | | |
| • risk | • nuclear bomb | • policy remember risk |
| • levi | • nuclear plot | |
| • prevent | • terrorist motivation | • happening nuclear terrorism |
| • american | | |
| • mass | • probability times | • midtown manhattan terrorist |
| • debate | • kiloton | |
| • report | • risk equal | |
| • nuclear weapon | • project scientist | • aircraft attack madrid |
| • likelihood | | |
| • kill | | |
| • unite | | |
| • allison | | |

| How Likely is a Nuclear Terrorist Attack on the United States?<br><br>Discussants:<br>Michael A. Levi, David M. Rubenstein Senior Fellow for Energy and the Environment and Director of the Program on Energy Security and Climate Change<br>Graham T. Allison<br><br>Updated: April 20, 2007<br><br>U.S. policymakers agree that as possible terrorist attacks go, the worst-case-scenario would involve detonation of a nuclear bomb in a major American city. This most catastrophic of scenarios provides ample fodder for the plot of television dramas, but the actual likelihood of such an event is open to debate.<br><br>Michael A. Levi CFR Fellow for Science and Technology and author of the forthcoming On Nuclear Terrorism and Graham T. Allison, director of Harvard's Belfer Center for Science and International Affairs and author of Nuclear Terrorism: The Ultimate Preventable Catastrophe, consider the odds of such a devastating attack<br><br>Weigh in on this debate by emailing the editors at CFR.org. To view other online debates click here.<br><br>April 20, 2007<br><br>Graham T. Allison<br><br>We should ask ourselves every day: Are nuclear materials that could fuel a terrorist's bomb more or less secure than they were a year ago? Thanks to initiatives like the Nunn-Lugar program, highly enriched uranium and plutonium in Russia are far safer from theft today than they were in the early 1990s. But the risk that terrorists will buy or steal nuclear material from a rogue state increases as more countries acquire the ability to produce weapons-usable material. Therefore it is vitally important to roll back North Korea's nuclear program and to constrain Iran before it reaches its enrichment finish line. By becoming a nuclear-armed state, each will trigger a cascade of proliferation in its neighborhood. | Click any of these terms to see products and services related to these terms<br>982 |||
|---|---|---|---|
| | high<br><br>• nuclear<br>• terrorist<br>• terrorism<br>• bomb<br>• attack<br>• failure<br>• percent<br>• chance<br>• terrorist attack<br>• percent chance<br><br>more...<br><br>• material<br>• probability<br>• state<br>• group<br>• weapon<br>• agree<br>• al-qaeda<br>• plot<br>• risk<br>• levi<br>• prevent<br>• american<br>• mass<br>• debate<br>• report<br>• nuclear weapon<br>• likelihood<br>• kill<br>• unite<br>• allison | medium<br><br>• nuclear terrorism<br>• nuclear terrorist<br>• nuclear terrorist attack<br>• terrorist group<br>• gun-type bomb<br>• manhattan project scientist<br>• fizzle<br>• gun-type<br>• probability times consequence<br>• nuclear explosion<br><br>more...<br><br>• terrorist failure<br>• nuclear material<br>• times consequence<br>• ten-kiloton<br>• ninety percent chance<br>• nuclear bomb<br>• nuclear plot<br>• terrorist motivation<br>• probability times<br>• kiloton<br>• risk equal<br>• project scientist | low<br><br>• equal probability times consequence<br>• bomb untested<br>• risk equal probability times<br>• equal probability times<br>• risk equal probability<br><br>more...<br><br>• policy remember risk equal<br>• full-blown nuclear plot<br>• michael levi's numbers<br>• terrorist's ten-kiloton nuclear warhead<br>• terrorist's ten-kiloton<br>• what's happening nuclear terrorism<br>• policy remember risk<br>• happening nuclear terrorism<br>• midtown manhattan terrorist<br>• aircraft attack madrid |

Sponsored Links
1.     American Nuclear Society
ANS Meeting -- Advancing Nuclear Technology for a Greater Tomorrow
www.ans.org
2.     Nuclear Weapons Policy
Independent Task Force Report on How to Reduce Nuclear Force Levels
www.cfr.org
3.     Nuclear Material
Nuclear Material Deals
Find Low Prices & Save up to 30%
mySimon.com/Nuclear+Material

FIG. 9H

Search on yahoo    901 nuclear "terrorist"

Search
clear

Google | Search | Blogs | Video | Images | YouTube | Books
| News | Patents |
Alternate | Yahoo | Oneriot | Arxiv | Crunchbase | nuclear "terrorist" on yahoo: 23600000 results  990

- Nuclear terrorism - Wikipedia, the free encyclopedia
  http://en.wikipedia.org/wiki/Nuclear_terrorism
  Nuclear terrorism denotes the use, or threat of the
  use, of nuclear ... The notion of terrorist
  organizations using nuclear weapons (especially very
  small ones, ... // nuclear terrorism // nuclear weapons
  // New York Times // radiological weapons //
  radioactive materials // Terrorism // attacks // bomb //
  Pakistan // United States // dangers // experts //
  atomic bombs // free encyclopedia // threat // nuclear
  reactor // NBC // radiological // detonation // In
  November

- Lifeboat Foundation Nuclear Terrorist: Adnan G. El
  Shukrijumah
  http://lifeboat.com/ex/nuclear.terrorist
  We would like the nuclear terrorist Adnan G. El
  Shukrijumah to be captured. ... Watch the suspected
  nuclear terrorist Adnan G. El Shukrijumah giving a
  presentation ... // Adnan G. El Shukrijumah // Terrorist
  // Lifeboat Foundation // reward // passport // Tayar //
  Al-Tayyar // video // the Lifeboat // Saudi Arabia //
  Scientific Advisory Board // 5 million // Date of Birth //
  August 4 // Hair // Place of Birth // Eyes // 5'3 // 5'6 //
  Complexion

- How Likely is a Nuclear Terrorist Attack on the
  United States ...
  http://www.cfr.org/publication/13097
  /how_likely_is_a_nuclear_terrorist_attack_on_the_united_states.html
  CFR’s Michael A. Levi and Harvard’s
  Graham T. Allison consider the likelihood of
  catastrophic nuclear terrorism in the United States //
  nuclear terrorism // terrorists // failure // nuclear
  terrorist attack // United States // CFR // bomb // plot
  // terrorist groups // risk // al-Qaeda // Michael //
  Graham T. Allison // likelihood // Islamic terrorists //
  Weapons // motivations // risk of failure // kiloton //
  attack 991                                    992

Try any combination of these terms from "Nuclear
Detection" to refine the search

|  | medium | low |
|---|---|---|
| high | • in-vehicle detector | • u-236 signal |
| • detector | • u-238 | • handheld hpge |
| • detection | • gamma ray | • rand-mipt database |
| • nuclear | • nuclear material | • figure detection distance |
| • vehicle | • plutonium | • article with radioactive |
| • heu | • u-232 | • lead shielding second |
| • gamma | • mev gamma | • 10cm lead shield |
| • shield | • detection distance | • heu 10cm lead |
| • system | • in-vehicle | • heu 10cm lead shield |
| • neutron | • nuclear detection | • heu 10cm |
| • terrorist |  |  |
|  | more... | more... |
| more... | • disarm program | • mox-grade |
| • detect | • detector reading | • lead shield detector |
| • material | • mev gamma ray | • 10cm lead shield detector |
| • disarm | • 10cm lead | • hpge handheld |
| • radiation | • mev | • disarm proposal |
| • distance | • detector area | • detector area detection time |
| • checkpoint | • rand-mipt | • radiation instrument system |
| • ray | • linear attenuation coefficient |  |
| • security | • neutron emission | • pu-239 decay |
| • time | • weapons-grade | • detector area detection |
| • terrorism | • linear attenuation | • signal 10kg heu 10cm |
| • transport | • instrument system | • pu-239 decay chain |
| • container | • passive detection | • 10kg heu 10cm |
| • incident | • attenuation coefficient | • 10kg heu |
| • attenuation | • radiation detector |  |
| • reading | • figure detection |  |
| • inspection | • decay chain |  |
| • emission | • pu-239 |  |
| • cost | • detection times |  |
| • titanium |  |  |
| • signal |  |  |

926

911        912        913

FINDING RELEVANT DOCUMENTS

RELATED APPLICATIONS

This patent application is a continuation of U.S. patent application Ser. No. 12/703,758, filed Feb. 10, 2010, having the title "Finding Relevant Documents, which is herein incorporated by reference.

BACKGROUND

There are 1.3 billion people on the web and over 100 million active websites. The Internet's universe of information and people, both published and addressed to the user is growing every day. Published content includes web pages, news sources, RSS feeds, social networking profiles, blog postings, job sites, classified ads, and other user generated content like reviews. Email (both legitimate and spam), text messages, newspapers, subscriptions, etc. are addressed directly to the user. The growth of Internet users and competition among publishers is leading to a backlog or heap of hundreds or thousands of unread email, rss, and web content in user inboxes/readers—forcing users to settle somewhere between the extremes of either reading the all the items or starting fresh (as in "email bankruptcy").

Accordingly the inventors of the current patent application believe that use of a search engine (such as BING available from Microsoft Corporation or GOOGLE available from Google Inc) is not enough, because its use is like using a fishing line, useful for finding what you want right now. The current inventors have made an invention (described in the next paragraph) that can be used more like a fishing net, to help you capture content tailored to your interests, and for which it is either painful or inefficient to repeatedly use a conventional search engine. Google Inc. offers a service called Google Alerts which are email messages of the latest relevant Google results (web, news, etc.) based on the user's choice of a query or topic. Conventional uses of Google Alerts include monitoring a developing news story, keeping current on a competitor or industry, getting the latest on a celebrity or event, keeping tabs on your favorite sports teams. However, Google Alerts requires the user to enter one or more "search terms" in order to initiate the service. Hence, relevance of documents identified by Google Alerts depends on the search term selected by the user. The current inventors believe that it is not easy for users to manually generate appropriate search terms, without using the invention as discussed below.

SUMMARY

An embodiment includes a computer-implemented method. The computer-implemented method includes automatically extracting a plurality of groups of words from a set comprising a first document, wherein each group of the plurality of groups comprises a word. The computer-implemented method further includes automatically determining a plurality of first counts of a number of times said each of the groups of words in said plurality matches said set, automatically determining a plurality of second counts of the number of times said each group of words in said plurality matches a corpus of second documents, obtaining a weight of said each group of words based on the first counts and second counts, automatically ranking based on said weight, said at least one group of words relative to another group of words in said plurality of groups, and selecting a plurality of first groups of words from the plurality of groups, based on said weights. The computer-implemented method further includes displaying the plurality of first groups of words in a browser for display to a user, constructing a new combination of search terms using more than one user-selected word groups, wherein the user-selected word groups are selected by the user from the plurality of first groups of words displayed to the user; invoking a search service with the new combination of search terms, displaying results of the search service using the new combination of search terms in the browser, and storing the results in memory coupled to a processor.

BRIEF DESCRIPTION OF THE FIGURES

FIGS. 1B, 1C, and 1D illustrate, in flow charts, operation of a document crawler in accordance with some embodiments of the invention.

FIG. 1H illustrates in computer memory of server computer 120, a list of subscription documents from an RSS feed in accordance with the invention.

FIG. 1K illustrates in computer memory of server computer 120, a list of subscription documents from an email folder in accordance with the invention.

FIG. 1L illustrates in computer memory of server computer 120, a list of subscription documents from an automatically generated search in accordance with the invention.

FIG. 1M illustrates in computer memory of server computer 120, a subscription document and identifiers of documents that contain hyperlinks to the subscription document in accordance with the invention.

FIG. 1N illustrates, in computer memory of server computer 120, data input to the match API block 126 in FIG. 1A in accordance with the invention.

FIG. 1O illustrates, in computer memory of server computer 120, the data output by the match API block 126 in FIG. 1A in accordance with the invention.

FIG. 2A illustrates, in computer memory of server computer 120, an illustrative interest document and word groups therein that have been automatically identified in accordance with the invention.

FIG. 2C illustrates a display of ranked subscription documents, matching word groups, and matching interest documents in accordance with the invention.

FIG. 2D illustrates display of a snippet of a word group appearing in a ranked subscription document in accordance with the invention.

FIG. 4A is a block diagram of user-interest display logic in accordance with the invention.

FIG. 4B is a block diagram of user interest feedback logic in accordance with the invention.

FIGS. 5A and 5B illustrate, in block diagrams, hardware and software portions of a server computer 120 in accordance with the invention.

FIGS. 6A and 6B illustrate, in flow charts, two alternative embodiments of the word-group relevance evaluator illustrated in FIG. 3C.

FIG. 7B illustrates, in a flow chart, acts to perform regression analysis 703 in FIG. 7A.

FIG. 7C illustrates, in a graph, fitting of a function to pairs of first count and second count in accordance with the invention.

FIGS. 9A-9H illustrate screens displayed to a user in some embodiments of the invention.

DETAILED DESCRIPTION

Figure 1A:
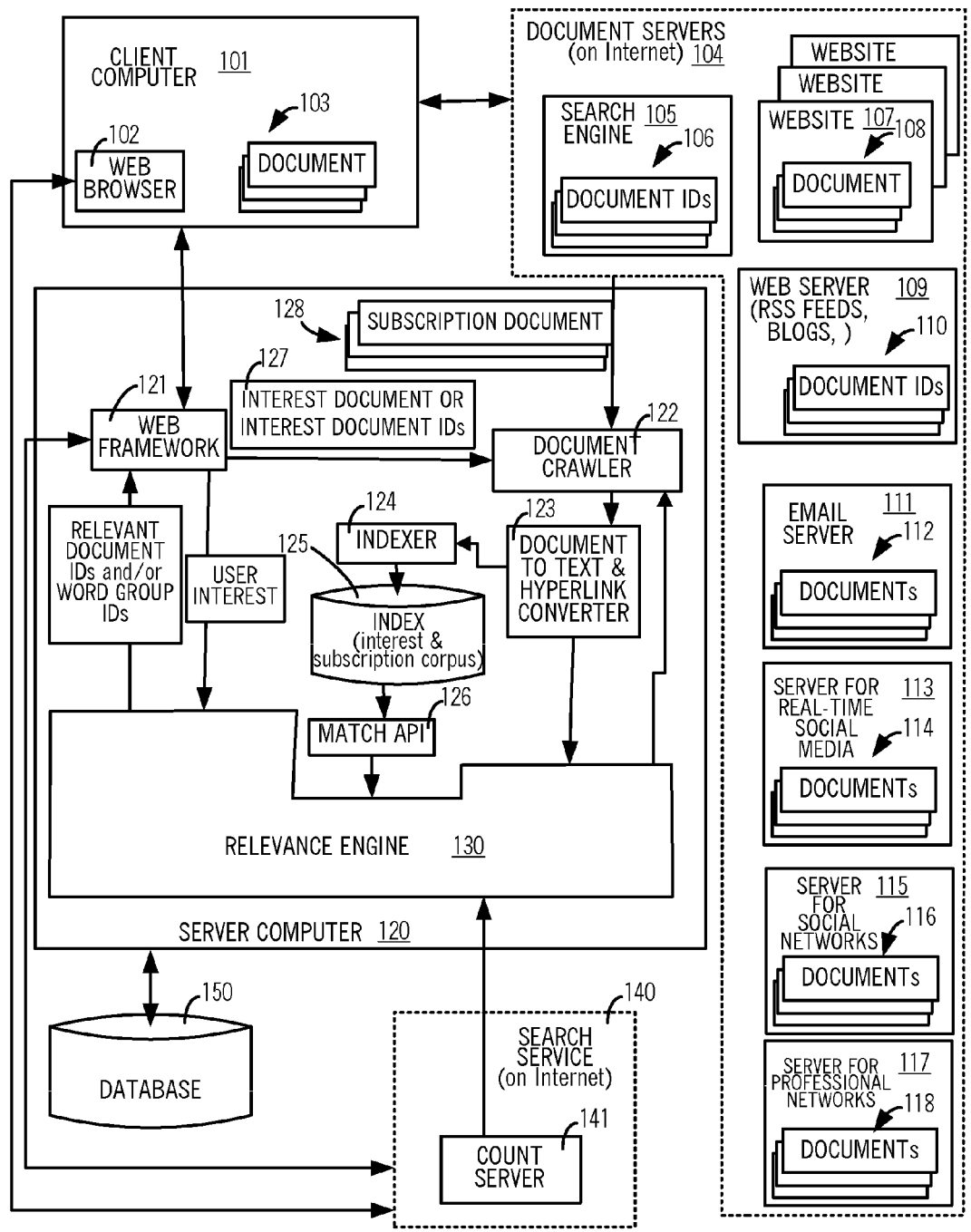
FIG. 1A illustrates, in a block diagram, software architecture of one embodiment of the present invention

One or more computers are programmed in accordance with the invention to implement a particular machine that receives as input one or more documents that contain text that is relevant to a user ("interest documents"). As used herein the term "document" includes, but is not limited to any file stored in a computer-readable storage medium and from which text can be extracted and displayed to a user, such as a file produced by a word processor (e.g. an RTF file or an HTM file by Microsoft WORD), a file in a portable document format (PDF by e.g. Adobe ACROBAT), a file containing text in ASCII format (e.g. Microsoft NOTEPAD), a file produced by an audio editing program (e.g. a "WAV" file by Audacity), a file produced by an image editing program (e.g. a "JPG file" by Adobe PHOTOSHOP), a file produced by scanning a physical book, a file produced by typesetting a book, a magazine, or article by a publisher.

The computer(s) use the interest document(s) to automatically identify word groups that are then used in computerized filtering of documents in accordance with the invention. One illustrative embodiment of the just-described particular machine is illustrated by a server computer 120 (FIG. 1A) that communicates with a client computer 101, e.g. through the Internet. Although two computers 120 and 101 are used in several embodiments, certain other embodiments a single computer is used, while still other embodiments use more than two computers as will be apparent from this detailed description.

Unless otherwise described below, a user operates client computer 101 in the normal manner. For example, the user may use web browser 102 to conduct a search on the Internet, via a search engine 105 that returns identifiers 106 of documents that are responsive to the user's search terms. The user may then use computer 101 to retrieve one or more documents 103 from the Internet, e.g. obtain a copy of a document 108 from a website 107 in the normal manner. Additionally, the user may use computer 101 to access a web server 109 to subscribe to an RSS Feed to obtain document identifiers 110, and or read blogs thereon. The user may also use computer 101 to obtain email messages in the form of documents 112 from an email server 111. In a similar manner, the user may use computer 101 to obtain documents 114 that contain real-time social media, such as Tweets supplied by server 113 executing Twitter software. Also, the user may use computer 101 to obtain documents 116 that contain social networking profiles supplied by server 115 (e.g. at the website Facebook). Additionally, the user may use computer 101 to obtain from sever 117, one or more documents 118 containing professional networking profiles (e.g. on Linked-in).

Server computer 120 typically includes a web framework 121 that interacts with a web browser 102 in client computer 101, to supply thereto one or more web pages, e.g. in Hyper Text Markup Language (HTML) and/or word groups. In some embodiments, several of the web pages supplied by web framework 121 contain one or more identifiers of documents that have been determined to be relevant to the user by software program instructions 130 ("relevance engine") stored in a memory 1106 of server computer 120 and executed by a processor 1105 illustrated in FIG. 5A. In some embodiments, relevance engine 130 provides a list of a predetermined number most relevant documents (e.g. 10 most relevant documents) to web framework 121. In certain variants of the just-described embodiments, relevance engine 130 groups similar documents and provides only one document identifier from the group although the single document identifier is provided in association with a hyperlink to remaining document identifiers in the group, and in this manner relevance engine 130 provides different but relevant document identifiers of the predetermined number (e.g. 10) in the list.

Depending on the embodiment, instead of or in addition to supplying identifiers of documents, relevance engine 130 supplies identifiers of one or more word groups to web framework 121, as illustrated in FIG. 1A. In certain embodiments, web framework 121 in turn supplies to client computer 101, the one or more word groups identified by the relevance engine 130. In some embodiments, relevance engine 130 only supplies a ranked list of word groups to web framework 121 that in turn uses one or more highest word groups to query search service 140 to generate a list of document identifiers that are then supplied to web browser 102, In a few embodiments, a web browser plug-in directly retrieves web pages and interfaces with web framework 121 to obtain and display a a list of word groups for each web page currently being displayed by web browser 102. In one illustrative example, a web browser 102 displays the one or more word groups received from web framework 121 with or without a list of document identifiers. The word groups may be displayed by browser 102 with a control that is selectable by a user, e.g. as a hyperlink that when clicked causes the web browser 102 to display additional information selected based on the user-clicked word group. The additional information can be, for example, a list of document identifiers obtained by web browser 102 directly querying search service 140, e.g. using one or more word groups selected by the user.

In FIG. 1A, although content in the text of documents 108, 112, 114, 116 and 118 and documents identified by identifiers 110 is different relative to one another in terms of the subject matter, one or more such documents are also obtained by server computer 120 executing software 122 ("document crawler"), e.g. for use in determining relevance thereof by relevance engine 130. Specifically, document crawler 122 in server computer 120 of some embodiments fetches documents (or identifiers thereof) that are identified as being of interest to the user ("interest documents"), or documents that have been identified as potentially being of interest but requiring filtering ("subscription documents"). Interest documents and/or subscription documents may be identified manually by the user or automatically by a computer or some combination thereof depending on the embodiment.

In some embodiments ("A"), an interest document 127 (or a document identifier) is uploaded by a user via client computer 101, and subscription documents 128 are retrieved by document crawler 122 based on instructions thereto as described below. In other embodiments ("B"), a user submits as an interest document, a description of a job for which a person needs to be hired. In still other embodiments ("C"), a faculty member at a university submits as an interest document, a paper written by the faculty member.

Figure 1E:
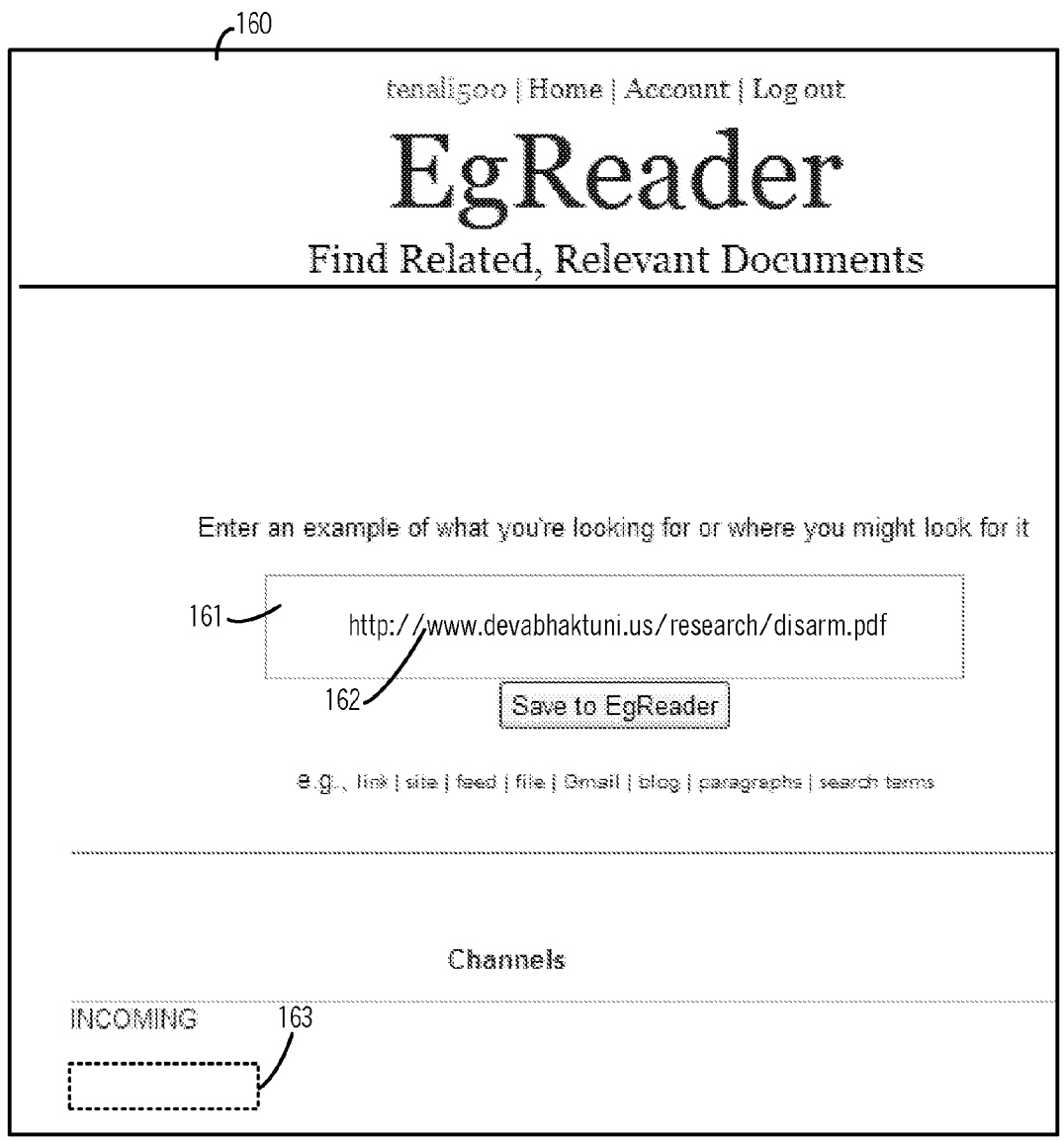
FIG. 1E illustrates a web page document in computer memory of server computer 120 to be displayed to a user for inputting interest documents in accordance with the invention.
Figure 1F:
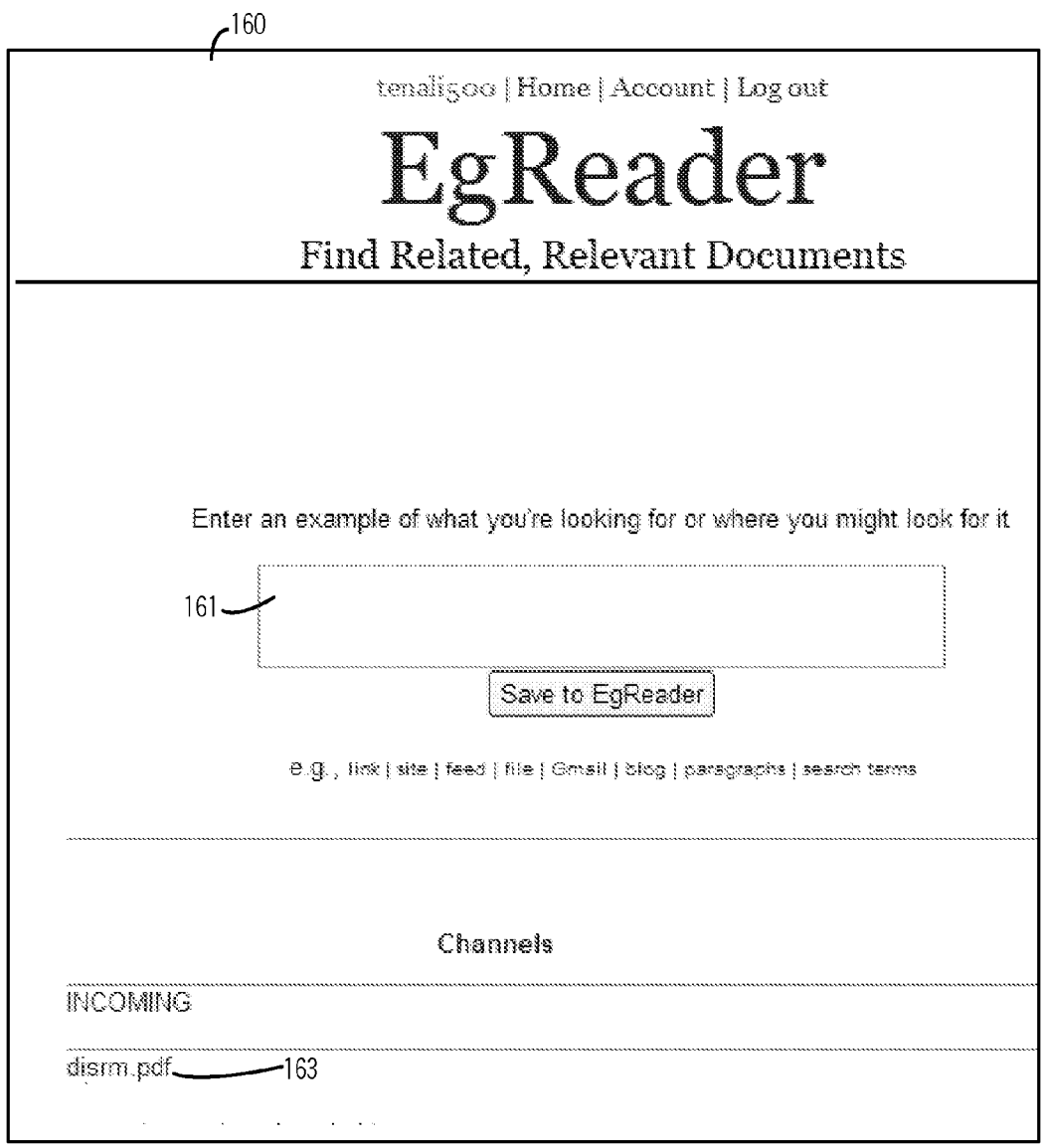
FIG. 1F illustrates the web page of FIG. 1E after an interest document has been input in accordance with the invention.

Although in some embodiments, interest document 127 is explicitly identified by a user (e.g. in input box 161 as described in the next paragraph, in reference to FIG. 1F), in other embodiments the identity of interest document 127 is automatically identified by a computer without requiring any input from the user. Automatic identification of the interest document can be performed, for example, by user's computer 101 (e.g. programmed in web browser 102, or in a plugin therein), or server computer 120 (e.g. programmed in web framework 121 or in a widget therein), or document server 104 (e.g. programmed in any sequence of instructions identified by 105, 108, 109, 111, 113, 115 and 117 in FIG. 1A).

In one embodiment ("D"), a web page that is currently displayed in web browser 102 is automatically identified by one of computers 101, 120, 104 as an interest document for the user of web browser 102. In another illustrative embodiment ("E"), one or more documents identified by corresponding hyperlinks in the web page currently displayed in web browser 102 are automatically identified by one of computers 101, 120, 104 as the interest document(s) for the user of web browser 102. In a still another embodiment ("F"), one or more documents identified as search results (e.g. by corresponding hyperlinks, titles and/or snippets) in the web page currently displayed in web browser 102 are automatically identified by one of computers 101, 120, 104 as the interest document(s) for the user of web browser 102. In yet another illustrative embodiment ("G"), a running transcription of an audio or video that is currently being played by computer 101 (e.g. in web browser 102) is automatically identified by one of computers 101, 120, 104 as an interest document for the user of web browser 102.

In one more illustrative embodiment ("H"), one or more books or documents described (e.g. by title and author) in the web page currently displayed in web browser 102 are automatically identified by computer 101 as the interest document(s) for the user of web browser 102. In another embodiment ("I"), a text transcript of an audio recording or audio stream or a video recording or a video stream is used as an interest document. Such a text transcript is generated in some embodiments (e.g. "G" and "I" described above) by text-to-speech recognition by a suitably programmed computer. Note that in the embodiments ("A"-"I") described above, the interest documents may or may not be identified using a uniform resource locator (URL), depending on the implementation. For example although a URL is used in some implementations, in certain implementations a proprietary identifier is used to automatically identify the interest document.

The following TABLE 1 summarizes inputs in various embodiments.

| ILLUSTRATIVE USE CASES | INTEREST DOCUMENT(s) | SUBSCRIPTION CORPUS | REFERENCE CORPUS |
|---|---|---|---|
| Embodiment "A" | User-supplied document (e.g. 161, 162 in FIG. 1E and 127 in FIG. 1A) | User-identified corpus of documents (such as emails, RSS feeds, e.g. 165 in FIG. 1G to FIG. 1O) | World wide web (e.g. 141 in FIG. 1A) |
| Embodiment "B" (head hunter) | Job Description(e.g. 161, 162 in FIG. 1E and 127 in FIG. 1A) | Resumes (e.g. 117, 118 in FIG. 1A) | Resumes (e.g. 117, 118 in FIG. 1A) |
| Embodiment "C" (university researcher) | Research paper (e.g. 161, 162 in FIG. 1E and 107, 108 in FIG. 1A) | Journal articles in archive ARXIV (e.g. 128 in FIG. 1A) | World wide web (e.g. 141 in FIG. 1A) |
| Embodiment "D" (web surfing) | Web page currently displayed by web browser (e.g. 103 in FIG. 8B, FIG. 9E) | World wide web (e.g. 140 in FIG. 8B) | World wide web (e.g. 140 in FIG. 8B) |
| Embodiment "E" | Documents identified by hyper links currently displayed in a webpage by web browser | World wide web (e.g. 140 in FIG. 8B) | World wide web (e.g. 140 in FIG. 8B) |
| Embodiment "F" | Documents identified as search results currently displayed by web browser in response to a user's search (see FIG. 9H) | World wide web (e.g. 140 in FIG. 8B) | World wide web (e.g. 140 in FIG. 8B) |

-continued

| ILLUSTRATIVE USE CASES | INTEREST DOCUMENT(s) | SUBSCRIPTION CORPUS | REFERENCE CORPUS |
|---|---|---|---|
| Embodiment "G" | Running transcription of audio/video currently being played in web browser | Set of advertisements (e.g. see FIG. 9G and 840, 841 in FIG. 8B) | World wide web (e.g. 140 in FIG. 8B) |
| Embodiment "H" (On-line Retailer) | Book description currently displayed by web browser (e.g. 103 in FIG. 8A, FIG. 9C, FIG. 9D) | Books available for sale (by an on-line retailer such as Amazon, e.g. 108 in FIG. 8A, FIG. 9C, FIG. 9D) | World wide web (e.g. 141 in FIG. 8A) |
| Embodiment "I" | Existing transcript of pre-recorded audio/video (e.g. 103 in FIG. 8B) | Transcripts of other audios/videos available for viewing | World wide web (e.g. 140 in FIG. 8B) |
| Embodiment "K" (Advertisement Server) | Web page currently displayed by web browser (e.g. 103 in FIG. 8B, see FIG. 9F) | Set of advertisements (e.g. 840 in FIG. 8B, see FIG. 9G) | Set of advertisements (e.g. 840 in FIG. 8B, see FIG. 9G) |
| Embodiment "L" (Advertisement Server) | Web page currently displayed by web browser (e.g. 103 in FIG. 8B, see FIG. 9F) | Set of advertisements (e.g. 840 in FIG. 8B, see FIG. 9G) | World wide web (e.g. 140 in FIG. 8B) |
| Medical Research Server | User-supplied medical article (see 161, 162 in FIG. 1E) | Journal articles in a subspeciality of Medicine | Journal articles in all of Medicine |
| Social Networking | User profile on social networking website | User Profiles (e.g. 115, 116 in FIG. 1A) | User Profiles (e.g. 115, 116 in FIG. 1A) |
| On-line Retailer | Book description currently displayed by web browser (e.g. 103 in FIG. 8A, FIG. 9C, FIG. 9D) | Books available for sale (by an on-line retailer such as Amazon, e.g. 108 in FIG. 8A, FIG. 9C, FIG. 9D) | Books available for sale (by an on-line retailer such as Amazon, e.g. 108 in FIG. 8A, FIG. 9C, FIG. 9D) |

Search results used and/or displayed in one or more of the embodiments described herein are obtained automatically by any of computers 101, 120 and 104 using a search service 140 available on the Internet. Accordingly, for a given word group, the search results and the number of occurrences on the web for the given word group are obtained in one embodiment by using the search service Yahoo-BOSS API (which is an example of search service 140) as described in reference to "resultset_web", "totalhits" and "deephits" in Yahoo-BOSS API Guide available over the Internet at the link obtained by replacing "%" with "/" and replacing "=" with "." in the following string: http:%%developer=yahoo=com%search%boss%boss_guide%ch02s02=html. An example, of output received by computer 120 from the search service Yahoo-BOSS shown below, is retrieved from the Internet at the link obtained by replacing "%" with "/" and replacing "=" with "." in the following string:

```
http:%%developer=yahoo=com%search %boss%boss_guide%Web_Search=html
    <ysearchresponse responsecode="200">
    <nextpage><![CDATA[/ysearch/web/v1/foo?appid={yourBOSSappid}&format=xm
    l&start=10]]></nextpage>
        
            <result>
                <abstract><![CDATA[World <b>soccer</b> coverage
                    from ESPN, including Premiership, Serie A, La Liga, and Major League
                    <b>Soccer</b>. Get news headlines, live scores, stats, and
                    tournament information.]]></abstract>
                <date>2008/06/08</date>
                <dispurl><![CDATA[www.<b>soccernet.com</b>]]></dispurl>
                <clickurl>http://us.lrd.yahoo.com/_ylc=X3oDMTFkNXVldGJyBGFwcGlkA2Jvc3Nk
```

-continued

```
ZW1vBHBvcwMwBHNlcnZpY2UDWVNIYXJjaARzcmNwdmlkAw--
     /SIG=10u3e8260/**http%3A//www.soccernet.com/</clickurl>
   <size>94650</size>
   <title>ESPN Soccernet</title>
   <url>http://www.soccernet.com/</url>
 </result>
 
</ysearchresponse>
```

Although an illustrative embodiment uses the Yahoo-BOSS service as described above, other embodiments may use other such services, e.g. MICROSOFT, GOOGLE, ONERIOT.

As illustrated in FIG. 1B, in response to a list of URLs received in an act 184, document crawler 122 retrieves from the world wide web, each document identified in the list in an act 185. Depending on the embodiment, the list of one or more URLs may be generated by server computer 120 in different ways as noted above, e.g. executing web framework software 121 to generate and transmit to web browser 102, an HTML web page 160 (FIG. 1E) that prompts a user to input one or more document identifier(s) 162 (such as a URL) in an input box 161. In response to receipt of the user-supplied document identifier(s) 162, web framework 121 stores the document identifier(s) in a database 150 (stored in a storage device, such as a hard disk), and thereafter re-generates web page 160 as illustrated by file name 163 shown in FIG. 1F, to notify the user that the URL of document 163 has been stored by server computer 120.

Depending on the operation being performed by server computer 120, the documents being fetched by document crawler 122 may be either interest documents for use by relevance engine 130 in automatically identifying word groups, or subscription documents 128 for use by relevance engine 130 in determining relevance thereof, based on word groups automatically identified from the interest document(s). An interest document 127 used by relevance engine 130 can be, for example, a research paper, or an article that the user wrote or any document that the user thinks is highly relevant. As noted above, an interest document 127 (FIG. 1A) can be supplied or identified to server computer 120 manually, for example by the user uploading one of documents 103 or typing a hyperlink to a document 108 published on a website 107 on the World Wide Web. Alternatively, server computer 120 may use document crawler 122 to automatically identify one or more interest documents, e.g. by initiating a search on the World Wide Web for documents 108 that have been published by the user, via a search engine 105 (e.g. by searching a URL of a blog, or a company, identified by the user). In other alternative embodiments, interest document(s) can be determined automatically as described above in an earlier paragraph, specifically in reference to the six ("D"-"I") embodiments.

Figure 1G:
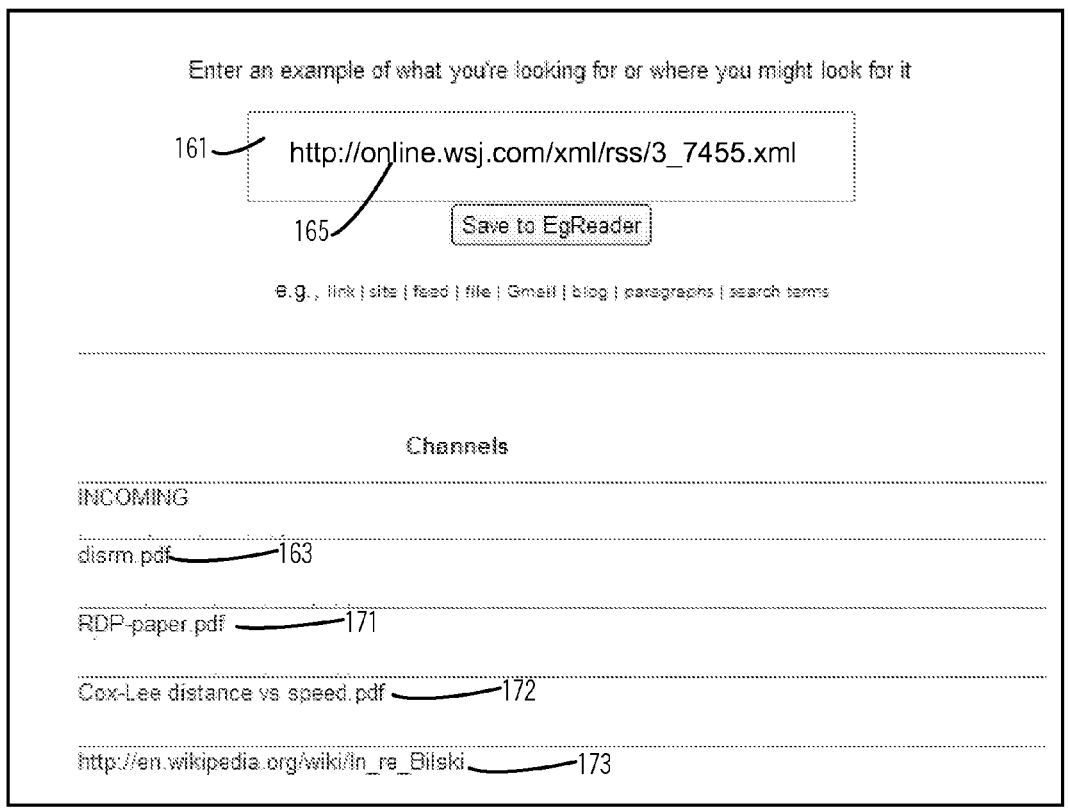
FIG. 1G illustrates a web page document in computer memory of server computer 120 to be displayed to a user for inputting subscription documents from an RSS feed in accordance with the invention.

In one embodiment, subscription documents are identified in one or more streams that are preselected by a user, as illustrated in FIG. 1G. Specifically, a user may enter into the input box 161 described above, a URL 165 of an RSS feed. In response, server computer 120 executes document crawler 122 to automatically retrieve the documents identified in the RSS feed, which form subscription documents 128 (FIG. 1H) that are to be filtered. Note that the web page shown in FIG. 1G displays multiple documents 171-173 that the user has identified to the server computer 120. In several embodiments, the multiple documents 171-173 are all interest documents which are in addition to interest document 162. In another embodiment, the subscription documents are identified (either manually by the user or automatically by one of computers 101, 120 and 104) to be a set of all documents available on the entire world wide web.

In yet another embodiment, the subscription documents are automatically identified to be any subset of the documents available on the world wide web. In a first example, documents available at a predetermined website, such as the Wall Street Journal are identified as the subscription documents. In a second example, documents available in a proprietary database, such as all books available for sale on Amazon are identified as the subscription documents. In a third example, documents available at a predetermined website, such as the ARXIV are identified as the subscription documents. In a fourth example, a set of documents containing advertisements are identified as the subscription documents in another embodiment ("J").

Figure 1I:
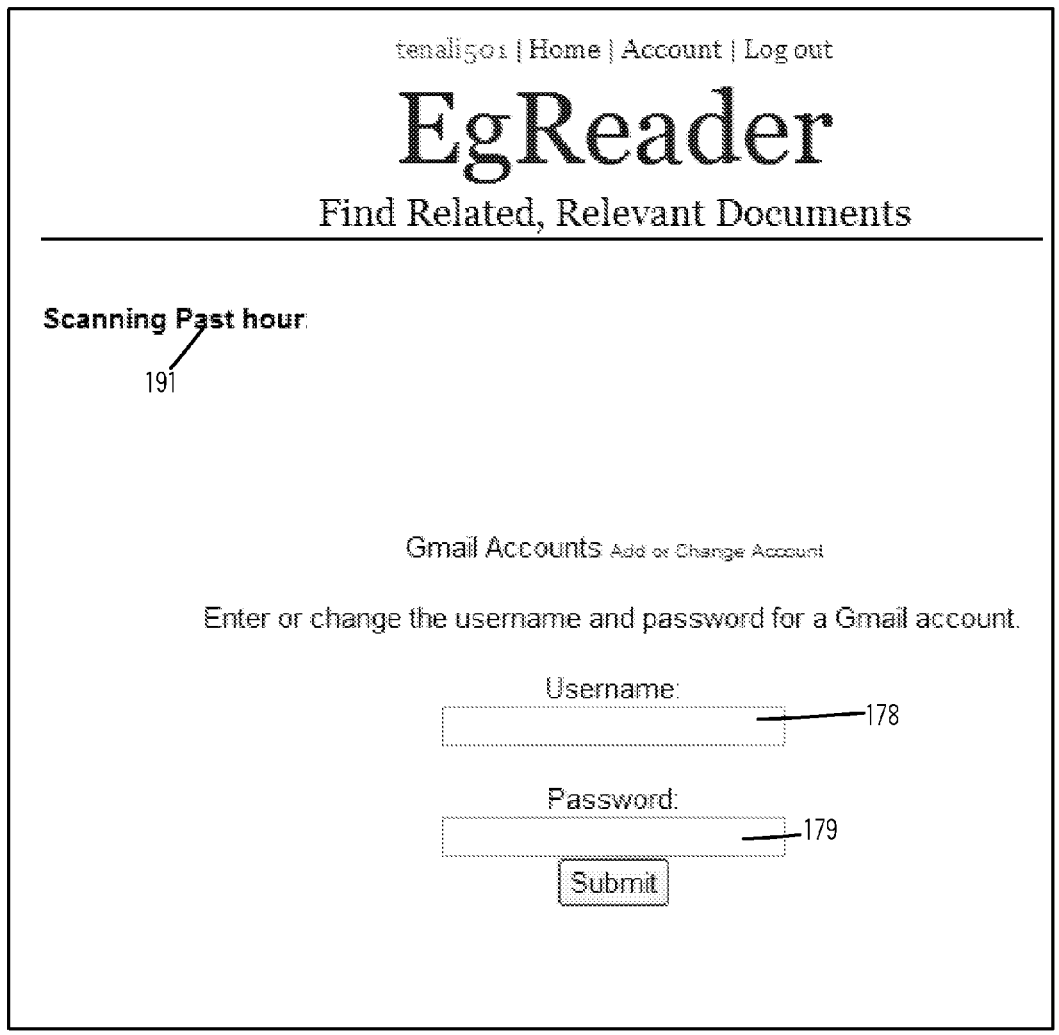
FIG. 1I illustrates a web page document in computer memory of server computer 120 to be displayed to a user for inputting an email account username and password to obtain subscription documents, in accordance with the invention.
Figure 1J:
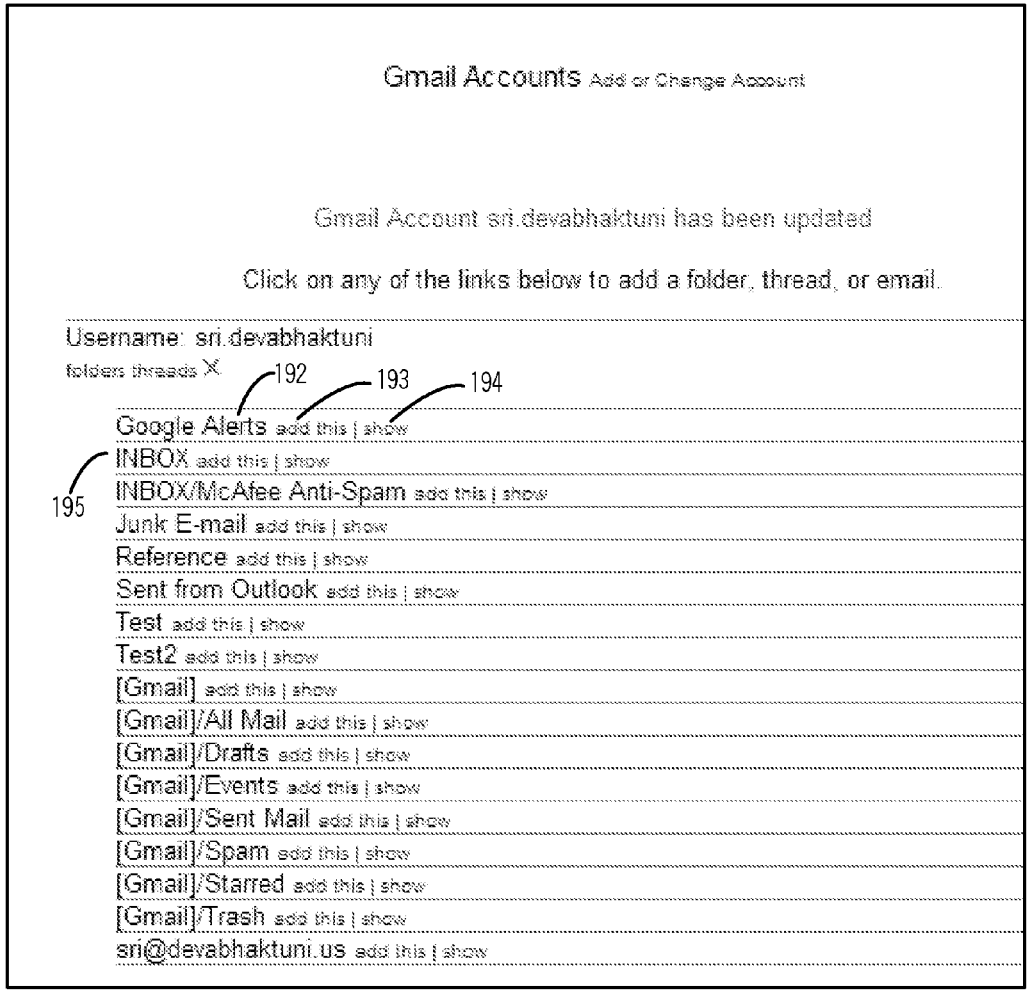
FIG. 1J illustrates in computer memory of server computer 120, a list of email folders which may be selected by the user as containing subscription documents in accordance with the invention.

Depending on the embodiment, subscription documents are either identified via input box 161 of FIG. 1G or alternatively in another user interface of the type illustrated in FIG. 1I. Specifically, in the web page illustrated in FIG. 1I, the user supplies a user name or an email address in input box 178 and the password 179 (to be used to log into an email server). In response, server computer 120 executes web framework software 121 to request the user to identify a specific folder, such as folder 192 labeled in FIG. 1I as "Google Alerts" by clicking on hyperlink 193 (FIG. 1J) labeled as "add this." Hence, server computer 120 logs into the email server, using the user's email address and password, and then automatically uses email messages of the type shown in FIG. 1K identified in the email box feed as subscription documents that are to be filtered. Some embodiments use an interface of the type just-described (or even the same interface) to enable a user to identify to server computer 120 a folder of emails as a source of interest documents instead of or in addition to subscription documents.

Although individual screens are not further illustrated in the attached figures, as would be readily apparent from this current detailed description of the invention, subscription documents in several embodiments may include blogs or blog posts, incoming email or email folders, RSS feeds from websites or news sites, web search results bounded in a specified time (past hour, past day, past week, past month, past year, and all results), documents (links) or profiles appearing in social networks (Facebook, Linked-in) and real-time social media (Twitter). In another embodiment, the subscription corpus includes search results (or RSS feeds) queries using automatically selected word groups from a list of interest documents, independent of the user selection.

In addition to storing the user-supplied URL, web framework 121 invokes document crawler 122 with the user-supplied document identifier(s) 162. In response to receipt of a user-uploaded document, web framework 121 passes the received document to the document crawler 122 that in turn directly invokes document to text & hyperlink converter 123. As noted above, in response document crawler 122 uses the document identifier(s) 162 to retrieve the identified document(s). Thereafter, document crawler 122 supplies the retrieved documents to server computer 120 executing software 123 ("document to text & hyperlink converter" or "document converter"), described next.

Document to text & hyperlink converter 123 generates and stores in computer memory, text and hyperlinks from original documents 108, 112, 114, 116 and 118 which may be originally in one of several document formats such as HTML, PDF, Microsoft WORD, PostScript, or plain text etc. In several embodiments, all documents are converted into an intermediate format, on which multiple tools of server computer 120 operate. In one illustrative embodiment, the intermediate format used by server computer 120 is HTML, and all documents not in HTML are first converted to HTML. For example, PDF documents are converted by server computer 120 to HTML using a tool called pdftohtml invoked with options '-q', '-i', '-nodrm', '-noframes', '-stdout'. The tool pdftohtml is available on the Internet, at the website address obtained by replacing "%" with "/" and replacing "=" with "." in the following string: http:%%poppler=freedesktop=org%. For information on the just-described pdf2html tool, see the documentation "pdftohtml version 0.10.7" incorporated by reference herein in its entirety.

In another illustrative embodiment, the intermediate format is XML. Some embodiments avoid misleadingly high counts for word groups contained in page headers of a single document, by server computer 120 checking if the number of times an identical line (containing a specific word group) appears in a document is more than a predetermined number, such as 4 or 5 and if so discarding redundant lines (found to be identical) from the text generated as output by document to text & hyperlink converter 123.

Once a document is in the intermediate (e.g. HTML or XML) format, the text and hyperlinks are extracted in some embodiments by server computer 120 using an HTML and/or XML parser to locate and extract text from elements of the document tree (Document Object Model). Some elements containing non-text are identified by server computer 120 based on the name of the surrounding HTML and XML tags, e.g. by use of another tool called BeautifulSoup available at the website address obtained from the following string in the above-described manner: http:%%www=crummy=com%software%BeautifulSoup%documentation=html. Documentation on the just-described tool from this website is incorporated by reference herein in its entirety.

Several HTML/XML tags in a document are ignored by server computer 120 in some embodiments of the invention. In several embodiments, server computer 120 is programmed to review attributes of the tag <div> in an HTML document to check if any one of the following character strings (regardless of whether upper case or lower case) is present as a value of any <div> attribute, and if so the tagged section is ignored: hide, hidden, poll, comment, header, footer, extra, noscript, script, style, option, col4wide margin-left, reallywide clearleft, masterVideoCenter hidden, printSummary.

In addition to specific tag names, a text-to-tag ratio (TTR) is used in some embodiments of document to text & hyperlink converter 123 to extract from within a HTML document, the text of its body (discarding its advertisements and its headers), etc. Specifically, several of the just-described embodiments of server computer 120 remove script and remark tags as well as empty lines from the HTML document and then compute a ratio of a count of non-HTML-tag characters that are ASCII in a line of text, to a count of HTML-tags in that line, unless the count of HTML-tags is zero, and if so the TTR is simply set to the length of the line.

In several such embodiments, lines in the HTML document with a TTR that lies equal to or above two standard deviations is automatically determined by converter 123 to be content (e.g. HTML web page's body) and those lines whose TTR is less than two standard deviations are determined to be non-content (e.g. HTML web page's header and advertisements). For more detail on how converter 123 implements the calculation and use of TTR, see the following document that is incorporated by reference herein in its entirety: "Text Extraction from the Web via Text-to-Tag Ratio" by Tim Weninger and William H. Hsu, published at pp. 23-28, 2008, in the 19th International Conference on Database and Expert Systems Application and available on the Internet at the website address obtained from the following string in the above-described manner: http:%%www=uni-weimar=de%medien%webis%research%workshopseries%tir-08%proceedings%18_paper_652=pdf. The just-described paper is incorporated by reference herein in its entirety. In some embodiments, the text inside HTML/XML tags used primarily for display formatting is retained and the tag itself is ignored in calculation of TTR. Examples of HTML/XML tags whose text is retained, but tags are ignored are 'br', 'sub', 'sup', 'pre', 'plaintext', 'blockquote', 'q', 'cite', 'span'. In such embodiments, other tags such as 'h1', 'h2', etc and 'p', 'hr', 'o:p' are replaced with a period '.' to indicate the end of a sentence.

As noted above, server computer 120 is programmed to extract text and hyperlinks in each subscription document and each interest document by executing converter 123. Certain embodiments use search service 140 to access a subscription corpus (which equals the world wide web) and in these embodiments indexing may not be necessary. In other embodiments that do not use search service 140 to access a subscription corpus, the extracted text is thereafter stored in an index ("inverted index") of words, by using software 124 ("text indexer"), such as Sphinx available on the Internet, at the website address obtained by replacing "%" with "/" and replacing "=" with "." in the following string: http:%%www=sphinxsearch=com. In certain embodiments interest document(s) and subscription document(s) are both indexed, with the indexed interest document(s) being used for snippet generation and the indexed subscription documents being used to find matches to word groups (identified from interest documents). In alternative embodiments, only the subscription documents are indexed for use in finding matches to word groups. In the alternative embodiments, the snippets are generated by matching the word groups against the text of the interest document stored in the database, using an SQL query to do the matching.

Note that the word "occur" is used herein whenever a word group is identically present in a document, whereas the word "match" is used more loosely herein, to mean presence of one or more words in a word group or a variant thereof based on stemming or even another word related thereto, e.g. depending on a mode as follows. In some embodiments, by server computer 120 using an inverted index with position information, one or more of the following modes of matching are supported: matching all words in the word group (default mode), matches any word in the word group, matching the word group identically, matching a word group as a boolean expression, proximity matching and matching a query as an expression in a query language Sphinx. Specifically, to implement matching of multi-word phrases, an index 125 is implemented (and stored) in server computer 120 of some embodiments, and configured to include position information, such as an offset of each word in a document from a beginning of that document.

Certain embodiments of server computer 120 implement only matching of a word group identically in the subscription document ("phrase matching") to preserve the meaning of the word group and therefore improve relevance of the matching documents. Other embodiments of server computer 120 use proximity matching, wherein proximity distance is specified in words, adjusted for word count, and applied to all words within quotes. For instance, "lion dog tiger" within a proximity distance of 5 means that there must be less than 8-word span which contains all 3 words. Still other embodiments of server computer 120 match stemmed versions of the word group and can be used with either phrase matching or proximity matching.

In one illustrative embodiment, text indexer 124 is configured to store each subscription document A with a field ("in-link field") that contains a list of identifiers of subscription documents that hyperlink to that subscription document A ("in-link identifiers") as shown in FIG. 1M. Specifically, converter 123 of FIG. 1A identifies hyperlinks during conversion of a document and eventually supplies to indexer 124 the input data which include text and hyperlinks. As shown in FIG. 1M, text 151 to be indexed is supplied by converter 123 to indexer 124, which in this illustrative example happens to be from an article entitled "SPECIAL NUCLEAR MATERIAL DETECTION" published by Nova Scientific Inc., available at the website address obtained from the following string in the above-described manner: http:%%www=novascientific=com%snm=html.

In addition to text 151, converter 123 also supplies to indexer 124 zero or more identifiers, such as identifiers 152 and 153 of two subscription documents that internally contain hyperlinks to the text 151. As noted above, these and other such hyperlinks are identified by converter 123 during document conversion (e.g. from PDF to HTML). In FIG. 1M, identifiers 152 and 153 are integers that uniquely identify respective subscription documents, whose URLs are shown adjacent thereto for illustrative purposes. It is to be understood that in the illustrated embodiment shown in FIG. 1M, URLs themselves are not being provided to indexer 124 because it is more efficient to use unique integers in index 125 constructed by indexer 124. Hence, server computer 120 stores the URLs and their corresponding unique integer identifiers in database 150. Alternative embodiments do use URLs as identifiers, instead of integer identifiers 152 and 153.

The just-described configuration of indexer 124, by using a document to be indexed as well as identifiers of incoming hyperlinks not only enables a match API 126 to match a word group to subscription document A, but also enables matching that word group to each subscription document B to which subscription document A points. Specifically, a relevance engine 130 in server computer 120 invokes match API 126 with the input illustrated in FIG. 1N, which includes a field that holds a word group followed by pairs of fields, namely: (a) identifier of subscription corpus and (b) list of identifiers of subscription documents to be matched.

For example, in FIG. 1N, the word group "long dwell detection" (in field 154) is to be checked for match with subscription documents having integer identifiers 65, 66 and 67 (in list field 156 of FIG. 1N) which are present in a subscription corpus identified by the address obtained from the following string in the above-described manner: http:%%online=wsj=com%xml%rss%3_7455=xml. Additionally, the word group "long dwell detection" (in field 154) is also to be checked for match with subscription documents having integer identifiers 12, 14, 19, 44 (in list field 158) which are present in a subscription corpus identified by the folder INBOX in the email account "sri.devabhaktuni@gmail.com" (in field 157).

Also, the same word group "long dwell detection" (in field 154) is to be further checked for match with subscription documents having integer identifiers 25, 42, 41, 34 and 31 (in list field 196 of FIG. 1N) which are present in a subscription corpus identified by search results that are automatically generated by invoking a search engine to search the world wide web using the word group "nuclear detection" (in field 159 of FIG. 1N) which itself has been identified from an interest document. Note that the identifiers in list field 196 of FIG. 1N are typically of subscription documents 128 that result from searching the world wide web as shown in FIG. 1L. Match API 126 returns a list of identifiers, such as identifiers 197 and 198 as illustrated in FIG. 1O.

In one embodiment, the server computer 120 includes relevance engine 130, document crawler 122, document to text & hyperlink converter 123 that are implemented making use of both standard and supplemental libraries written in a programming language called Python which is available on the Internet, at the website address obtained by replacing "%" with "/" and replacing "=" with "." in the following string: http:%%www=python=org, and described in the book "Learning Python" by Mark Lutz, published by O'Reilly Media (2009).

The list of supplemental libraries that are used in the just-described embodiment include a library to perform natural language processing functions such as sentence tokenization, word tokenization, part-of-speech classification, stop word filtering, stemming called NLTK which is available on the Internet, at the website address obtained by replacing "%" with "/" and replacing "=" with "." in the following string: http:%%www=nltk=org and described in the book "Natural Language Processing with Python—Analyzing Text with the Natural Language Toolkit" by Steven Bird, Ewan Klein, and Edward Loper published by O'Reilly Media, 2009. The list of supplemental libraries also includes a library to perform concurrent network downloads and access to email servers made use by the document crawler called Twisted which is available on the Internet, at the website address obtained by replacing "%" with "/" and replacing "=" with "." in the following string: http:%%www=twistedmatrix=com and described in the book "Twisted Network Programming Essentials" by By Abe Fettig published by O'Rielly Media (2005).

In one illustrative embodiment, web framework 121 is implemented in server computer 120 by software called Pylons, which is available on the Internet, at the website address obtained by replacing "%" with "/" and replacing "=" with "." in the following string: http:%%www=pylonshq=com, as well as described in "The Definitive Guide to Pylons by James Gardner, published by Apress (2008). The server computer 120 includes web server software 1908 (FIG. 5B) called Apache which is available on the Internet, at the website address obtained by replacing "%" with "/" and replacing "=" with "." in the following string: http:%%www=apache=org.

The web framework 121 used in server computer 120 of some embodiments consists of software libraries that operate in conjunction with the web server software 1908 to enable user-interest display logic 380 (FIG. 3A) and feedback logic 390. The software libraries in such a web framework 121, include (1) user-controls such as check-boxes for phrases displayed inside the user's web-browser 102, and (2) automatic refresh of search results for a phrase in response to user clicks. Such software libraries are implemented in some embodiments based on asynchronous Javascript and XML (AJAX), HTML, and CSS. In addition to website management functions, such software libraries include user authentication and access control.

In the illustrative embodiment, database 150 is implemented in server computer 120 by relational database management software system called MySQL, which is available on the Internet, at the website address obtained as described above from the following string: http:%%www=mysql=com.

In addition to using standard SQL to access the relational database, in the illustrative embodiment, objects stored in the database 150 are accessed in software using Object Relational Mapper software called SQLAlchemy which is available on the Internet, at the website address obtained as described above from the following string: http:%%www=sqlalchemy=org. and a declarative layer on top of the SQLAlchemy called Elixir which is also available on the Internet, at the website address obtained as described above from the following string: http:%%elixir=ematia=de. Elixir and SQLAlchemy are used together to generate relational database schema and access methods to store, retrieve, and modify objects in the relational database.

Operation of relevance engine 130 of many embodiments is now described starting with receipt of an interest document 200 illustrated in FIG. 2A. Relevance engine 130 automatically identifies one or more groups of one or more words ("word groups") that match the interest document 200. Examples of word groups that are automatically identified by relevance engine 130 from the paragraph in document 200 illustrated in FIG. 2A include, word group 201 ("nuclear detection systems"), word group 202 ("portals at borders"), word group 203 ("handheld detectors"), word group 204 ("nuclear terrorists"), and word group 205 ("passive detection HEU"). Note that although several additional word groups are illustrated in FIG. 2A with dotted boxes drawn around them, they are not individually labeled to improve clarity of the drawing. TABLE 2 identifies such word groups that are automatically identified by relevance engine 130 from an interest document which contains the paragraph illustrated in FIG. 2A are as follows.

TABLE 2

| WORD GROUP | REFERENCE CORPUS COUNT | INTEREST CORPUS COUNT | WEIGHT |
| --- | --- | --- | --- |
| budget for passive | 25 | 1 | 0.04 |
| portal at border | 25 | 1 | 0.04 |
| passive detection of heu | 31 | 1 | 0.032258 |
| uniform detection coverage | 63 | 1 | 0.015873 |
| plutonium show | 100 | 1 | 0.01 |
| detection technique need | 100 | 1 | 0.01 |
| x-ray interrogation | 158 | 1 | 0.006329 |
| detection of heu | 158 | 1 | 0.006329 |
| available detection technique | 158 | 1 | 0.006329 |
| interior nest | 251 | 1 | 0.003984 |
| light road vehicle | 251 | 1 | 0.003984 |
| border at border | 316 | 1 | 0.003165 |
| mode terrorist | 398 | 1 | 0.002513 |
| sharp attenuation | 630 | 1 | 0.001587 |
| vehicle from light | 794 | 1 | 0.001259 |
| garage door wide open | 1000 | 1 | 0.001 |
| nuclear detection system | 1584 | 1 | 0.000631 |
| uniform detection | 1995 | 1 | 0.000501 |
| active neutron | 1995 | 1 | 0.000501 |
| terrorist vehicle | 3162 | 1 | 0.000316 |
| border terrorist | 5011 | 1 | 0.0002 |
| number minutes | 6309 | 1 | 0.000159 |
| available detection | 6309 | 1 | 0.000159 |
| detection coverage | 7943 | 1 | 0.000126 |
| passive detection | 12589 | 1 | 7.94E−05 |
| border container | 15848 | 1 | 6.31E−05 |

TABLE 2-continued

| WORD GROUP | REFERENCE CORPUS COUNT | INTEREST CORPUS COUNT | WEIGHT |
| --- | --- | --- | --- |
| handheld detector | 19952 | 1 | 5.01E−05 |
| technique need | 39810 | 1 | 2.51E−05 |
| nuclear terrorist | 39810 | 1 | 2.51E−05 |
| nuclear detection | 39810 | 1 | 2.51E−05 |
| light road | 50118 | 1 | 2E−05 |
| worldwide transportation | 125892 | 1 | 7.94E−06 |
| link budget | 398107 | 1 | 2.51E−06 |
| transportation mode | 630957 | 1 | 1.58E−06 |
| detection technique | 630957 | 1 | 1.58E−06 |
| door wide open | 794328 | 1 | 1.26E−06 |
| time detection | 2511886 | 1 | 3.98E−07 |
| type of vehicle | 3162277 | 1 | 3.16E−07 |
| national border | 3162277 | 1 | 3.16E−07 |
| road vehicle | 5011872 | 1 | 2E−07 |
| sufficient number | 5011872 | 1 | 2E−07 |
| heu | 25118864 | 4 | 1.59E−07 |
| air passenger | 6309573 | 1 | 1.58E−07 |
| gamma ray | 7943282 | 1 | 1.26E−07 |
| private jet | 7943282 | 1 | 1.26E−07 |
| detection system | 7943282 | 1 | 1.26E−07 |
| neutron | 19952623 | 2 | 1E−07 |
| plutonium | 10000000 | 1 | 1E−07 |
| attenuation | 15848931 | 1 | 6.31E−08 |
| garage door | 19952623 | 1 | 5.01E−08 |
| detector | 79432823 | 3 | 3.78E−08 |
| suffice | 31622776 | 1 | 3.16E−08 |
| terrorist | 1.58E+08 | 4 | 2.52E−08 |
| wide open | 39810717 | 1 | 2.51E−08 |
| tanker | 39810717 | 1 | 2.51E−08 |
| uranium | 39810717 | 1 | 2.51E−08 |
| interrogation | 50118723 | 1 | 2E−08 |
| front door | 50118723 | 1 | 2E−08 |
| deter | 50118723 | 1 | 2E−08 |
| enrich | 50118723 | 1 | 2E−08 |
| detection | 2.51E+08 | 5 | 1.99E−08 |
| detect | 1.58E+08 | 2 | 1.26E−08 |
| x-ray | 79432823 | 1 | 1.26E−08 |
| pu | 2E+08 | 2 | 1E−08 |
| gamma | 1E+08 | 1 | 1E−08 |
| livestock | 1E+08 | 1 | 1E−08 |
| passive | 1.26E+08 | 1 | 7.94E−09 |
| consist | 1.26E+08 | 1 | 7.94E−09 |
| nest | 1.26E+08 | 1 | 7.94E−09 |
| handheld | 1.58E+08 | 1 | 6.31E−09 |
| physically | 1.58E+08 | 1 | 6.31E−09 |
| shield | 1.58E+08 | 1 | 6.31E−09 |
| uniform | 2E+08 | 1 | 5.01E−09 |
| exclusively | 2E+08 | 1 | 5.01E−09 |
| passenger | 2E+08 | 1 | 5.01E−09 |
| container | 2E+08 | 1 | 5.01E−09 |
| sufficient | 2.51E+08 | 1 | 3.98E−09 |
| nationwide | 3.16E+08 | 1 | 3.16E−09 |

As seen from the last several rows of TABLE-2 above, the word groups of many embodiments include groups of single words, such as "nationwide", "sufficient", "container", "passenger", "exclusively" etc, as well as groups of multiple words. In several embodiments, the word groups of an interest document are identified by relevance engine 130 automatically classifying each word in the interest document into a part of speech in English grammar, such as noun, verb, adjective, adverb, pronoun, preposition, conjunction and interjection. Then one or more patterns of positions of parts of speech relative to one another are used by relevance engine 130 to automatically select multiple groups of words.

The current inventors believe that identification of word groups based on identification of a part of speech (POS) of each word in an interest document is a valuable aspect of many embodiments of relevance engine 130 for the following two reasons. Firstly, the current inventors have found that detection of word groups that relies on interest corpus statistics is unreliable, unpredictable, and produces irrelevant phrases and unrecognizable phrases. Secondly, the current inventors have further found that results of identifying a part of speech (POS) can be tested at the sentence level independent of the rest of the document or corpus, and better correlates with intuitive and natural understanding of the subject matter being discussed in the interest corpus.

In many embodiments, patterns that are used by relevance engine 130 include all word groups in which a noun is preceded by at least one of another noun, an adjective and a preposition. Such word groups ("noun phrases") improve the relevance of documents that are identified by relevance engine 130 because nouns describe subject matter and concepts, in contrast to subject-verb-object (SVO) phrases which describe actions and therefore produce irrelevant phrases and unrecognizable phrases. Hence this is a third reason for the current inventors' belief that identification of noun phrases based on user's interest document(s), and use of such identified noun phrases to select documents are valuable aspects of certain embodiments of relevance engine 130.

Note that neither identification of POS nor use of noun phrases is required in several alternate embodiments of relevance engine 130. Specifically, several alternative embodiments do identify word groups based on word count statistics within a document or set of documents to identify words appearing more often together than they would be expected to given random, independent occurrences of the words. Some such alternative embodiments of relevance engine 130 use a likelihood ratio and hypothesis testing (t-test, chi-square test) as described in pages 162-172 in Chapter 5 of the book entitled "Foundations of Statistical Natural Language Processing" by Christopher D. Manning and Hinrich Schutze, published by Massachussetts Institute of Technology, 1999 (sixth printing with corrections, 2003). Note that Chapter 5 of the just-described book is incorporated by reference herein in its entirety.

In many embodiments, relevance engine 130 automatically selects certain groups of words to be used in identifying subscription documents, based on how infrequently the word groups occur or match one or more corpus(es). For example in some embodiments, relevance engine 130 calculates a weight of each identified group of words that has been extracted from one or more interest document(s) as described above. Depending on the embodiment, the weight of a word group is a function of either one of or both of: an interest count of a number of times the group of words matches the interest documents and a reference count of the number of times the corresponding group of words matches a corpus of reference documents.

Figure 2B:
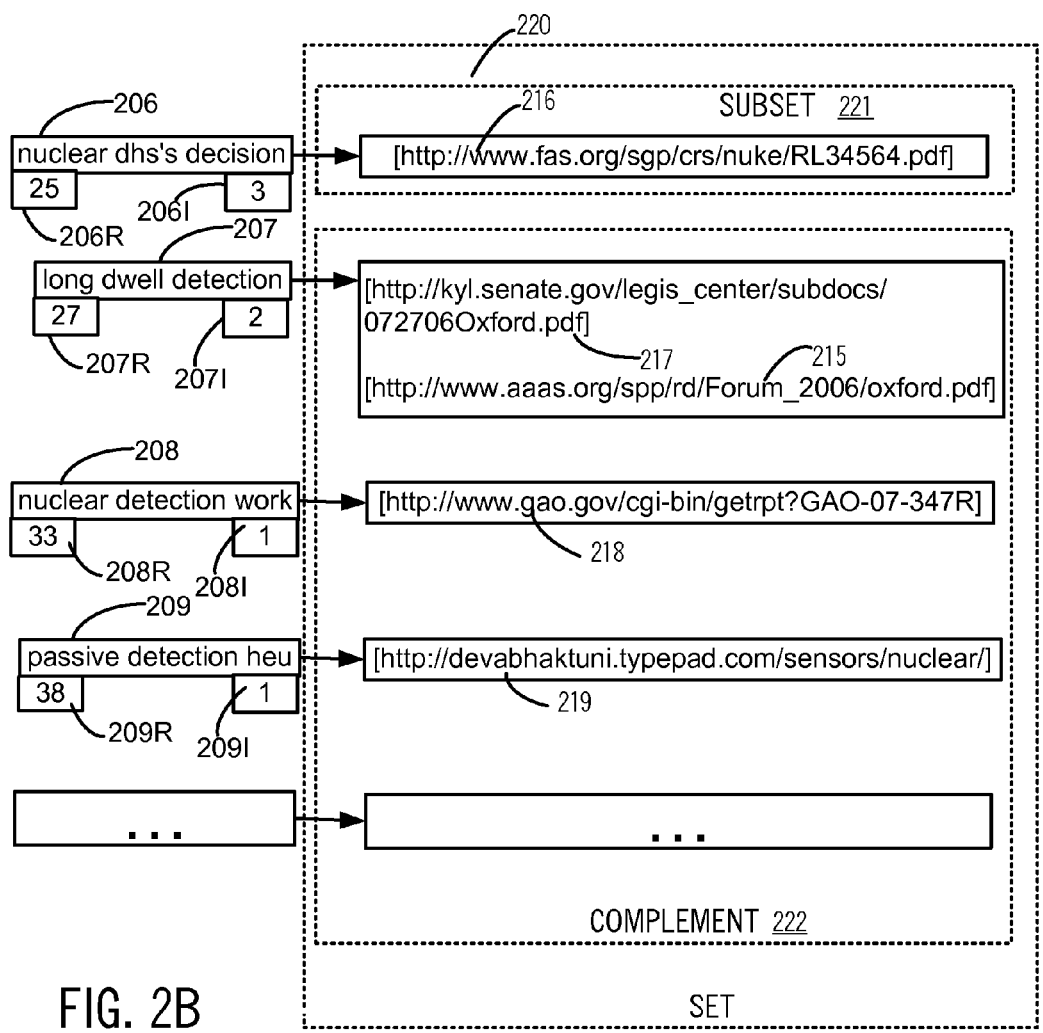
FIG. 2B illustrates, in computer memory of server computer 120, data identifying the most relevant documents in a subscription corpus, and its complement in accordance with the invention.

In a first example, an embodiment of relevance engine 130 ranks word groups 206, 207, 208 and 209 (FIG. 2B) by sorting them in ascending order of the number of times each word group appears in a reference corpus such as the world wide web. In FIG. 2B, the number of times each word appears in the reference corpus is identified by fields 206R, 207R, 208R, and 209R associated with the respective word groups 206, 207, 208 and 209. The values of fields 206R, 207R, 208R, and 209R are 25, 27, 33 and 38, and accordingly word groups 206, 207, 208 and 209 are illustrated in FIG. 2B in the sorted order, based on reference corpus counts In a second example, another embodiment ranks word groups 206, 207, 208 and 209 by sorting them in ascending order of an inverse of the number of times each word group appears in an interest corpus (including one or more interest documents identified by the user). In FIG. 2B, the number of times each word appears in the interest corpus is identified by fields 206I, 207I, 208I, and 209I associated with the respective word groups 206, 207, 208 and 209. The values of fields 206I, 207I, 208I, and 209I are 3, 2, 1 and 1, and accordingly word groups 206, 207, 208 and 209 are again illustrated in FIG. 2B in the sorted order, based on interest corpus counts.

In a third example, yet another embodiment ranks word groups 206, 207, 208 and 209 by sorting them in ascending order of a weight based on the ratio of the reference corpus count to the interest corpus count. The ratios for word groups 206, 207, 208 and 209 are 25/3, 27/2, 33/1, and 38/1 and these word groups are again illustrated in FIG. 2B in the sorted order, based on the ratio.

One or more highest ranked word groups resulting from the above described ranking are used in accordance with the invention, either directly or indirectly depending on the embodiment, in computerized filtering or selection of documents that contain content of various types, such as results of searching the world wide web, social networking profiles (e.g. on Facebook), professional networking profiles (e.g. on Linked-in), blog postings, job sites, classified ads, and other user generated content like reviews. In some embodiments the documents being filtered or selected by server computer 120 occur in streams that change over time, such as news sources, RSS feeds, incoming email, and real-time social media (e.g. Twitter).

In certain embodiments ("first embodiments"), the automatically ranked word groups are supplied by server computer 120 via web browser 102 to the user who then manually submits them to a conventional service, such as Google Alerts. In other embodiments ("second embodiments"), automatically ranked word groups are directly used automatically by server computer 120 that is further programmed in accordance with the invention, to eliminate the need for a user to manually generate and supply search terms for personalized filtering, as discussed next.

In some embodiments, relevance engine 130 automatically repeatedly uses the highest ranked group of words with match API 126 to identify from among a set of identifiers of subscription documents 220 (FIG. 2B), a subset 221 that matches the identified group of words 206. In certain embodiments relevance engine 130 automatically uses the highest ranked word group to obtain search results (links to documents) by use of search service 140 and then the search results are supplied by web framework 121 in computer 120 to computer 101 for display of the document links in browser 102. In other embodiments, relevance engine 130 automatically uses the highest ranked word group to obtain a link to list of search results provided by search engine 105 and then the link to the list is supplied by web framework 121 in computer 120 to computer 101 for display of the list's link in browser 102. Relevance engine 130 then automatically ranks the identifier 216 of each subscription document in subset 221 relative to a complement 222 of the subset. Note that the complement 222 is formed in a group of subscription documents that have not been ranked so far. In the illustration shown in FIG. 2B, initially none of the documents are ranked, and hence at this stage a group of not ranked subscription documents is the same as set 220. Note, however, that immediately after subset 221 is ranked, the group of not ranked subscription documents becomes complement 222.

In the illustration of FIG. 2B, in the very first iteration of relevance engine 130, document identifier 216 is ranked, as identifying the most relevant document. As noted above, in the first iteration complement 222 excludes only the document identifier 216. In the next iteration, documents 217 and 215 are ranked by relevance engine 130, and at this stage a complement excludes not only documents 217 and 215 that are in a new subset identified by the group of words 207, but also excludes document identifier 216 in subset 221 of the first iteration because it has been already ranked. Relevance engine 130 of some embodiments is programmed to continue to iterate in this manner, until a predetermined condition is met, e.g. until a certain number of documents (e.g. 10 documents) are ranked. In some embodiments, even after the certain number of documents are identified, relevance engine 130 continues to iterate until identifying all documents on which a predetermined condition on weight is met, so as to compute the index count for each document found so far.

In some embodiments, relevance engine 130 automatically stores in the memory 1106 of server computer 120, information about the ranked document identifiers to enable web framework 121 to generate the display illustrated in FIG. 2C. Specifically, as illustrated in FIG. 2C, a document 230 in the form of a webpage is created by web framework 121 (based on information stored to memory 1106 by relevance engine 130), to include a list of blocks, such as block 240 followed by block 253. Each block contains a document identifier, such as a URL and/or a title and/or a timestamp. For example, block 240 includes a title 241 of the document entitled "The Global Nuclear Detection Architecture: Issues for Congress . . . " followed by a URL 242 identifying the document's location on the world wide web to be the address obtained by replacing "%" with "/" and replacing "=" with "." in the following string: http: %%www=fas=org%sgp%crs%nuke%RL34564=pdf. Accordingly, relevance engine 120 stores in memory 1106 a time stamp 243 showing that this document was obtained by server computer 120 on 2009-07-31 at 14:50:04.

Relevance engine 120 further stores in memory 1106 a score 244 (e.g. of value −14.0833) showing that this document has the highest score. Relevance engine 120 also stores in memory 1106, a group of words 246 (e.g. "nuclear dhs's decision") that caused the document identifier 242 to be displayed, and corresponding thereto a flag 245 (shown as a check mark in a box control in FIG. 2C) identifying the user's input on whether or not the word group 246 is of interest to the user. Relevance engine 120 further stores in memory 1106, one or more identifiers 249 and 252 (e.g. URLs) of interest documents, in which one of the displayed group of words also occurs, depending on the embodiment. In the web page illustrated in FIG. 2C, the identifiers 249 and 252 are introduced using a common predetermined keyword 247 and 251 (e.g. the word "matches"), so as to identify the relevance of subscription document identifier 242 to interest document identifiers 249 and 252.

Although only recordation by relevance engine 120 of one group of words 246 has been discussed above, relevance engine 120 actually records several such word groups in memory 1106, e.g. in FIG. 2C a word group 250 is identified as also occurring in an interest document. In FIG. 2C, this word group 250 ("nuclear detection") also coincidentally occurs in the title of the subscription document identified by identifier 242 and its occurrence therein is brought to the user's attention by use of the bold attribute to highlight this word group in the title. Note that as described below, the web page 230 can be used by a user to uncheck a control 245 so that the corresponding word group 246 is no longer used by relevance engine 130.

In some embodiments of the invention, relevance engine 120 additionally stores in memory 1106 one or more snippets of text in a subscription document that surround one or more word groups identified therewith. For example, FIG. 2D illustrates a display of the web page of FIG. 2C after the user clicks on word group 261 which causes snippet 262 to be displayed as shown in FIG. 2D.

Figure 3A:
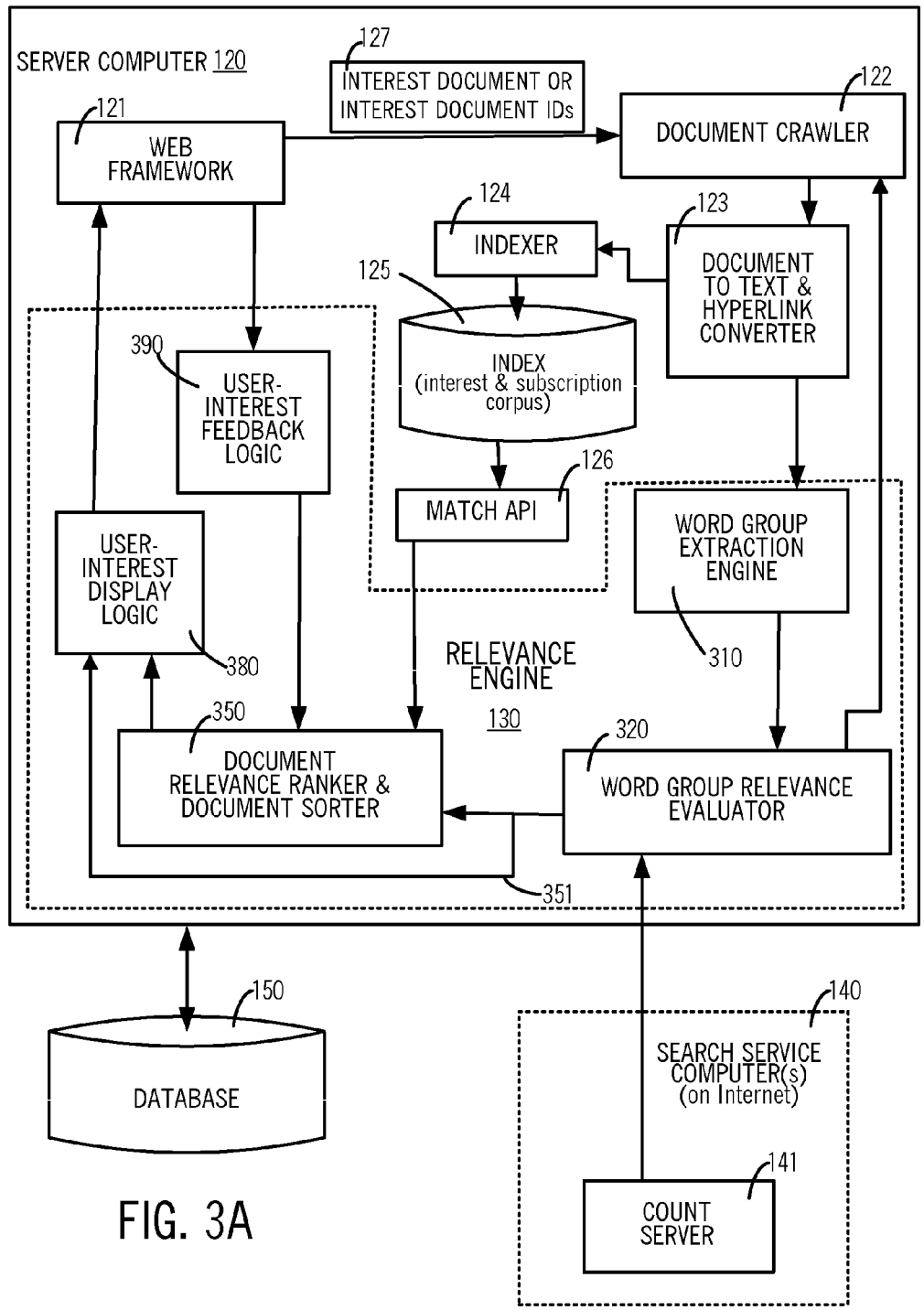
FIG. 3A is a block diagram of a server computer 120, including the relevance ranker in accordance with the invention.

Some embodiments of a relevance engine 130 is implemented by five functional blocks 310, 320, 350, 380 and 390 as illustrated in FIG. 3A. As will be readily apparent to the skilled artisan in view of this detailed description, any one or more of functional blocks 310, 320, 350, 380 and 390 may be combined with one another, and/or divided up into additional pieces depending on the embodiment. Hence the following description is merely illustrative of one specific embodiment.

Several embodiments of relevance engine 130 include a word group extraction engine 310 (FIG. 3A) that receives text extracted from an interest document and generates word groups, of single words as well as multiple words. Specifically, in one embodiment, a sentence tokenization block 311 is used to break up the text into a list of sentences, as described in, for example, pages 134, 260 in Foundations of Natural Language Processing, by Christopher Manning and Hinrich Schutze, 1999. Pages 134 and 260 of the just-described book are incorporated by reference herein in their entirety. For additional detail, see an article entitled "Punkt module for Sentence tokenization in NLTK" available on the Internet, at the website address obtained by replacing "%" with "/" and replacing "=" with "." in the following string: http: %%nltk=googlecode=com%svn%trunk%doc%api%nltk= tokenize=punkt-module=html. The just-described article is incorporated by reference herein in its entirety.

Figure 3B:
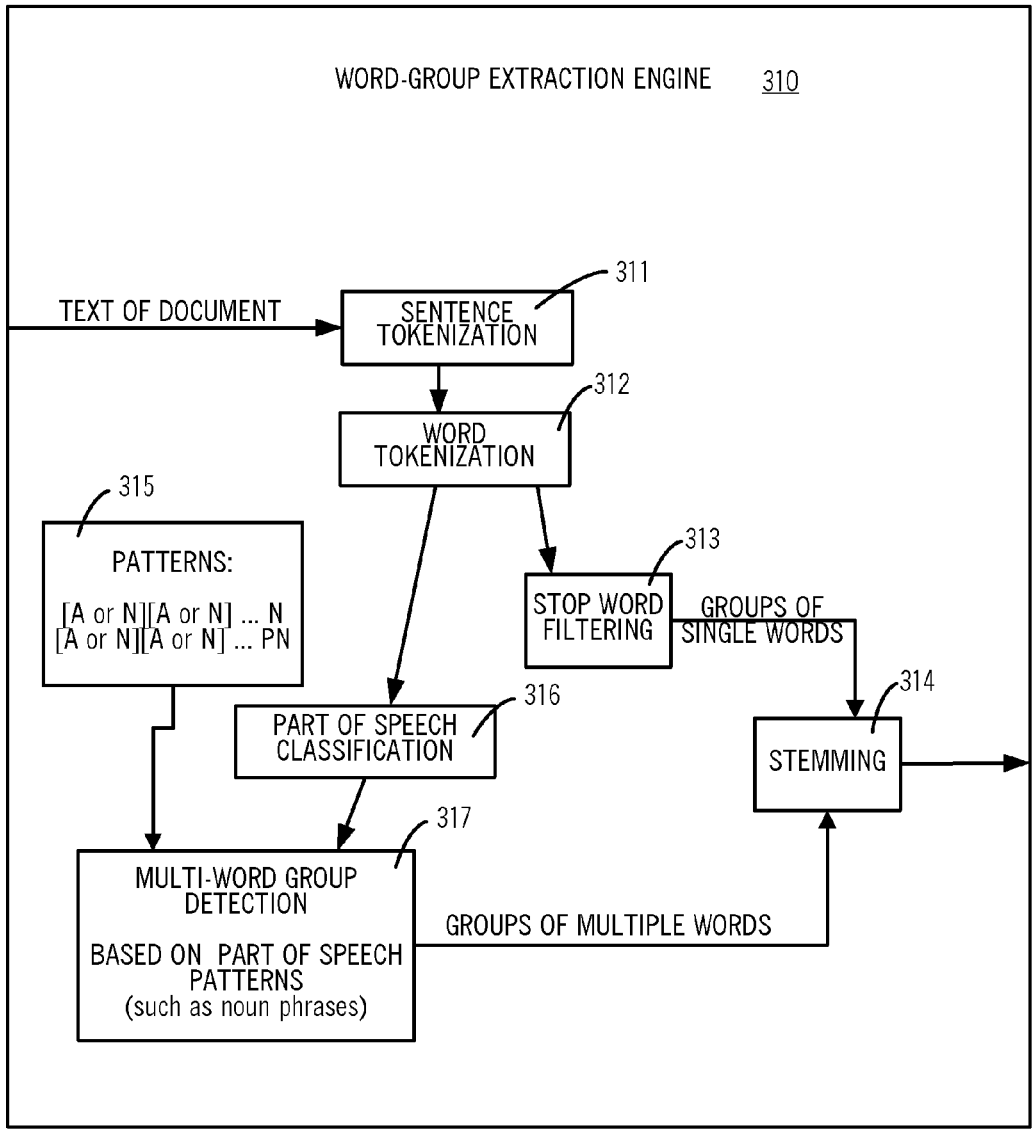
FIG. 3B is a block diagram of a word-group extraction engine in accordance with the invention.
Figure 3C:
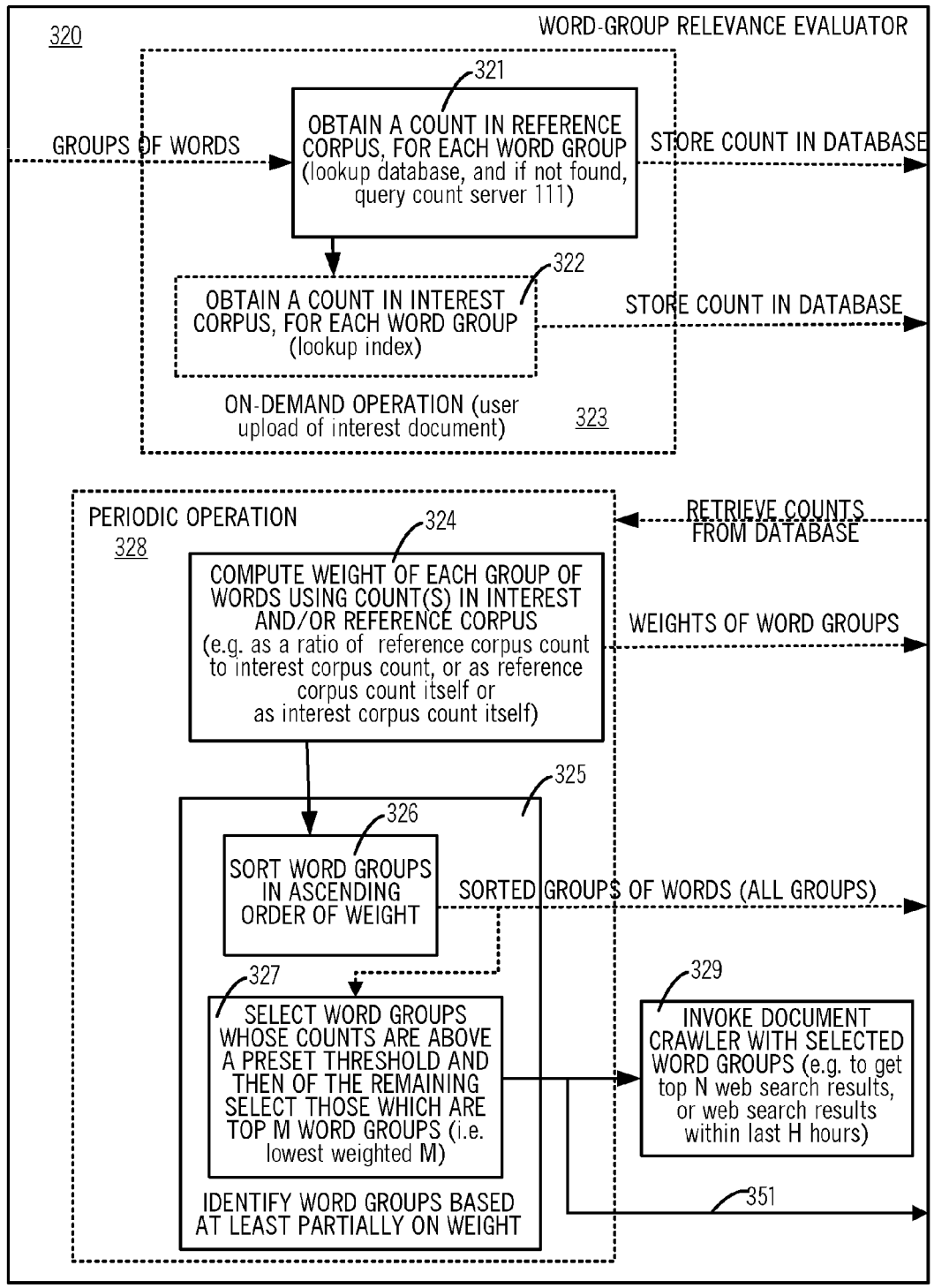
FIG. 3C is a block diagram of a word-group relevance evaluator in accordance with the invention.

Thereafter, each word in each sentence is tokenized by word tokenization block 312 (FIG. 3B), in the normal manner. Thereafter, single groups of words are passed to a stop word filtering block 313. Block 313 uses a predetermined list of stop words that are removed from the single groups of words received from block 312, e.g. the words "the", "a", "sometimes", "and", etc. are removed. The resulting groups of single words are thereafter supplied to stemming block 314. Stemming block 314 generates stemmed versions of word groups that it receives as described in, for example, pages 132, 194 and 534 in Foundations of Natural Language Processing, by Christopher Manning and Hinrich Schutze, 1999. Pages 132, 194 and 534 of the just-described book are incorporated by reference herein in their entirety. Note that stemming block 314 also receives groups of multiple words from block 317.

After word tokenization in block 312, the entire sentence is passed to block 316, wherein each word of the sentence is in turn tagged with its part if speech (noun, verb, adjective, etc), as described in, for example, pages 341-380 in Chapter 10 of the book entitled "Foundations of Natural Language Processing" by Christopher Manning and Hinrich Schutze, 1999. Pages 341-380 of the just-described book are incorporated by reference herein in their entirety. For additional detail see the article entitled "Taggers in NLTK" available on the Internet, at the website address obtained by replacing "%" with "/" and replacing "=" with "." in the following string: http: %%docs=huihoo=com%nltk%0=9=5%guides%tag=html. The just-described article is incorporated by reference herein in its entirety. In one embodiment, POS classification block 316 uses a Brill Tagger. In another embodiment, POS classification block 316 uses a Markov model Tagger.

Each sequence of words that matches a predetermined pattern 315 (such as adjective-noun or noun-noun or adjective-adjective-noun) is selected by multi-word group detection block 317 as a noun phrase, e.g. as described in pages 153-157 of the book entitled "Foundations of Natural Language Processing" by Christopher Manning and Hinrich Schutze, 1999, incorporated by reference herein in its entirety. There are several alternative embodiments for selecting phrases, based on word co-occurrence statistics and word proximity, e.g. as described in Chapter 5, of the book entitled "Foundations of Natural Language Processing" by Christopher Manning and Hinrich Schutze, 1999, which is incorporated by reference herein in its entirety. See also an article by Church and Hanks entitled "Word Association Norms, Mutual Information, and Lexicography" at the link obtained by replacing "%" with "/" and replacing "=" with "." in the following string: http:%%www=aclweb=org%anthology-new %J%J90% J90-1003=pdf that is also incorporated by reference herein in its entirety. Also see the article entitled "Using statistics in lexical analysis" available on the Internet at the link obtained by replacing "%" with "/" and replacing "&" with "." in the following string: http:%%citeseerx&ist&psu&edu%viewdoc%summary?doi=10&1&1&136&6572 also incorporated by reference herein in its entirety.

In another embodiment, word groups are selected by block 317 based on matching to specific content headers such as fields in an email (from, to, subject, etc) or meta-data inside the document (such as HTML/XML tags). In some embodiments, a word group relevance evaluator 320 in relevance engine 130 is implemented in two blocks 323 and 328, wherein block 323 is used to perform an operation on demand, e.g. in response to user upload of an interest document and block 328 is used to perform an operation periodically, e.g. every hour. Block 323 includes a block 321 that obtains a count ("reference corpus count") of each word group in a reference corpus, such as the world wide web.

In one illustrative embodiment, block 321 stores the reference corpus count of each looked up word group in database 150, for re-use in future. Hence block 321 first checks if the word group is found in the database first and thereafter issues a query to a count server 141 (in a search service 140 available on the Internet as noted above), and result is stored in the database. Depending on the implementation either the "totalhits" or the "deephits" returned by Yahoo-BOSS (used as search service 140) may be used as the reference corpus counts. Some embodiments of relevance engine 130 directly use the reference corpus count as a weight while alternative embodiments additionally use an interest corpus count. In the alternative embodiments, block 323 additionally includes a block 322 that obtains a count of each word group in the interest corpus, by looking up index 125, and the looked up count is stored in the database 150.

In one such embodiment, in a block 324, periodic operation block 328 in relevance engine 130 computes as word group weight, a ratio where the denominator is equal to number of times the word group appears in the interest corpus and the numerator is equal to the number of times it appears in search results on the web or other reference corpus. Other embodiments use as weight an arbitrary function of the numerator and/or denominator, i.e. any function of either the reference corpus count or the interest corpus count or both counts. In the just-described embodiment, periodic operation block 328 in relevance engine 130 also includes a block 325 that identifies word groups for use in selecting relevant documents, based at least partially on weight.

Accordingly, block 325 of several embodiments includes a block 326 that sorts all word groups identified from an interest document in ascending order of their weight, as computed in block 324. Also as noted above, in one embodiment the word group weight is the count of the number of times they appear in search results on the web or other reference corpus. All groups of words, in the sorted list are supplied to document relevance ranker block 350, for use in selection of relevant documents from a subscription corpus.

In one embodiment, to create a subscription corpus automatically, due to a large number of word groups from an interest corpus, relevance engine 130 does not use search results for all word groups generated from the interest corpus that result from block 326. Instead, in one embodiment, the word groups from one or more interest document(s) are automatically selected by first starting with the list of all word groups, eliminating those which have a reference corpus count less than some predetermined threshold (like $10^4$), sorting the remaining word groups based on weight, and selecting the top N of the word groups remaining in the list (for example N=20). These top N word groups are then provided to block 329 for invoking a document crawler to perform N web searches using the N word groups, and the results of these searches (and optionally hyperlinked documents therefrom) are used to form a subscription corpus for use by document relevance ranker block 350.

Some embodiments automatically select the top N word groups by eliminating not only those word groups which have a reference corpus count less than a first predetermined threshold (like $10^2$) as just described, but also additional word groups which have the reference corpus count greater than a second predetermined threshold (like $10^7$), i.e. the top N word groups are selected for having their reference corpus counts within a predetermined range. Although some embodiments use a single range as just described, additional ranges may be used in other embodiments. For example one illustrative embodiment uses three ranges to select three lists of word groups as follows: a high list 911 (FIG. 9A) with reference corpus counts within range 1 to $10^2$, a medium list 912 with reference corpus counts within range $1+10^2$ to $10^7$ and a low list 913 with reference corpus counts within range $1+10^7$ to $10^{12}$ and in this embodiment one or more word groups in each of the three lists 911-913 are stored in memory and transmitted by computer 120 to computer 101 for display to the user.

In some embodiments, in a list 911, word groups that satisfy a predetermined condition form a first set 914 (FIG. 9A) ranked higher than a second set 915 (FIG. 9A) of word groups that do not satisfy the predetermined condition. Within the just-described first set 914, the word groups are ranked relative to one another by weight. The just-described predetermined condition can be either interest corpus count greater than 1 or subscription corpus count greater than 0 or a combination thereof. In certain embodiments, a number is displayed adjacent to each word group in lists 911-913 (e.g. within parenthesis) denoting the number of subscription corpus documents that match that word group. For example, in an on-line retailer embodiment "H" described above, word groups that have a subscription corpus count of 0 are ranked lower than word groups whose subscription corpus count is greater than 0.

Figure 9A:
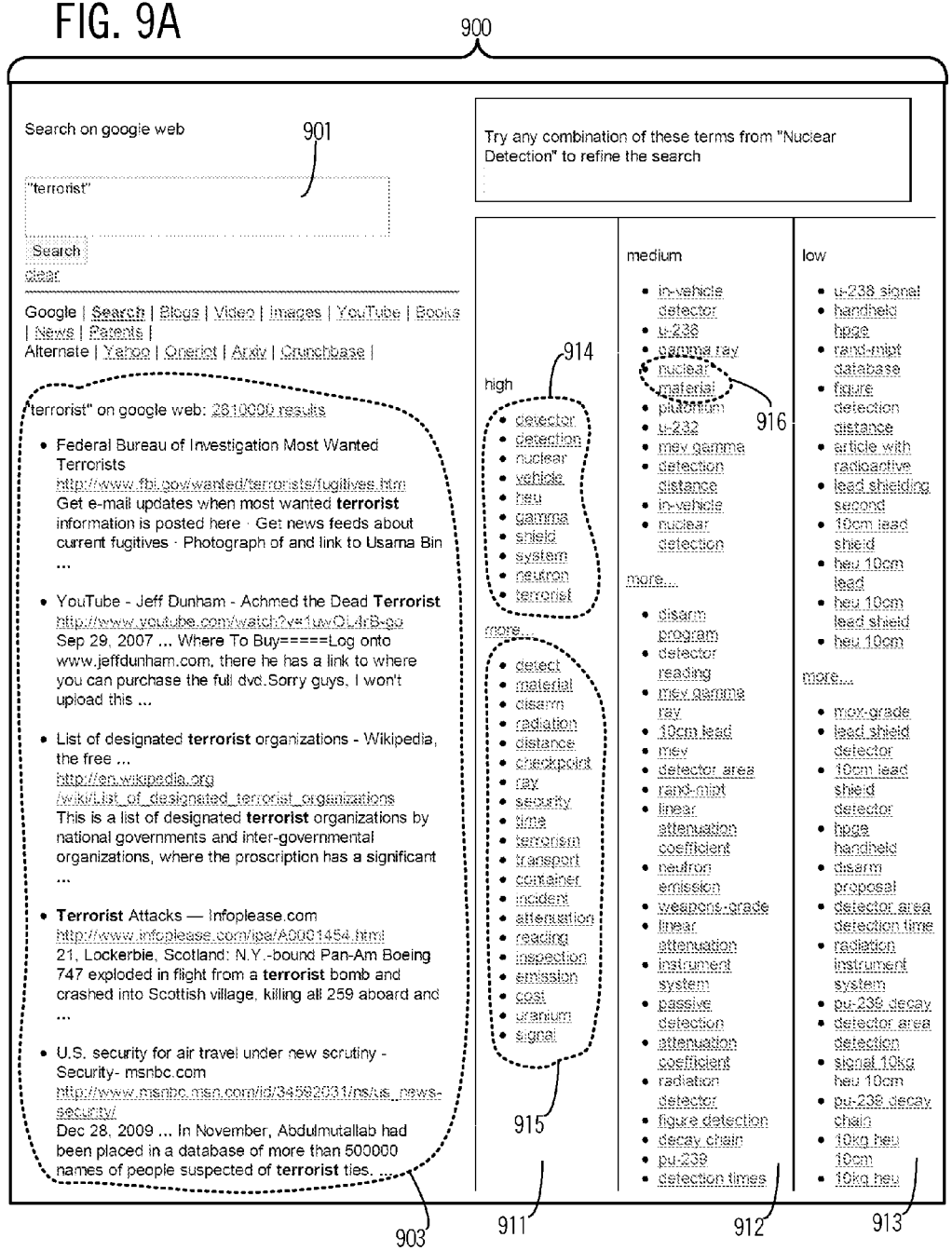

In some embodiments, one or more lists of word groups matching the interest document are supplied by word group relevance evaluator 320 (via branch 351) to a database and stored therein. The word groups in the database are read by user interest display logic 380 that in turn supplies the word groups list(s) to web framework 121. In one such embodiment web framework 121 directly accesses a search service 140 on the Internet, to generate and store in computer memory, search results in the form of a list of documents, each item in the list identifying details of each document, such as a URL, a title and a snippet and then web framework 121 supplies this list to web browser 102 in client computer 101 for display to the user as shown in FIG. 9A. In another such embodiment, the word groups list(s) is/are supplied by web framework 121 to web browser 102 in client computer 101 that in turn accesses the search service 140 on the Internet, to generate search results in the form of a list of documents, for display to the user.

In the example illustrated above in reference to TABLE-2, the following seven word groups are used to form a subscription corpus: passive detection, border container, handheld detector, technique need, nuclear terrorist, nuclear detection, light road. Note that the first word group "passive detection" is picked for having a reference corpus count of greater than 10,000. The remaining six word groups are picked sequentially thereafter based on weight. These seven word groups are thereafter used by a document crawler 122 to invoke seven searches by a search engine and the results are used as the subscription corpus in one embodiment. In another embodiment, the just-described results as well as documents hyperlinked therefrom together form the subscription corpus.

Figure 3D:
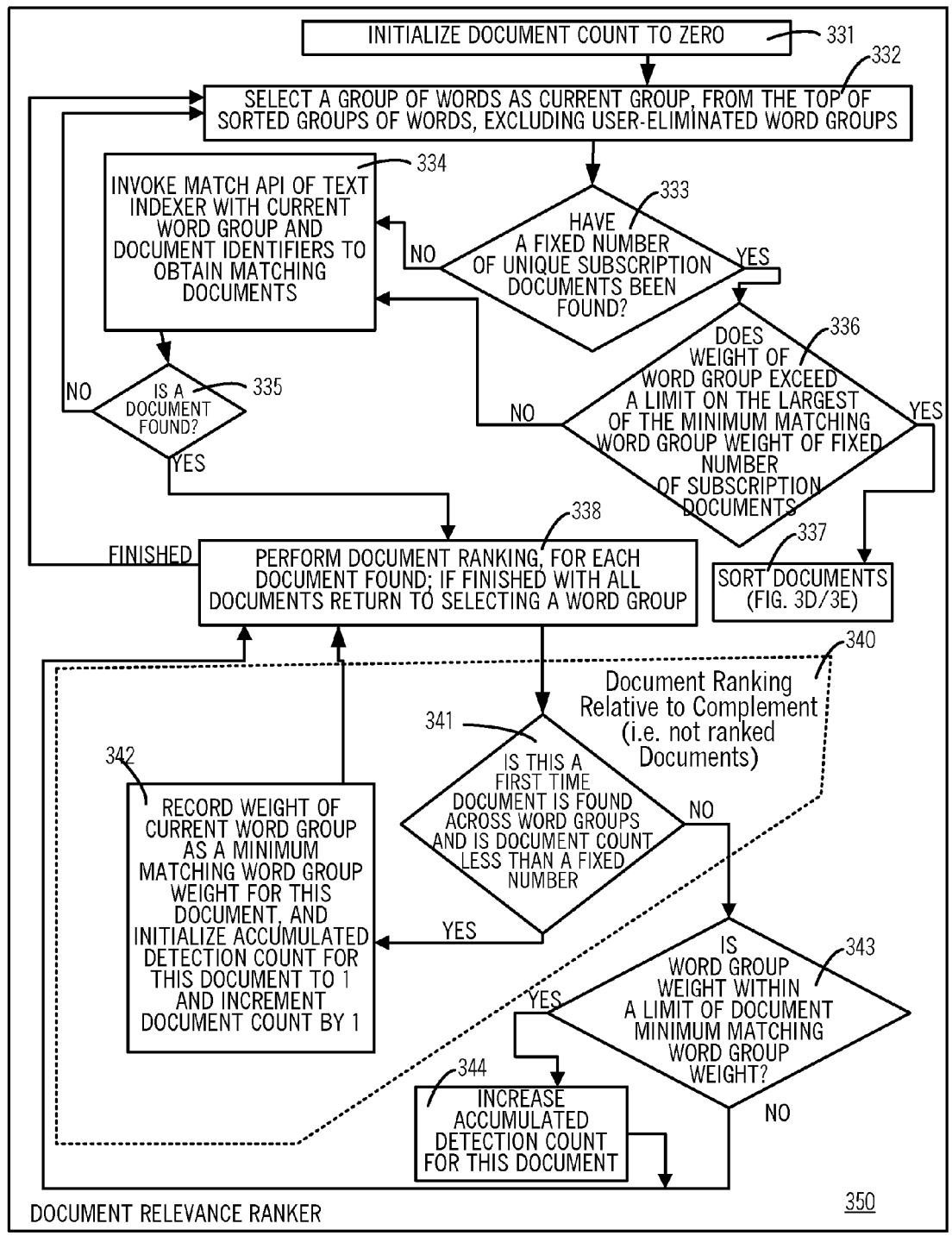
FIG. 3D is a block diagram showing the control-flow of subscription document ranking in accordance with the invention.
Figure 3E:
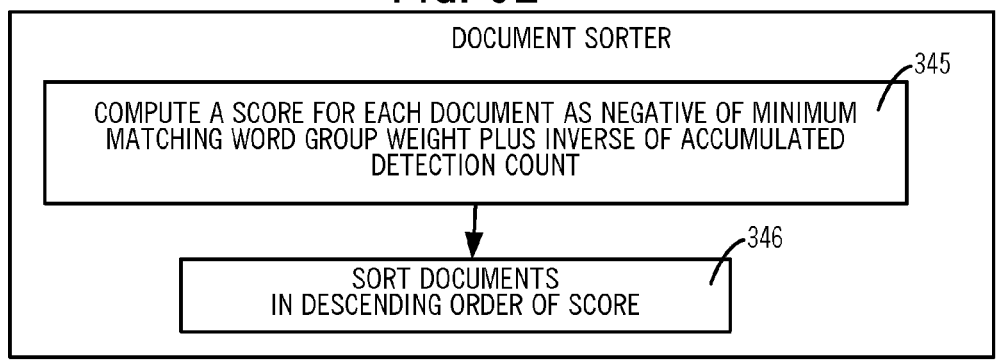
FIGS. 3E and 3F are block diagrams showing alternate algorithms for scoring and ranking subscription documents in accordance with the invention.

In some embodiments, a document relevance ranker block 350 initializes a document count to zero in act 331 and thereafter goes to act 332. In act 332, block 350 selects a group of words as the current group, from the top of sorted groups of words, excluding any word groups that have been eliminated by the user, e.g. by clicking on a check box control as described above. Next, in act 333, block 350 checks if a predetermined number (e.g. 10) of unique subscription documents have been found so far. If the answer is yes, then block 350 goes to act 336. In act 336, block 350 checks if the weight of the current word group (selected in act 332) exceeds a limit on the largest value of the minimum matching word group weight among the subscription documents found so far. If the answer in act 336 is yes, block 350 goes to act 337 to sort the documents as illustrated in FIG. 3D or 3E. If the answer is no in either of acts 333 and 336, block 350 goes to act 334.

In some embodiments of act 334, block 350 invokes the match API block 126 using the current word group and document identifiers of all documents obtained from block 329. In other embodiments of act 334, block 350 invokes the match API block 126 using the current word group and document identifiers obtained from an RSS feed and/or an email folder as described above. Next, in act 335, block 350 checks to see if a document has been found yet. If no document is found, block 350 returns to act 332 described above, to select another group of words as the current group from the sorted list (excluding user-eliminations). If the answer in act 335 is yes, then one or more documents have been found to be relevant, and block 350 goes to act 338 to perform document ranking.

Specifically, in act 338, block 350 decides whether to enter a ranking block 340 depending on whether any documents are currently unranked (i.e. their score is not fully computed, including a tie-breaker for identically ranked documents). If there are no unranked documents in act 338, then block 350 returns to act 332 described above. While there are any unranked documents in act 338, block 350 enters block 340 with an unranked document as the current document. In an act 341, block 350 checks if this is the first time that a document is found while traversing the list of word groups in acts 332-338. In act 341, block 350 further checks if the document count is less than a predetermined number. If both conditions are met, then block 350 goes to act 342, else it goes to act 343.

In act 342, block 350 records the weight of the current word group as a minimum matching word group weight for this current document, and initializes the accumulated detection count for this document to 1 and increments a document count by 1. Next block 350 returns to act 338 (described above). In act 343, block 350 checks if the word group weight is less than a sum of this document's minimum matching word group weight and a predetermined limit. If the answer is yes, then block 350 goes to act 344 and increments by 1 the accumulated detection count for this document, and then goes to act 338 (described above). If the answer in act 343 is no, then block 350 simply returns to act 338.

Figure 3F:
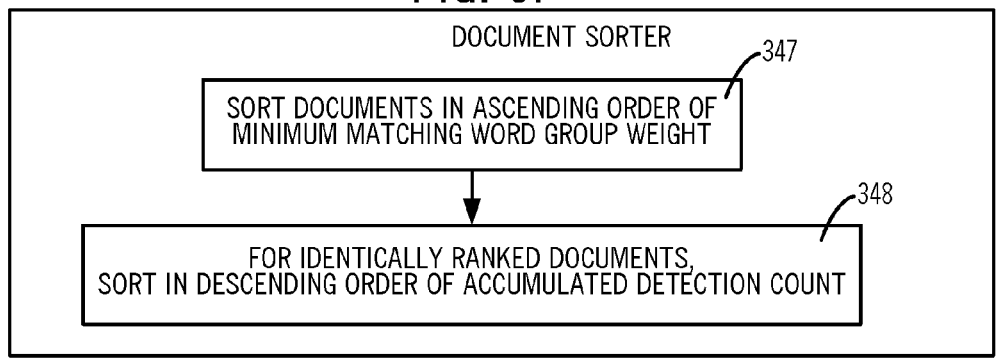

In some embodiments, block 350 includes a document sorter which is invoked in act 337 as described above. As illustrated in FIG. 3E, one version of a document sorter in accordance with the invention computes a score in act 345, for each document as the negative of the minimum matching word group weight plus inverse of the accumulated detection count. Next, in act 346, the documents are sorted in descending order of score, and thereafter identifiers of the sorted documents are supplied to a display logic 380 for preparation of a web page by web framework 121 for transmission to web browser 102. Another version of document sorter is illustrated in FIG. 3F, wherein in act 347 all documents that have been found so far are sorted in ascending order of minimum matching word group weight. Next, in act 348, the document sorter finds all documents that are identically ranked, and these documents are then sorted among each other in descending order of accumulated detection count.

In several embodiments, a user interest display logic 380 in relevance engine 130 performs acts 401-404 illustrated in FIG. 4A. Specifically, in act 401, logic 380 stores in memory 1106, an identifier of a subscription document that has been determined to be relevant to a user. Next, in act 402, logic 380 stores in memory one or more word groups that matched the subscription document identified in act 401 and also match any interest document. Thereafter in act 403, logic 380 stores in memory a flag 245 (FIG. 2C) for use in constructing a control for a check box to be located adjacent to each word group, for use by the user to exclude a word group. Note that response to the user changing a check box is handled by the user interface feedback logic 390, described below in reference to FIG. 4B. Next, in act 404, logic 380 stores in memory one or more identifiers of one or more interest documents that match one or more word groups that in turn were found to be matching the subscription document identified in act 401.

In some embodiments, display logic 380 receives identifiers of one or more word groups (via branch 351) from word group relevance evaluator 320, and on receipt performs act 405 (FIG. 4A) in such embodiments. Specifically, display logic 380 of several embodiments stores in computer memory, the received word group identifiers, and eventually supplies the word group identifiers to web framework 121.

In several embodiments, a user interest feedback logic 390 in relevance engine 130 performs acts 411-412 illustrated in FIG. 4B. Specifically, in act 411, logic 390 receives identification of one or more word groups eliminated by the user. Next, in act 412, logic 390 notifies document relevance ranker block 350 of the user-eliminated word group, and initiates operation of block 350. When initiated by logic 390, document relevance ranker 350 automatically uses the user input to identify a set of word groups different from the set of word groups used most recently (e.g. excludes a word group unchecked by the user), and thereafter selects documents once again and the newly selected documents are thereafter stored in memory, and used by logic 380 (described above) for transmission to web browser 102 via web framework 121.

Figure 4C:
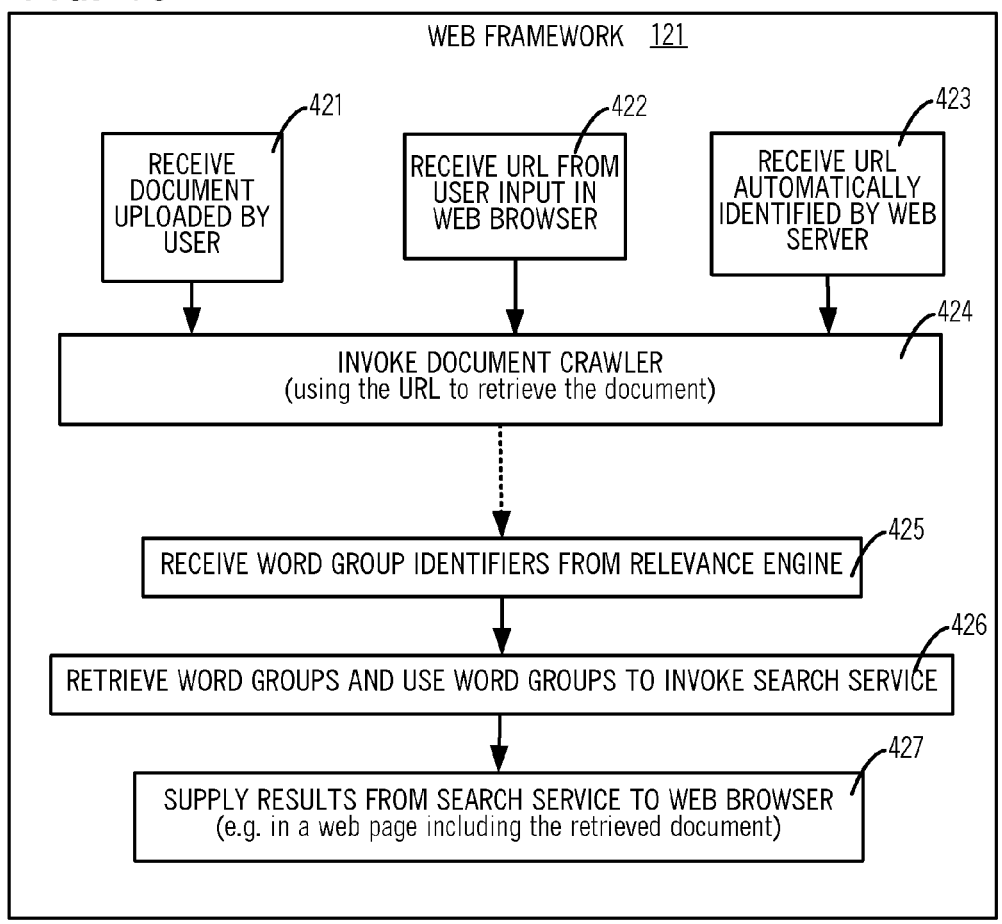
FIG. 4C illustrates, in a flow chart, operation of a web framework in accordance with the invention.

As illustrated in FIG. 4C, web framework 121 may receive an interest document that is uploaded by a user in act 421, or receive a URL of the interest document via user input in a web browser 102 in act 422 or receive a URL of the interest document automatically identified by a web site 107 (or any other document server 104) in act 423. Although not shown in FIG. 4C, in an alternative embodiment a plug-in within web browser 102 automatically determines an interest document based on information being displayed to the user and identifies the interest document to web server. Thereafter, web framework 121 goes to act 424 to invoke document crawler 122. When document crawler 122 is invoked with a document (e.g. uploaded by the user), document crawler 122 simply passes the document to converter 123. When document crawler 122 is invoked with a URL, then document crawler 122 retrieves the document from the World Wide Web and supplies the retrieved document to converter 123. Converter 123 in turn invokes the relevance engine 130 that in turn supplies word groups to web framework 121. Thus, in act 425, web framework 121 receives the word groups and goes to act 426. In act 426, web framework 121 retrieves the word groups and uses the word groups to invoke search service 140. Next, in act 427, web framework 121 supplies the results from the search service to web browser 102.

Note that although deselection of a check box has been described above as an illustrative example, the user is enabled by some embodiments to select a check box that has been previously deselected for exclusion of a word group thereby to initiate re-ranking including the previously excluded word group. While in some embodiments a web page displays a check box for excluding a word group, other embodiments display a control to enable the user to modify the weight of a word group, e.g. to promote or demote the word group relative to other word groups automatically identified as being of interest to the user. Several such embodiments display a list of all word groups automatically identified as being of interest to the user, and also display controls wherein the user can change the relative weights of the word groups.

Some embodiments in accordance with the invention convert the reference corpus count of each word group to decibel units, i.e. ten times logarithm of the reference corpus count to base 10, and then use this result in scoring and ranking each document relative to other documents to be displayed to the user.

Although in some embodiments the identifiers of relevant documents selected by document relevance ranker 350 (FIG. 3A) are sent via the user interest display logic 380 to a web framework 121, in other embodiments server computer 120 includes an Email server that is invoked by the user interest display logic 380 to send an email message to the user which includes identifiers of the relevant documents e.g. in a format similar or identical to Google Alerts. Similarly, word groups selected by evaluator 320 may be included in an email message composed by the Email sever in server computer 120. Depending on the embodiment, server computer 120 includes one or more of an Instant Messaging server and a Text Messaging Server that is/are invoked by the user interest display logic 380 and/or word group relevance evaluator 320 to send to the user identifiers of the relevant documents and/or word groups e.g. in a format similar or identical to Tweets of Twitter and/or Instant Messages of Microsoft Windows Messenger.

In some embodiments, each word group is stored in database 150 in association with a unique identifier in the form of an integer. In these embodiments, integer identifiers of all word groups matching an interest document, corresponding counts in the interest document, and corresponding reference corpus counts are also stored sequentially with an identifier of the interest document in database 150, instead of storing one record for each word group. Use of integer identifiers to identify word groups as just described improves speed of storage and retrieval of this information during operation of the relevance engine 130, compared to embodiments that directly use character strings of the word groups in such storage and retrieval.

The server computer 120 of FIG. 1A may include hardware of the type illustrated in FIG. 5A which is discussed next. Specifically, server computer 120 includes a bus 1102 (FIG. 5A) or other communication mechanism for communicating information, and a processor 1105 coupled with bus 1102 for processing information. Server computer 120 uses a main memory 1106, such as a random access memory (RAM) or other dynamic storage device, coupled to bus 1102 for storing information and instructions (e.g. for blocks of logic 131-134 of FIG. 1A) to be executed by processor 1105.

Main memory 1106 also may be used for storing temporary variables or other intermediate information (e.g. index 125 shown in FIG. 1A) during execution of instructions to be executed by processor 1105. Server computer 120 further includes a read only memory (ROM) 1104 or other static storage device coupled to bus 1102 for storing static information and instructions for processor 1105, such as collaboration software 200. A storage device 1110, such as a magnetic disk or optical disk, is provided and coupled to bus 1102 for storing information (e.g. database 150 of FIG. 1) and software instructions (e.g. for blocks of logic 131-134 of FIG. 1A).

Server computer 120 may be coupled via bus 1102 to a display device or video monitor 1112 such as a cathode ray tube (CRT) or a liquid crystal display (LCD), for displaying information to a user, e.g. identifiers of the automatically selected documents are displayed on display 1112. An input device 1114, including alphanumeric and other keys (e.g. of a keyboard), is coupled to bus 1102 for communicating information and changes to objects 216 and 217 to processor 1105. Another type of user input device is cursor control 1116, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, automatically identification of word groups and automatic selection of documents is performed by server computer 120 in response to processor 1105 executing one or more sequences of one or more instructions for a processor that are contained in main memory 1106. Such instructions may be read into main memory 1106 from another computer-readable storage medium, such as storage device 1110. Execution of the sequences of instructions contained in main memory 1106 causes processor 1105 to perform the operations of a process described herein and illustrated in FIGS. 3B-3E and 4A-4C. In alternative embodiments, hard-wired circuitry may be used in place of or in combination with software instructions to implement the invention. Thus, embodiments of the invention are not limited to any specific combination of hardware circuitry and software.

The term "computer-readable storage device" as used herein refers to any storage device that participates in providing instructions to processor 1105 for execution. Such a storage device may take many forms, including but not limited to (1) non-volatile computer memory, and (2) volatile memory. Common forms of non-volatile computer memory include, for example, a floppy disk, a flexible disk, hard disk, optical disk, magnetic disk, magnetic tape, or any other magnetic device, a CD-ROM, any other optical device, punch cards, paper tape, any other physical device with patterns of holes, a PROM, and EPROM, a FLASH-EPROM, any other memory chip or cartridge that can be used as storage device 1110. Volatile memory includes dynamic memory, such as main memory 1106 which may be implemented in the form of a random access memory or RAM.

Instead of or in addition to a storage device, transmission link may be used to provide instructions to processor 1105. A transmission link includes coaxial cables, copper wire and fiber optics, including the wires that comprise bus 1102. A transmission link can also take the form of acoustic or light waves, such as those generated during radio-wave and infra-red data communications, any of which can be used to implement a carrier wave as described herein.

Accordingly, instructions to processor 1105 can be provided by a transmission link or by a storage device from which a computer can read information, such as data and/or code. Specifically, various forms of transmission link and/or storage device may be involved in providing one or more sequences of one or more instructions to processor 1105 for execution. For example, the instructions may initially be comprised in a storage device, such as a magnetic disk, of a remote computer. The remote computer can load the instructions into its dynamic memory (RAM) and send the instructions over a telephone line using a modem.

A modem local to server computer 120 can receive information about a user's interest document on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Server computer 120 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from server computer 120, are exemplary forms of carrier waves transporting the information.

Server computer 120 can send messages and receive data, including program code, through the network(s), network link 1120 and communication interface 1115. In the Internet example, a server 1100 might transmit information related to objects 216 and 217 retrieved from a distributed database system through Internet 1124, ISP 1126, local network 1122 and communication interface 1115. The instructions for performing the operations of FIG. 2C may be executed by processor 1105 as they are received, and/or stored in storage device 1110, or other non-volatile storage for later execution.

In this manner, server computer 120 may obtain the just-described instructions and any related data in the form of a carrier wave.

Note that FIG. 5A is a very low-level representation of many hardware components of a computer system. Several embodiments have one or more additional software components in main memory 1106 as shown in FIG. 5B. Specifically, in such embodiments, server computer 120 of FIG. 5A implements a relevance engine 130 of the type illustrated in FIG. 5B. Engine 130 may manage a database 150 stored on a storage device 1906. Database 150 is accessed via a database management server (DBMS) which maintains overall consistency of data stored by database 150. In several embodiments, the DBMS is responsive to commands (also called queries) from relevance engine 130 in conformance with a relational database language, the most common of which is the Structured Query Language (SQL). The commands are used by relevance engine 130 of some embodiments to store, modify and retrieve data about documents in the form of rows in tables in database 150. The tables have one or more columns and zero or more rows as in a relational database that stores data in the form of tables related to one another.

Instead of requiring a user to supply search terms, some computer(s) of second embodiments are programmed in accordance with the invention to require a user to supply or identify one or more interest documents. Other computer(s) of second embodiments are programmed to automatically identify one or more interest documents as described above in reference to the embodiments of TABLE 1. The programmed computers of the second embodiments then use the interest documents to automatically identify one or more word groups, and then use the automatically identified word group(s) to automatically select documents from a corpus ("subscription corpus"). Identifiers of the automatically selected documents are included in a new document that is initially stored in a computer memory, and eventually transmitted to a client computer and displayed to the user, e.g. in an email reader, or in a web browser.

Depending on the embodiment, a subscription corpus may be either identified by the user to client computer(s) 101 or alternatively identified automatically by server computer(s) 120. In some of the just-described alternative embodiments, the server computer(s) 120 use the interest documents to further identify additional word groups which are in addition to the above-described automatically identified word groups. These additional word groups are thereafter used to filter another corpus ("super-subscription corpus") that is two or more orders of magnitude larger than the subscription corpus (e.g. illustrated in FIG. 1L). Depending on the embodiment, the super-subscription corpus may either be itself identified by the user, or preset to a default, such as the World Wide Web, or preset to the user's inbox for incoming email, or even preset to one or more news sources (e.g. Reuters, Bloomberg, CNN, and Financial Times).

Several embodiments in accordance with the invention also use a subscription corpus that is generated by use of one or more word groups that are automatically identified by use of interest documents (as described below) to conduct one or more searches on the world wide web, using a search engine 105. The results from a search engine, illustrated in FIG. 1L are thereafter treated as a subscription corpus or a portion thereof from which one or more subscription documents are automatically selected by use of relatively infrequently occurring word groups in a reference corpus that are identified for occurring frequently in interest documents, as described herein. Several embodiments ("third embodiments") automatically include in the above-described new document, at least one group of words that were used in selecting the documents that have been identified in the new document. Inclusion of one or more word group(s) in the new document enables their display to the user, to enable the user to understand why the selected documents were included in the new document, namely that the selected documents matched the one or more word group(s).

Additionally, certain third embodiments further include in the new document, at least one control to receive user input on one or more group of words included therein. The control can be, for example, a hyperlink that is activated by the user clicking on a displayed word group, or a check-box that is displayed adjacent to the displayed word group. Depending on the embodiment, the programmed computer(s) are programmed to respond to user input via such a control in one of several ways. For example, in some embodiments, the programmed computer(s) use the user's input via such a control to exclude one or more word group(s) from use in filtering documents in future, for this user. Hence, several such third embodiments respond to the user's input via such control(s) by performing another iteration that excludes the user-identified word group(s) during filtering, and then return new results to the user. As another example, in several embodiments, the programmed computer(s) use the user's input via such a control to display text in the selected document surrounding the word group, e.g. display words that precede the word group, followed by the word group itself, followed by words that occur subsequent to the word group, i.e. in the same sequence as in the document.

Although some embodiments of the type described above in reference to act $324$ in FIG. 3C compute a weight for a group of words based primarily on the word group's two counts (reference corpus count and interest corpus counts), certain embodiments use multiple pairs of counts of multiple word groups, in computing each word group's weight, e.g. as illustrated by act $624$ in operation $628$ of FIG. 6A. Unless described otherwise, all acts in FIG. 6A are implemented as described above in reference to FIG. 3A. In computing the weight of even a single word group, operation $628$ retrieves and uses pairs of counts of multiple word groups. Accordingly, as shown by act $624$ in FIG. 6A, some illustrative embodiments assign weights in a relative manner as follows: each word group is weighted based on how infrequently the word group matches a reference corpus and how frequently the word group matches one or more interest document(s), relative to other word groups.

Figure 6B:
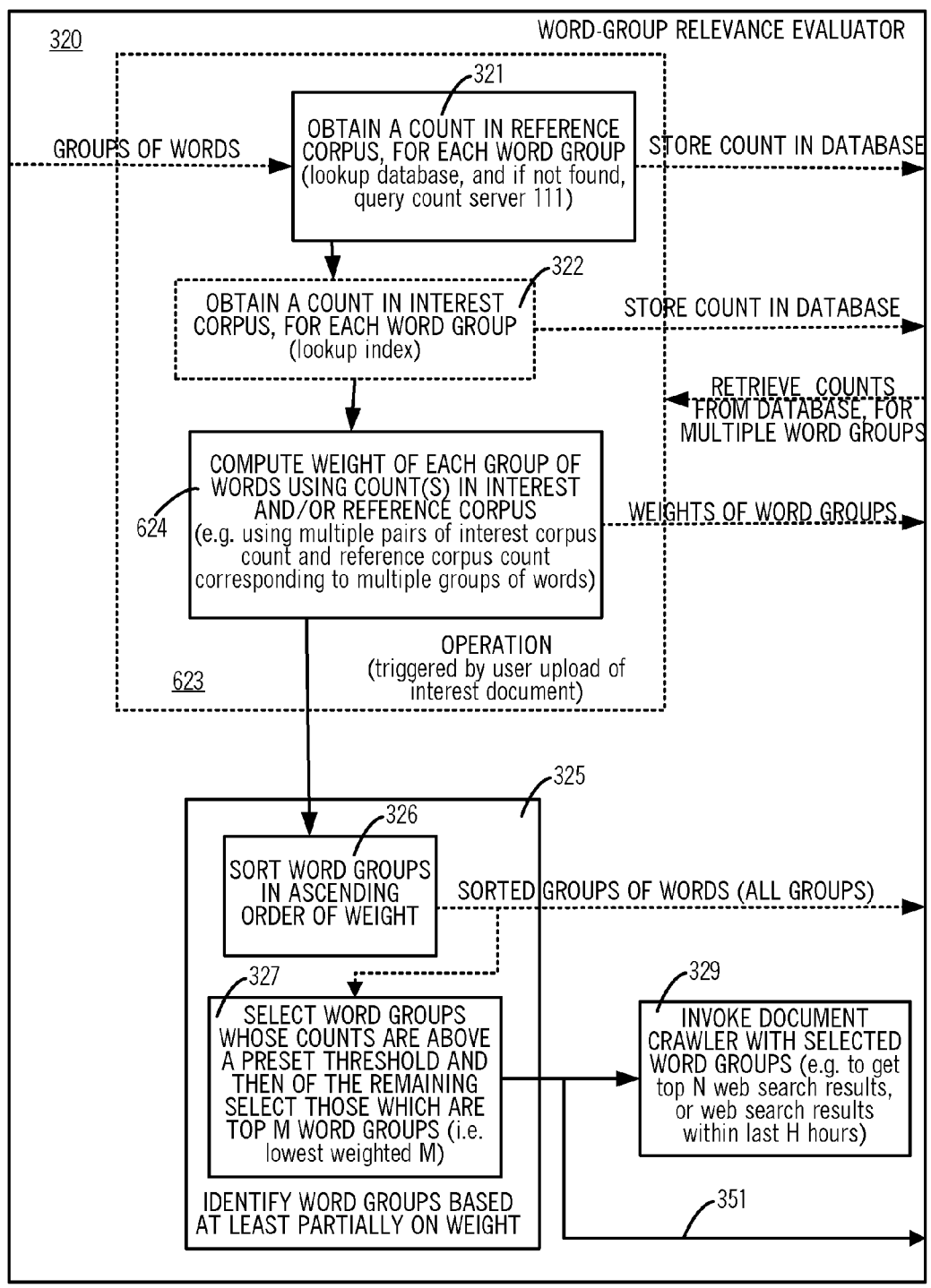

Although operation $328$ is periodic in some embodiments, in other embodiments operation $328$ can be performed aperiodically, e.g. in response to a predetermined event. Accordingly, operation $628$ is shown in FIG. 6A as either periodic or event-triggered aperiodic, depending on the embodiment. Furthermore, in some embodiments of the type illustrated in FIG. 6B, act $624$ is included in an operation $623$ that is triggered by the user upload of interest document, and which includes acts $321$ and $322$ (described above in reference to FIG. 3A).

A computer is programmed in some embodiments of the invention to perform acts $631$-$637$ illustrated in FIG. 6C as follows. In act $631$, the programmed computer automatically extracts word groups from an interest document. Subsequent to receipt of such an interest document, the programmed computer determines two counts in acts $632$ and $633$ respectively as follows: a first count of the number of times each word group (extracted in act $631$) matches the interest document, and a second count of the number of times each word group matches documents in a reference corpus. Note that instead of a reference corpus as just described, alternative embodiments may use a subscription corpus to determine the second count. Embodiments that support use of multiple interest documents may include in the first count, the number of matches of each word group to the multiple interest documents.

After a pair of counts is determined for each of several word groups, the programmed computer uses at least one processor to compute a weight of each word group in act $634$. Specifically, in act $634$ of FIG. 6C, the computer uses multiple pairs of counts to compute the weight of each word group, as noted above in reference to act $624$ in FIG. 6A. Thereafter, in act $635$ the weights that were computed in act $634$ are stored in a computer memory that is coupled to the at least one processor. Then in act $606$, by using the weights, the computer sorts a number of word groups (e.g. all word groups) from the interest document, in a manner similar to act $326$ (described above in reference to FIG. 3C). Subsequently, in act $637$, a sorted list that is generated by sorting is stored in computer memory, e.g. for future use in invoking a document crawler as per act $329$. In embodiment "B" described above, one or more word groups from the top of the sorted list are used to invoke a document crawler that indexes resumes. In embodiment "C" described above, one or more word groups from the top of the sorted list are used to invoke a document crawler that indexes journals and conference proceedings. In embodiment "D" described above, one or more word groups from the top of the sorted list are used to invoke a document crawler that indexes the world wide web.

Figure 6C:
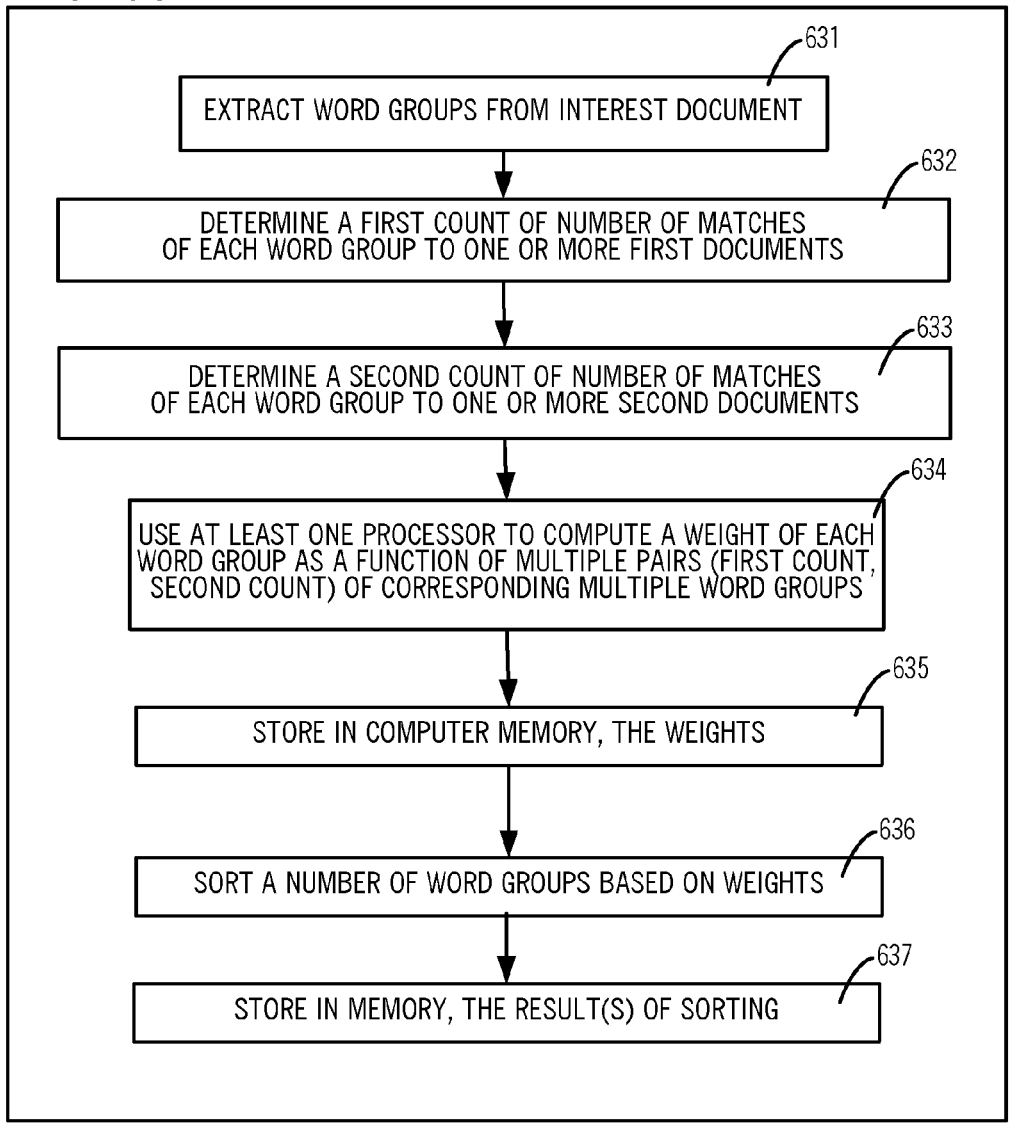
FIG. 6C illustrates, in a flow chart, acts performed by a relevance engine in accordance with the invention.
Figure 7A:
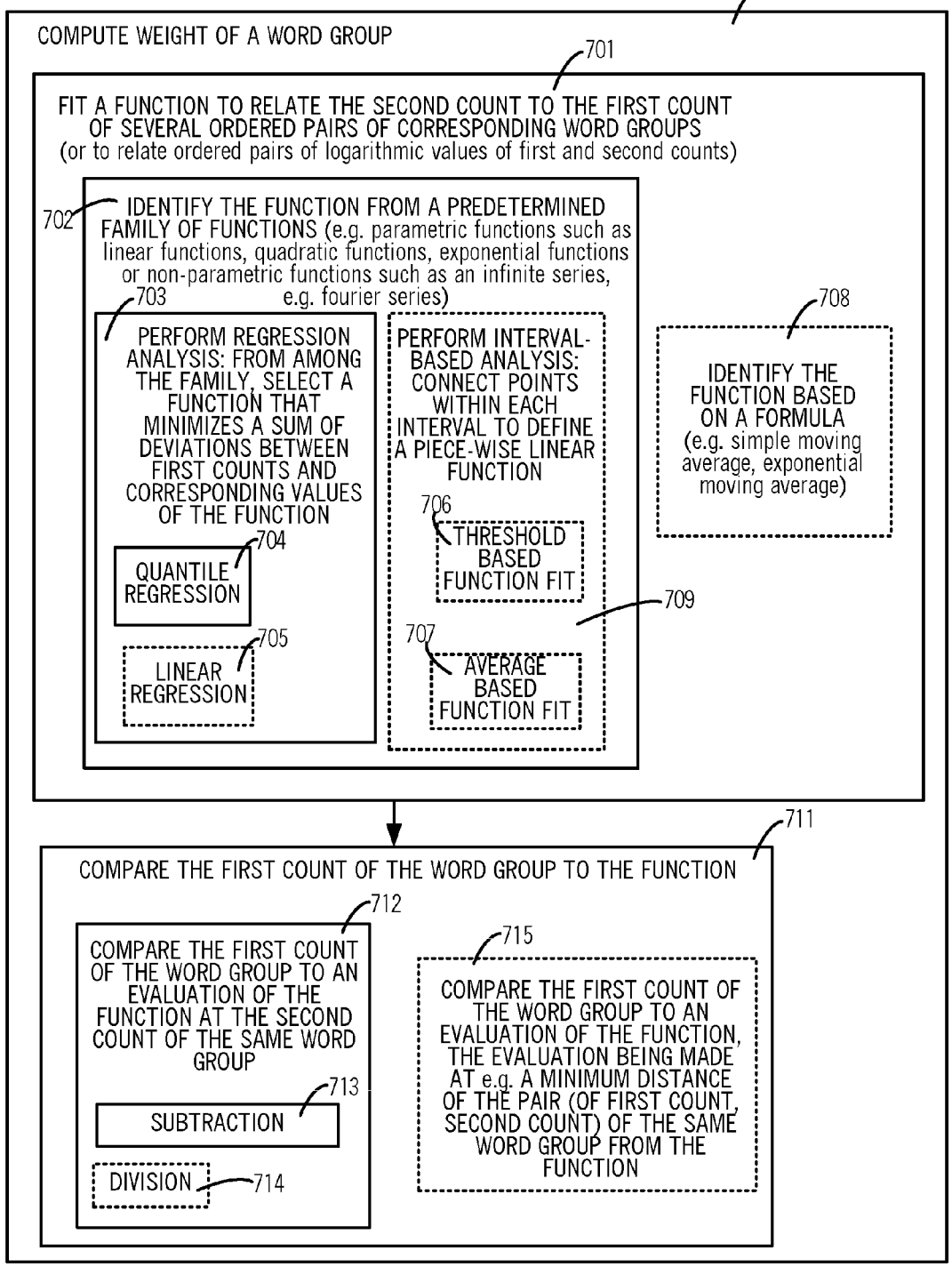
FIG. 7A illustrates, in a flow chart, acts performed by at least one processor to compute a weight in accordance with the invention.

In some embodiments, act $634$ of FIG. 6C is implemented to compute the weight of each group of words as illustrated in FIG. 7A. Specifically, in act $701$, the computer fits a function, to relate the second count (over the reference corpus) to the first count (over the interest document(s)), of each of several ordered pairs, of corresponding word groups. Depending on the embodiment, the function may be fit directly to the first and second counts themselves, or indirectly to a transformation of or scaling of the first and second constants. Specifically, in one illustrative embodiment of act $701$, a function is fitted by such a programmed computer to the logarithmic values of the first and second counts.

After a function is fitted, in an act $711$ the computer compares the first count for a given word group to the fitted function in order to obtain a weight of the given group of words. The comparison in act $711$ can be performed by a suitably programmed computer in different ways, depending on the embodiment. In some embodiments, the fitted function is evaluated at the second count of the given word group as per act $712$ in FIG. 7A and the result of evaluation is compared to the first count, e.g. by subtraction (as per act $713$) or by division (as per act $714$). The result of such comparison (e.g. the result of subtraction or division) is directly used as the given word group's weight in several such embodiments. In certain embodiments, word groups that are ranked by the just-described weight are more relevant than word groups ranked by a ratio of the interest count to the reference count as described above in reference to Table 2. In other embodiments, the fitted function is evaluated not at the second count as per act $715$. For example, in act $715$, the fitted function may be evaluated a minimum distance of the pair of first count and second count of the given word group from the function.

The above-described function fitting in an act $701$ can be performed in different ways depending on the embodiment. For example, in some embodiments, a function is fitted by identifying it from a predetermined family of functions as per act $702$, while in other embodiments the function is identified based on a formula as per act $708$. Two examples of the formula that are used in some embodiments are a simple moving average and an exponential moving average. Act 702 can also be implemented differently depending on the embodiment, e.g. by identifying a function from among a family of parametric functions, such as linear functions, quadratic functions, exponential functions, or alternatively from among non-parametric functions such as an infinite series, such as the fourier series. In a first example, one illustrative embodiment uses a family of linear functions in the form of y=bx+c, wherein y denotes the first count, x denotes the second count, and wherein b and c are constants that identify a single function (fitted to the pairs of word group counts) on performance of act 702. In a second example, another illustrative embodiment uses a family of quadratic functions in the form of $y=ax^2-bx+c$, wherein y denotes the first count, x denotes the second count, and wherein a, b and c are constants that identify a single function (fitted to the pairs) on performance of act 702.

In several embodiments, act 702 is performed by the computer performing a regression analysis in an act 703, to select from among a family of functions, a function that minimizes a sum of deviations between first counts and corresponding values of the function (evaluated at the second count). In one illustrative example, the computer 120 is programmed to determine at least one constant that uniquely identifies a single function from the family, by performing a quantile regression as illustrated by act 704, while in another such example the computer performs a linear regression as per act 705. For additional implementation detail of such examples, see the description of FIG. 7B below. In certain embodiments, act 702 is performed by the computer 120 performing an interval based analysis in an act 709. The interval based analysis can be performed by computer 120 in different ways depending on the embodiment, e.g. using a threshold based fit as per act 706 or using an average based fit as per act 707.

In some embodiments of act 707, the computer is programmed to divide a range of the second count across all ordered pairs into intervals, and generate an average within each interval, and then connect up the average of each interval at the midpoint of each interval to generate a piece-wise linear function. In other embodiments of act 706, the computer is programmed to also divide a range of the second count across all ordered pairs into intervals, and generate a threshold within each interval. The threshold may be based on a predetermined statistical criterion, such as the highest N word groups within each interval (e.g. N=10), ranked by the first count. Then the threshold of each interval is connected up at the mid-point of each interval by the programmed computer, to generate a piece-wise linear function.

In some embodiments of act 624 (FIGS. 6A, 6B), computer 120 is programmed with statistical package R to read from a database 150, a list of word groups (e.g. via a comma-separated or tab-separated file), and corresponding ordered pairs of interest counts and reference counts as illustrated by act 721 in FIG. 7B. As noted above, the first count (interest count) and the second count (reference count) for each pair were previously stored in database 150 by computer 120 in respective acts 322 and 321 (FIGS. 6A and 6B). After retrieval of the ordered pairs, computer 120 calculates the logarithm of the first count and the second count in each ordered pair as per act 722. Thereafter, the computer 120 invokes an appropriate module to relate the first count (interest count) to the second count (reference count) via a function, such as the module "rq" to perform quantile regression in act 704 or the module "lm" to perform linear regression in act 705. The module "rq" is invoked in two alternative embodiments, by respectively specifying a linear function or a quadratic function. During such invocation, the programmed computer 120 also provides a predetermined value for the quantile parameter "tau." FIG. 7C illustrates a linear function 791 (e.g. a straight line) and a quadratic function 792 that were generated by invoking module "rq" while specifying the value 0.95 for tau, and using data of the type illustrated in Table 2 above.

In some embodiments, module "rq" is invoked from the "quantreg" package, which is available for use in the statistical language R. Documentation for the quantreg package for R is available at the CRAN website address obtained by replacing "%" with "." in the following string: "cran%r-project%org". In some embodiments, module "lm" is invoked in server computer 120 as a built-in function of the statistical language R, e.g. as described in the book entitled "An Introduction to R, Notes on R: A Programming Environment for Data Analysis and Graphics", Version 2.10.1, (2009-12-14) by W. N. Venables, D. M. Smith and the R Development Core Team, incorporated by reference herein in its entirety.

In certain embodiments, quantile regression is performed by server computer 120 as described in an article by Hunter DR, and Lange K, entitled "Quantile regression via an MM algorithm" published in J Comput Graphical Stat 2000; (9): 60-77 which is incorporated by reference herein in its entirety, and available at the URL obtained by replacing "%" with "/" and replacing "=" with "." in the following string: http:%%www=stat=psu=edu% ~dhunter%papers%qr=pdf.

Moreover, several embodiments of server computer 120 use the "quantreg" package (including an "rq" module") as described in the article entitled "QUANTILE REGRESSION IN R: A VIGNETTE" by Roger Koenke, published Nov. 4, 2009 that is incorporated by reference herein in its entirety, and available at the URL obtained by replacing "%" with "/" and replacing "=" with "." in the following string: http:%%cran=r-project=org%web%packages%quantreg%vignettes%rq=pdf.

For additional information on quantreg as used in server computer 120 of some embodiments, see the user manual entitled Package 'quantreg', published Nov. 5, 2009 that is incorporated by reference herein in its entirety and available at the URL obtained by replacing "%" with "/" and replacing "=" with "." in the following string: http:%%cran=r-project.org%web%packages%quantreg%quantreg=pdf.

In a few embodiments, server computer 120 is programmed to perform quantile regression as described in an article entitled "A gentle introduction to quantile regression for ecologists", published Front Ecol Environ 2003; 1(8): 412-420 that is incorporated by reference herein in its entirety.

Furthermore, some embodiments of server computer 120 use perform quantile regression as described in the article entitled "QUANTILE REGRESSION" by Roger Koenker and Kevin F. Hallock, published Journal of Economic Perspectives—Volume 15, No. 4, Fall 2001, pages 143-156 that is incorporated by reference herein in its entirety, In several embodiments, a function is automatically selected by computer 120 from among a family of functions to minimize a sum of deviations between the first counts in ordered pairs of a group of words and corresponding values of the function evaluated at the respective second counts in ordered pairs of the group of words. In some such embodiments, the function is selected by computer 120 from among a family of functions based on having the minimum sum of deviation of ordered pairs of the group of words from the function, such that the deviation has the value equal to (i) a predetermined multiple "tau" of the difference of the first count from the corresponding value of said function if r is non-negative, and (ii) a complement of the predetermined multiple (tau-1) of the difference r if r is negative, wherein 0<tau<1.

In some embodiments, computer 120 invokes the quantile regression function "rq" as follows, "q1=rq(y~x,data=D, tau=0.95)", to identify the two constants b and c of a specific linear function y=bx+c (described above), illustrated by straight line 791 in FIG. 7C. In the just-described invocation, D is the data set containing an ordered pair, each ordered pair containing a first count and a second count of a corresponding word group found to have matched an interest document. In other embodiments, computer 120 invokes the quantile regression function "rq" as follows, "q2=rq(y~x+I(x^2), data=D, tau=0.95)" to identify the three constants "a", "b" and "c" for the quadratic function $y=ax^2+bx+c$ (described above), illustrated by curve 792 in FIG. 7C.

One illustrative example of certain above-described embodiments is shown below in TABLE 3. In this example, the module "rq" is invoked as follows:

```
> r$q2
Call:
rq(formula = lintcount ~ lrefcount + I(lrefcount^2), tau = 0.95,
    data = x)
``` wherein lintcount is the logarithm to the base 10 of the interest corpus count, and lrefcount is the logarithm to the base 10 of the reference corpus count. In response, "rq" returns the following coefficients, in the above formula $y=ax^2-bx-c$ (e.g. Intercept is the zeroth order coefficient "c", and so on).

| (Intercept) | lrefcount | I (lrefcount^2) |
|---|---|---|
| 0.31191287 | −0.02357209 | 0.01268922 |

In this illustrative example, the weight (called "deviation" below) for the word group "in-vehicle detector" is calculated as follows:

```
lintcount=log10(intcount)=1.38
lrefcount=log10(refcount)=2.10
lfitted=0.3119 −0.0236*lrefcount +0.01269*(lrefcount^2)=0.32
deviation=lintcount−lfitted=1.38−0.32=1.06
```

TABLE 3

| Word group | Interest corpus count | Reference corpus count | log base 10 of Interest corpus count | log base 10 of Reference corpus count | Value of fitted curve | deviation |
|---|---|---|---|---|---|---|
| in-vehicle detector | 24 | 126 | 1.38 | 2.1 | 0.32 | 1.06 |
| u-238 | 35 | 398107 | 1.54 | 5.6 | 0.58 | 0.97 |
| gamma ray | 42 | 7943282 | 1.62 | 6.9 | 0.75 | 0.87 |
| u-232 | 20 | 31623 | 1.3 | 4.5 | 0.46 | 0.84 |
| nuclear material | 34 | 3162278 | 1.53 | 6.5 | 0.69 | 0.84 |
| detection distance | 17 | 31623 | 1.23 | 4.5 | 0.46 | 0.77 |
| mev gamma | 15 | 7943 | 1.18 | 3.9 | 0.41 | 0.76 |
| plutonium | 34 | 10000000 | 1.53 | 7 | 0.77 | 0.76 |
| nuclear detection | 15 | 39811 | 1.18 | 4.6 | 0.47 | 0.7 |
| detector reading | 11 | 2512 | 1.04 | 3.4 | 0.38 | 0.66 |
| mev gamma ray | 11 | 3162 | 1.04 | 3.5 | 0.38 | 0.66 |
| grade of plutonium | 10 | 794 | 1 | 2.9 | 0.35 | 0.65 |
| in-vehicle | 26 | 10000000 | 1.41 | 7 | 0.77 | 0.65 |
| disarm program | 9 | 251 | 0.95 | 2.4 | 0.33 | 0.63 |
| detector area | 11 | 10000 | 1.04 | 4 | 0.42 | 0.62 |
| 10 cm lead | 8 | 251 | 0.9 | 2.4 | 0.33 | 0.57 |
| neutron emission | 10 | 15849 | 1 | 4.2 | 0.44 | 0.56 |
| linear attenuation coefficient | 9 | 3981 | 0.95 | 3.6 | 0.39 | 0.56 |
| mev | 20 | 6309573 | 1.3 | 6.8 | 0.74 | 0.56 |
| rand-mipt | 8 | 1000 | 0.9 | 3 | 0.36 | 0.55 |

Figure 8A:
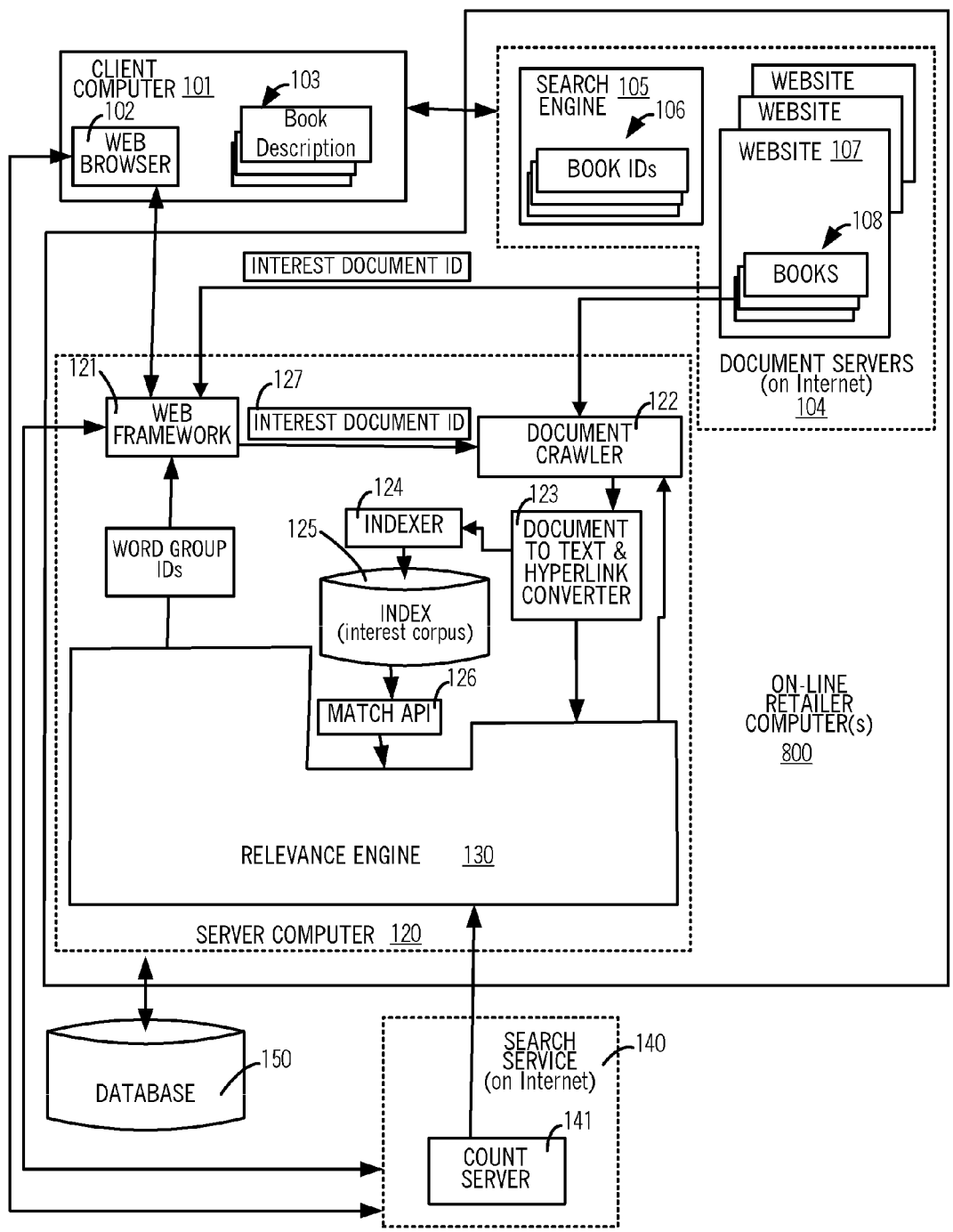
FIGS. 8A and 8B illustrate, in block diagrams, two alternative embodiments of a server computer

In some embodiments ("H"), computers 800 of an on-line retailer (such as Amazon) include server computer 120 that is internally connected (e.g. via a proprietary network) to search engine 105 and website 107 as illustrated in FIG. 8A. In embodiments of the type illustrated in FIG. 8A, the documents are books 108 and/or book descriptions 103. In such embodiments, the display of a specific book and/or specific book's description to a user causes website 107 (from which the book description was displayed) to automatically identify the book to web framework 121, for use as an interest document. In this manner, the interest document is automatically identified by a document server 104 of this embodiment. Web framework 121 passes an identifier of the book to document crawler 122 that in turn accesses website 107 to retrieve the book in electronic form (e.g. as a PDF). Then document crawler 122 passes the book to converter 123 that in turn passes the text to relevance engine 130 which in turn passes word groups (and/or their identifiers) to web framework 121. Web framework 121 then supplies the word groups to web browser 102 for display to the user, e.g. as illustrated in FIGS. 9C and 9D.

Figure 8B:
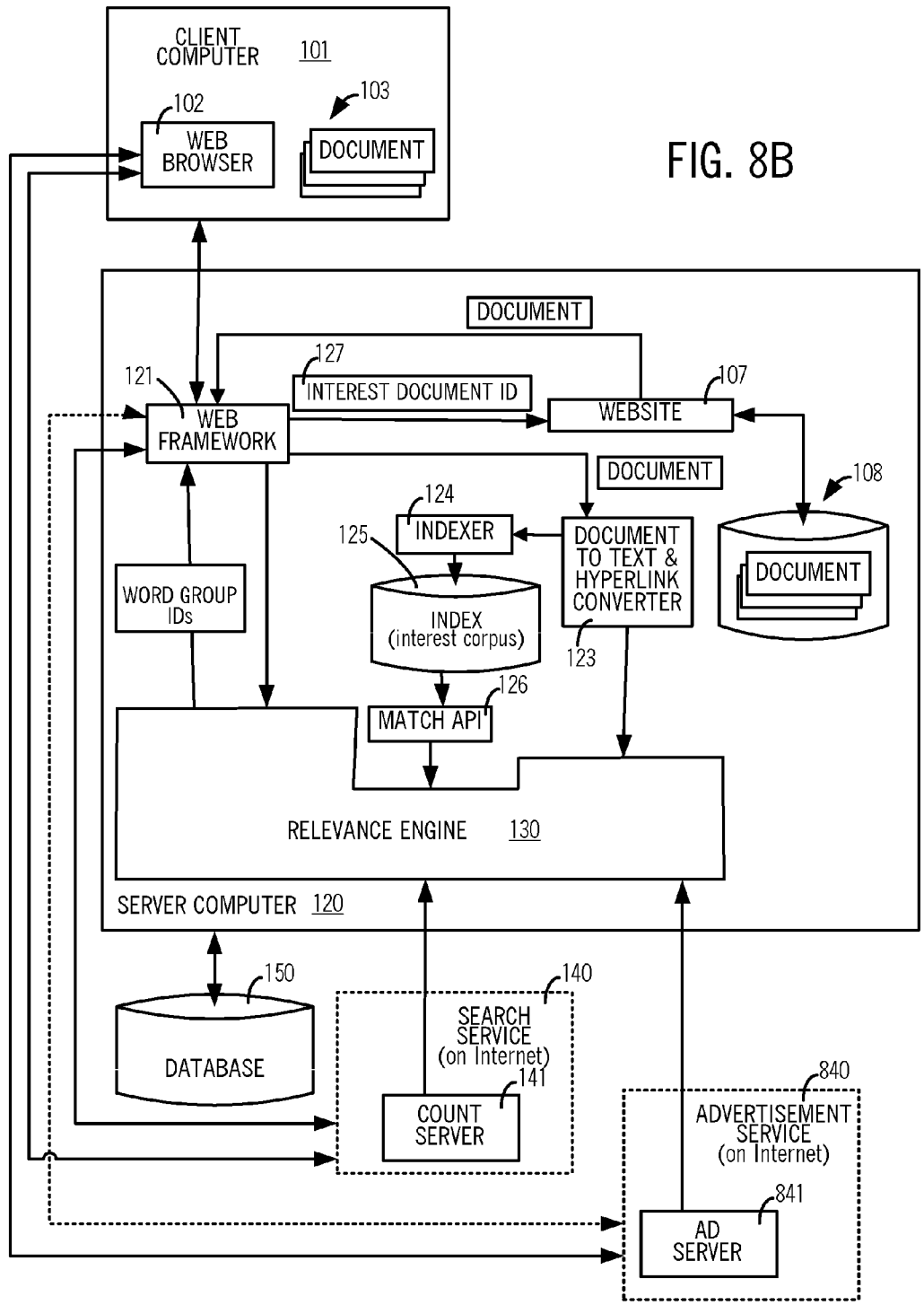

In certain embodiments ("K"), a website 107 is included in server computer 120. In these embodiments, as illustrated in FIG. 8B, web framework 121 prepares a web page that is transmitted to web browser 102 for display to the user. Web framework 121 constructs the web page using not only a document (such as article 981 in FIG. 9F) from website 107 but also including word groups generated by relevance engine 130 by use of that same document from website 107 as an interest document. Hence, the interest document (such as article 981 in FIG. 9F) is automatically identified in this embodiment, by web framework 121. On receipt of the word groups, web framework 121 automatically prepares a web page 980 (FIG. 9F) including the word groups 982 and transmits it to web browser 102. The word groups 982 are included in the web page 980 with hyperlinks to invoke an advertisement service 840 (FIG. 8B) so that selection of any of word groups 982 by the user results in web browser 102 communicating with an ad server 841, to obtain advertisement(s) which is/are displayed to the user (see FIG. 9G). In certain alternative embodiments, the just-described hyperlinks do not invoke the advertisement service 840 and instead invoke the search service 140. Hence, in such alternative embodiments, a user clicking on a given word group in the lists of word groups 982 (FIG. 9E) results in the display of a list of articles that use the given word group.

Screens displayed during an illustrative interaction of a user with one embodiment of server computer 120 are shown in FIGS. 9A-9H. Specifically, in the illustrative interaction, the user initially identifies an interest document entitled "Nuclear Detection" to server computer 120 as described above in reference to FIG. 1E, In this example, server computer 120 uses this particular interest document to generate three lists 911-913 as described above and illustrated in FIG. 9A. Next, in this illustrative interaction, the user types in the word "terrorist" in search box 901 (FIG. 9A) and clicks with their mouse on the "search" button (unlabeled) displayed on web page 900 to initiate a search by server computer 120, for all documents on the Internet that use this word. In this example, server computer 120 uses search service 140 made available by GOOGLE. Also in this example, results information 903 (FIG. 9A) describing the documents identified by the search by computer 120 on "terrorist" are returned to web browser 102 in a web page 900 (FIG. 9A). Each item in results information 903 in FIG. 9A typically includes a list of document descriptions, each description including a title, a URL and a snippet of text from the identified document.

Figure 9B:
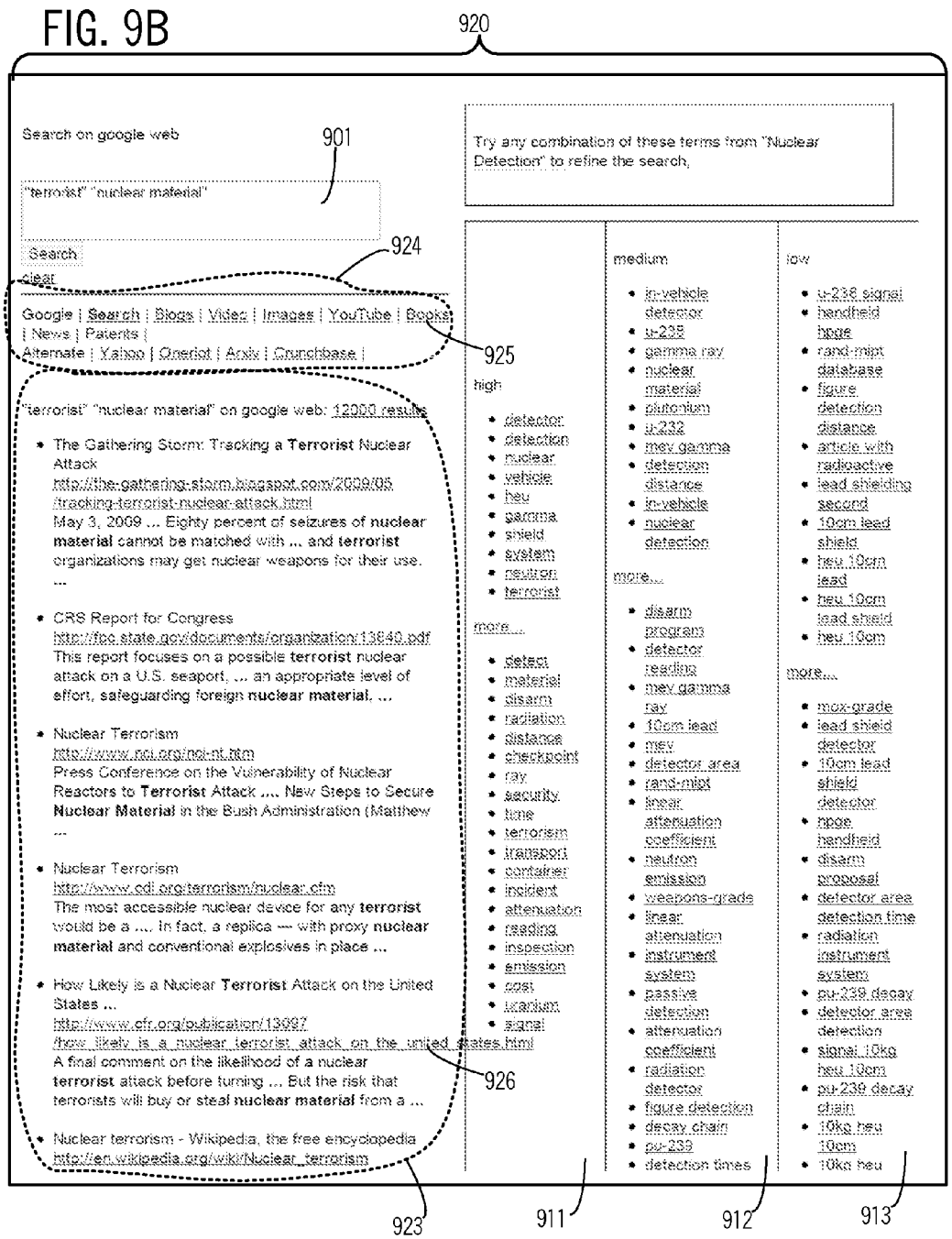
Figure 9C:
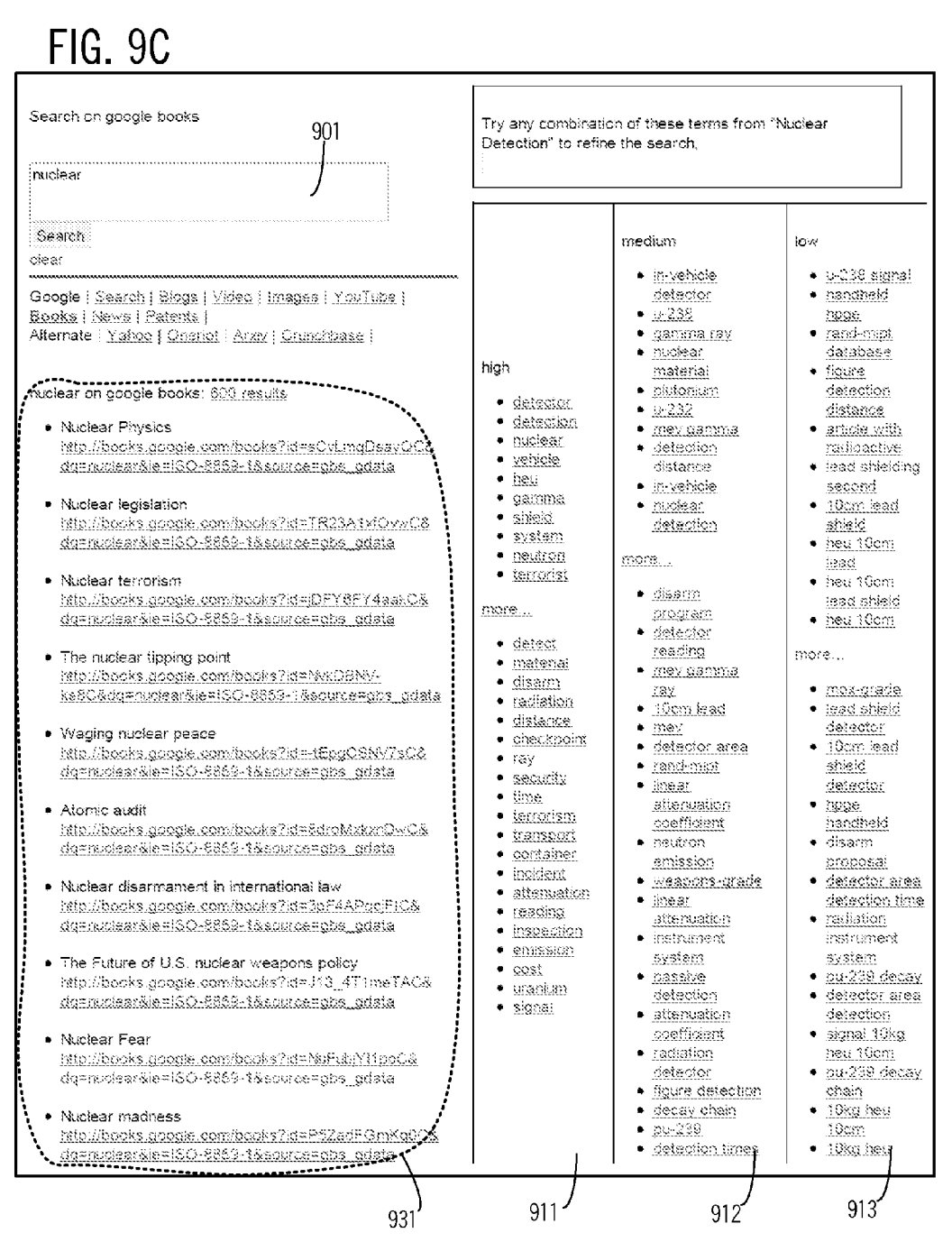

Note that web page 900 is constructed by server computer 120 of this embodiment to include lists 911-913, generated by use of the interest document as noted above. Accordingly, on viewing web page 900, the user can selectively combine their own search term "terrorist" with one or more of the word groups displayed in one of lists 911-913. In the illustrative example, the user clicks on the word group 916 (FIG. 9A), namely the phrase "nuclear material." On doing so, web browser 102 notifies server computer 120 of the user-selected word group 916 and displays the user-selected word group 916 in the search box as illustrated in FIG. 9B. In this example, when the user clicks on the "search" button (unlabeled) displayed on web page 920, server computer 120 then invokes search service 140 once again, this time with the two search terms "terrorist" and "nuclear material" in combination. Server computer 120 then constructs web page 920 (FIG. 9B) that is similar to above-described web page 900, except that the results information 903 has been replaced by results information 923.

In this manner, the user can refine their search, by appropriately combining any one or more of the word groups in lists 911-913 with search terms (if any) typed by the user in box 901. In one embodiment, any word group present in search box 901 can be easily removed from use in the next search, either by the user operating the delete button on the keyboard or alternatively by the user clicking on the same search term in one of lists 911-913 (e.g. a first click on a word group adds it to box 901 and a second click on the word group removes it from box 901).

In the illustrative example, web page 920 constructed by server computer 120 identifies several search services in a section 924, such as Google, Yahoo, YouTube, Oneriot, Crunchbase, Books, Patents, Videos, Images, News, Blogs etc. The search service currently used is shown in different attributes (e.g. bolded and without underlining) in section 924 in this example, relative to the other search services that are available (e.g. shown underlined, as hyperlinks). In the illustrative interaction the user now clicks on the "Books" hyperlink 925 and on doing so, server computer 120 is notified by web browser 102. Server computer 120 then queries the user-selected search service 140 (in this case GOOGLE books), and generates a web page of the type illustrated in FIG. 9C. In the example shown in FIG. 9C the user has repeated the search using the term "nuclear" and hence the results information 931 is shown in FIG. 9C including descriptions of books that use the word "nuclear." Note that lists 911-913 continue to be displayed unchanged in the web page of FIG. 9C (as previously generated from the interest document "Nuclear Detection"). In the illustrative interaction, the user types the word "terrorist" in the search box 901 to look for books that use the two words "nuclear" and "terrorist" in combination, and the server computer 120 constructs the web page illustrated in FIG. 9D.

In the illustrative interaction, the user returns back to the search results shown in FIG. 9B, and selects the URL 926 of a document shown in results information 903. In response, server computer 120 constructs the web page illustrated in FIG. 9E, including the user-selected document 961 as well as word groups 962 (in this example, the word groups 962 happen to be same as the word groups in lists 911-913 although other word groups can be displayed in other examples). Note that at this stage, word groups 962 included in web page 960 have hyperlinks that when clicked directly lead to web pages of results information containing document descriptions that match the corresponding hyper-linked word group. In an alternative embodiment, the just-described hyperlinks lead to web pages of advertisements as discussed above in reference to FIGS. 9F and 9G.

Although each document description illustrated in FIGS. 9A-9G does not include any word groups, an alternative embodiment illustrated in FIG. 9H includes one or more word groups that are generated using the described document as an interest document. Specifically, in FIG. 9H, the results information 990 including a number of document descriptions, such as description 991 that in turn includes a number of word groups 992 that are shown separated by forward slashes "//". The word groups 992 are determined by server computer 120 in this embodiment by use of the document at the URL 926 as an interest document. The user may then use any of these word groups 992 in box 901 to further refine their search.

In several embodiments, a fitted function is selected by computer 120 from among a family of functions based on deviations of ordered pairs of the group of words from the function, such that the deviation has a value based on a difference of the first count from the corresponding value of the function. The deviations can be difference in absolute value, or difference of squares (linear regression), etc depending on the embodiment.

Numerous modifications and adaptations of the embodiments described herein will become apparent to the skilled artisan in view of this disclosure.

Numerous modifications and adaptations of the embodiments described herein are encompassed by the scope of the invention.

What is claimed is:
1. A computer-implemented method comprising:
automatically extracting a plurality of groups of words from a set comprising a first document, wherein each group of the plurality of groups comprises a word;

automatically determining a plurality of first counts of a number of times said each of the groups of words in said plurality matches said set;
automatically determining a plurality of second counts of the number of times said each group of words in said plurality matches a corpus of second documents;
obtaining a weight of said each group of words based on the first counts and second counts, comprising automatically performing function fitting on at least first counts of said plurality of groups of words and corresponding second counts of said plurality of groups of words to obtain a fitted function, and using at least one processor in automatically comparing a first count of said each group of words in the plurality of first counts to an evaluation of said fitted function at a second count of said each group of words in the plurality of second counts, to obtain a weight of said each group of words;
automatically ranking based on said weight, said at least one group of words relative to another group of words in said plurality of groups; and
selecting a plurality of first groups of words from the plurality of groups, based on said weights;
displaying the plurality of first groups of words in a browser for display to a user;
constructing a new combination of search terms using more than one user-selected word groups, wherein the user-selected word groups are selected by the user from the plurality of first groups of words displayed to the user;
invoking a search service with the new combination of search terms;
displaying results of the search service using the new combination of search terms in the browser; and
storing the results in memory coupled to a processor.

2. The computer-implemented method of claim 1, wherein the search service is selected by the user from a set of available search services.

3. The computer-implemented method of claim 1, further comprising refining the search service comprising extracting additional word groups from the results to the invoked search service, and adding, by the user, the additional word groups to the search service.

4. The computer-implemented method of claim 1, wherein constructing the new combination of search terms further includes the user-selected word groups in combination with search terms entered by the user.

5. A computer-implemented method comprising:
automatically extracting a plurality of groups of words from a set comprising a first document, wherein each group of the plurality of groups comprises a word;
automatically determining a plurality of first counts of a number of times said each of the groups of words in said plurality matches said set;
automatically determining a plurality of second counts of the number of times said each group of words in said plurality matches a corpus of second documents;
obtaining a weight of said each group of words based on the first counts and second counts, comprising automatically performing function fitting on at least first counts of said plurality of groups of words and corresponding second counts of said plurality of groups of words to obtain a fitted function, and using at least one processor in automatically comparing a first count of said each group of words in the plurality of first counts to an evaluation of said fitted function at a second count of said each group of words in the plurality of second counts, to obtain a weight of said each group of words;
automatically ranking based on said weight, said at least one group of words relative to another group of words in said plurality of groups; and
selecting a plurality of first groups of words from the plurality of groups, based on said weights;
displaying the plurality of first groups of words in a browser for display to a user;
constructing a new combination of search terms using more than one user-selected word groups, wherein the user-selected word groups are selected by the user from the plurality of first groups of words displayed to the user;
matching the new combination of search terms using an inverted index;
displaying results of the match in the browser; and
storing the results in memory coupled to a processor.

6. The computer-implemented method of claim 5, wherein the inverted index is selected by the user from a set of available inverted indexes.

7. The computer-implemented method of claim 5, further comprising refining the inverted index comprising extracting additional word groups from the results to the matching, and adding, by the user, the additional word groups to the matching.

8. The computer-implemented method of claim 5, wherein constructing the new combination of search terms further includes the user-selected word groups in combination with search terms entered by the user.

9. A non-transitory computer-readable medium comprising a plurality of instructions, that instructions comprising:
instructions to automatically extract a plurality of groups of words from a set comprising a first document, wherein each group of the plurality of groups comprises a word;
instructions to automatically determine a plurality of first counts of a number of times said each of the groups of words in said plurality matches said set;
instructions to automatically determine a plurality of second counts of the number of times said each group of words in said plurality matches a corpus of second documents;
instructions to obtain a weight of said each group of words based on the first counts and second counts, comprising automatically performing function fitting on at least first counts of said plurality of groups of words and corresponding second counts of said plurality of groups of words to obtain a fitted function, and using at least one processor in automatically comparing a first count of said each group of words in the plurality of first counts to an evaluation of said fitted function at a second count of said each group of words in the plurality of second counts, to obtain a weight of said each group of words;
instructions to automatically rank based on said weight, said at least one group of words relative to another group of words in said plurality of groups; and
instructions to select a plurality of first groups of words from the plurality of groups, based on said weights;
instructions to display the plurality of first groups of words in a browser for display to a user;
instructions to construct a new combination of search terms using more than one user-selected word groups, wherein the user-selected word groups are selected by the user from the plurality of first groups of words displayed to the user;
instructions to invoke a search service with the new combination of search terms;

instructions to display results of the search service using the new combination of search terms in the browser; and instructions to store the results in memory coupled to a processor.

10. The non-transitory computer-readable medium of claim 9, wherein the search service is selected by the user from a set of available search services.

11. The non-transitory computer-readable medium of claim 9, further comprising refining the search service comprising extracting additional word groups from a response to the invoked search service, and adding, by the user, the additional word groups to the search service.

12. The non-transitory computer-readable medium of claim 9, wherein constructing the new combination of search terms further includes the user-selected word groups in combination with search terms entered by the user.

* * * * *